United States Patent
Montoya et al.

(10) Patent No.: US 12,497,849 B2
(45) Date of Patent: Dec. 16, 2025

(54) PRESSURIZED RESERVOIR CORE SAMPLE TRANSFER TOOL SYSTEM

(71) Applicant: Chevron U.S.A. Inc., San Ramon, CA (US)

(72) Inventors: James Daniel Montoya, Santa Fe, NM (US); Jonathon Crain Boudreaux, Santa Fe, NM (US); Patrick Rodriguez, Santa Fe, NM (US); Cole Thomas Brinkley, Santa Fe, NM (US); Scott Jeffrey Seltzer, Houston, TX (US); Marcus Oliver Wigand, Missouri City, TX (US); Zheng Yang, Katy, TX (US); Michael T. Rauschhuber, Houston, TX (US); Edward Russell Peacher, Cypress, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 268 days.

(21) Appl. No.: 18/345,784

(22) Filed: Jun. 30, 2023

(65) Prior Publication Data

US 2023/0340850 A1      Oct. 26, 2023

Related U.S. Application Data

(63) Continuation-in-part of application No. 16/944,542, filed on Jul. 31, 2020, now Pat. No. 11,773,675.
(Continued)

(51) Int. Cl.
*E21B 25/08* (2006.01)
*E21B 25/00* (2006.01)
*G01N 33/24* (2006.01)

(52) U.S. Cl.
CPC ............ *E21B 25/08* (2013.01); *E21B 25/005* (2013.01); *G01N 33/24* (2013.01)

(58) Field of Classification Search
CPC ........ E21B 25/005; E21B 25/08; G01N 33/24
See application file for complete search history.

(56) References Cited

U.S. PATENT DOCUMENTS

| 4,258,803 A | 3/1981 | Thompson et al. |
| 4,317,490 A | 3/1982 | Milberger et al. |

(Continued)

FOREIGN PATENT DOCUMENTS

| KR | 2014001408 | 1/2014 | |
| WO | WO-2021081216 A1 * | 4/2021 | ............... G01N 1/08 |

OTHER PUBLICATIONS

Wunsch et al. "Re-Inventing Pressure Retained Core Acquisition for Advanced Reservoir Property Determination" SPE-216724-MS (Year: 2023).*

(Continued)

*Primary Examiner* — John Fitzgerald
(74) *Attorney, Agent, or Firm* — Smith & Woldesenbet Law Group, PLLC

(57) ABSTRACT

A method of transferring at least one subterranean core sample from a retrieval vessel to a testing vessel can include removing at least one pressure barrier on the retrieval vessel using a linear actuator while maintaining a sampling pressure on the at least one subterranean core sample at which the at least one subterranean core sample is taken from a subterranean formation. The method can also include pressurizing the testing vessel to the sampling pressure using the linear actuator, and transferring the at least one subterranean core sample from the retrieval vessel to the testing vessel. The method can further include sealing the testing vessel with the at least one subterranean core sample at the sampling pressure, where the testing vessel allows the at least (Continued)

one subterranean core sample to be tested while the at least one subterranean core sample is maintained at the sampling pressure.

20 Claims, 36 Drawing Sheets

Related U.S. Application Data

(60) Provisional application No. 63/050,662, filed on Jul. 10, 2020, provisional application No. 62/881,797, filed on Aug. 1, 2019, provisional application No. 62/881,787, filed on Aug. 1, 2019.

(56) References Cited

U.S. PATENT DOCUMENTS

| | | | |
|---|---|---|---|
| 4,449,593 A | 5/1984 | Jageler et al. | |
| 4,916,945 A | 4/1990 | Weisbrod | |
| 4,950,844 A | 8/1990 | Hallmark et al. | |
| 6,216,804 B1 | 4/2001 | Aumann et al. | |
| 6,230,825 B1 | 5/2001 | Aumann et al. | |
| 6,305,482 B1 | 10/2001 | Aumann et al. | |
| 6,378,631 B1 | 4/2002 | Aumann et al. | |
| 8,621,920 B2 | 1/2014 | Reid et al. | |
| 8,920,029 B2 | 12/2014 | Maucec et al. | |
| 9,376,879 B2 | 6/2016 | Mizuguchi | |
| 9,650,891 B2 | 5/2017 | Reid et al. | |
| 9,828,820 B2 | 11/2017 | Gupta et al. | |
| 9,874,063 B2 | 1/2018 | Arian et al. | |
| 10,053,938 B2 * | 8/2018 | Gupta | E21B 25/005 |
| 10,221,684 B2 | 3/2019 | Westacott et al. | |
| 10,246,962 B2 | 4/2019 | Gupta et al. | |
| 10,317,351 B2 | 6/2019 | Chong et al. | |
| 10,550,655 B2 | 2/2020 | Jones et al. | |
| 10,761,157 B2 | 9/2020 | Chen et al. | |
| 10,845,354 B2 | 11/2020 | Hugghins et al. | |
| 11,163,923 B2 | 11/2021 | Ramsay et al. | |
| 11,384,615 B2 | 7/2022 | Lybbert | |
| 11,613,950 B2 * | 3/2023 | Westacott | G01N 1/08 73/152.11 |
| 11,773,675 B2 * | 10/2023 | Montoya | G01R 33/12 175/58 |
| 11,851,965 B2 * | 12/2023 | Westacott | G01N 1/2202 |
| 2002/0033281 A1 | 3/2002 | Aumann et al. | |
| 2014/0021345 A1 | 1/2014 | Maucec et al. | |
| 2014/0090893 A1 | 4/2014 | Reid et al. | |
| 2014/0367086 A1 | 12/2014 | Arian et al. | |
| 2018/0045008 A1 | 2/2018 | Gupta et al. | |
| 2018/0245415 A1 | 8/2018 | Jones et al. | |
| 2018/0259465 A1 | 9/2018 | Chong et al. | |
| 2018/0292477 A1 | 10/2018 | Chen et al. | |
| 2018/0298709 A1 | 10/2018 | Gupta et al. | |
| 2019/0026405 A1 | 1/2019 | Ramsay et al. | |
| 2021/0123313 A1 | 4/2021 | Westacott et al. | |
| 2021/0123344 A1 | 4/2021 | Westacott et al. | |
| 2021/0389294 A1 | 12/2021 | Krueger et al. | |

OTHER PUBLICATIONS

Geotek "PCATS: Pressure Core Analysis & Transfer System" (Year: 2025).*
Geotek, "Pressure Core Analysis", Year: 2016, 3 pages.
Haliburton, Case Study: Obtaining accurate rock and fluid samples in source rock reservoirs, Year: 2015, 4 pages.
Alan L. Mcfall, "The Construction and Evaluation of an Improved Pressuring Coring System", U.S. Department of Energy, Sandia Laboratories, 1979, 6 pages.
Norberto Monroy Ayala et al., "New Integrated Applications Using T1 and T2 Modes of Magnetic Resonance In Tight Gas Reservoirs: A Case Study From Northern Mexico", SPE 107364, 2007, 15 pages.
John Pinkett et al., "Innovative Sidewall Pressure Coring Technology Improves Reservoir Insight In Multiple Applications", SPWLA 57th Annual Logging Symposium, Jun. 25-29, 2016, Reykjavik, Iceland, 15 pages.
A. Brancolini et al., "Spatial Distribution of Petrophysical Parameters On a Core Scale Using Magnetic Resonance Imaging", SPWLA 38th Annual Logging Symposium, Jun. 15-18, 1997, 11 pages.

* cited by examiner

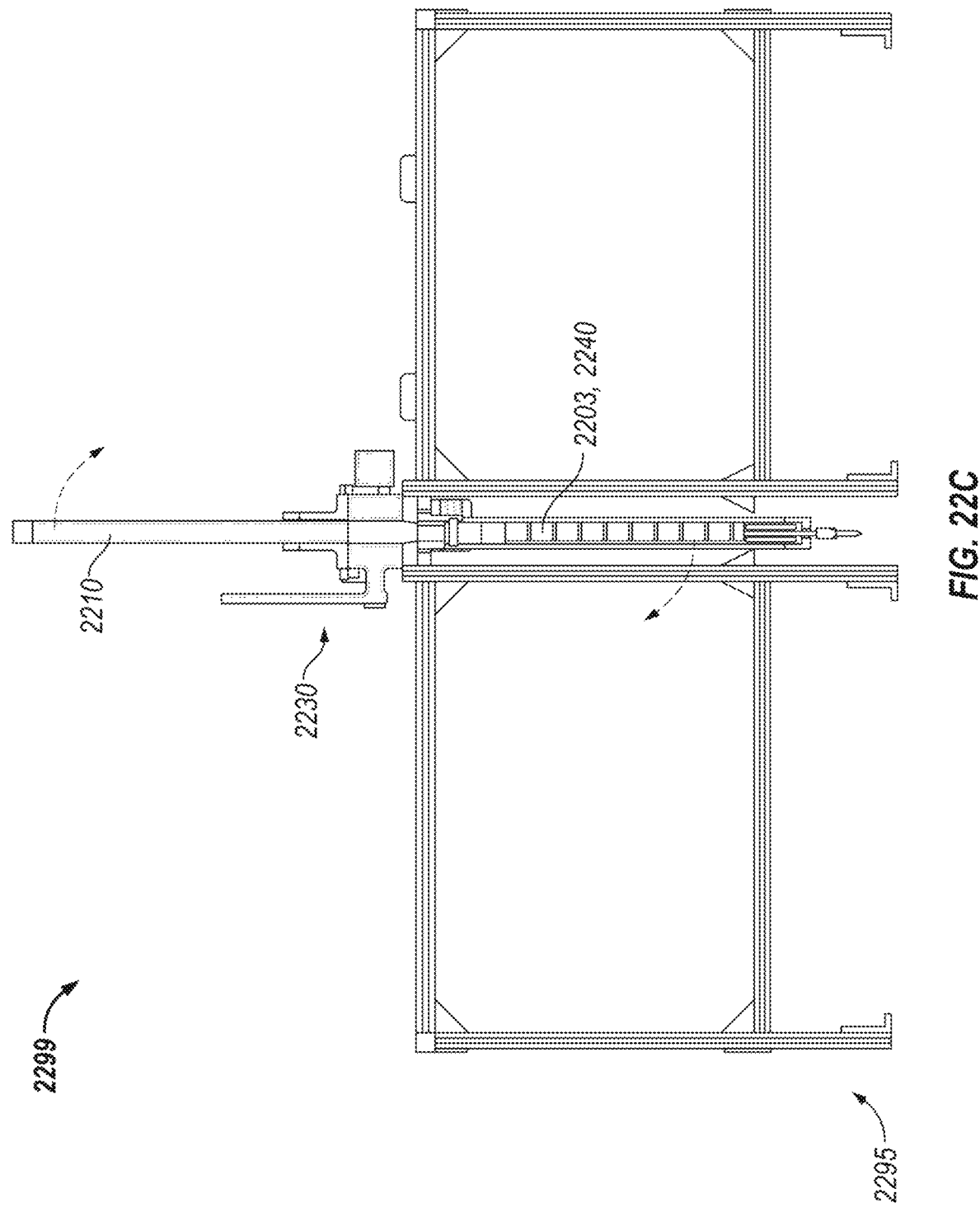

PRESSURIZED RESERVOIR CORE SAMPLE TRANSFER TOOL SYSTEM

CROSS-REFERENCE TO RELATED APPLICATIONS

This application is a continuation-in-part application of and claims priority to U.S. patent application Ser. No. 16/944,542 filed on Jul. 31, 2020, and entitled "Pressurized Reservoir Core Sample Transfer Tool System", now U.S. Pat. No. 11,773,675, which claims priority under 35 U.S.C. § 119(e) to U.S. Provisional Patent Application No. 62/881,787, filed on Aug. 1, 2019, and titled "Pressurized Reservoir Core Sample Transfer Tool System", to U.S. Provisional Patent Application No. 62/881,797, filed Aug. 1, 2019, and titled "Core Sample Testing," and to U.S. Provisional Patent Application No. 63/050,662, filed Jul. 10, 2020, and titled "Pressurized Reservoir Core Sample Transfer Tool System". The present application is also related to U.S. patent application Ser. No. 16/944,654, filed Jul. 31, 2020, and titled "Core Sample Testing". The entire contents of each of these aforementioned applications are hereby incorporated herein by reference.

TECHNICAL FIELD

The present disclosure relates generally to subterranean field operations, and more specifically to methods and systems of maintaining and testing pressurized subterranean reservoir core samples in the hydrocarbon industry.

BACKGROUND

Evaluation of potential oil and gas reservoirs is highly dependent on the collection and analysis of subsurface core samples removed from wells. These cores are conventionally extracted in lengths of 30 feet or longer, each representing a continuous range of drilled depth into the formation. Smaller core plugs are later cut from the core to sample at particular depths of interest. Sidewall core samples with size on the order of several inches can also be individually extracted from near the wall of the well. In either case, as the samples are returned from the well to the surface, they typically experience a change in pressure on the order of thousands to tens of thousands of pounds per square inch (psi), depending on the total vertical depth traveled. This pressure change typically affects the phase and composition of the fluids contained in the rock sample, for example causing lighter hydrocarbon molecules to volatilize and leave the sample. It may also result in structural alterations to the rock, such as the formation of fractures, changes in rock fabric, or changes in pore geometry. Laboratory core measurements are performed after these composition and structural changes have occurred, so the lab data may not necessarily represent the native state of the samples in their original downhole environment.

Within the last several years, coring systems have been introduced that can enclose up to 10-12 sidewall cores during the trip to the surface, capturing all fluids expelled from the cores due to the pressure decrease, so that they may be characterized, and the original fluid composition better understood. More recently, coring systems that maintain pressure inside the vessel while surfacing have been introduced, so as to minimize the changes to fluid composition in the samples; temperature is not maintained, so the pressure does decrease, but it remains significantly higher than atmospheric pressure. In addition, there are commercially available tools that retrieve conventional core samples while maintaining in-situ pressure, that provides samples up to 3 meters in length. However, here we focus on sidewall cores because they do not need to be subsampled for laboratory analysis, which is challenging and hazardous at elevated pressure.

Data based on directly measured reservoir properties, such as fluid content and producibility, taken from reservoir core samples in a laboratory can be utilized to inform production decisions. However, conventional tools must currently be depressurized to atmospheric pressure before the samples can be removed for laboratory study, although the gases expelled during depressurization can be collected for analysis during the process. Therefore, these core samples may not be fully representative of downhole conditions by the time they reach the laboratory, due to potential changes in pressure, fluid composition, and/or physical damage. In addition, these commercially available pressurized coring tools are known to be incompatible with certain laboratory measurements. For example, nuclear magnetic resonance (NMR) measurements require the application of radio-frequency magnetic pulses that are shielded by metal, but the existing tools are constructed from metal.

Accordingly, there is a need for a system for transferring samples from a commercial pressurized coring tool to a pressurized core holder that would be compatible with NMR, CT, and potentially other laboratory measurements, while maintaining the initial received pressure.

SUMMARY

In general, in one aspect, the disclosure relates to a method of transferring at least one subterranean core sample from a retrieval vessel to a testing vessel. The method can include removing at least one pressure barrier on the retrieval vessel using a linear actuator while maintaining a sampling pressure on the at least one subterranean core sample at which the at least one subterranean core sample is taken from a subterranean formation. The method can also include pressurizing the testing vessel to the sampling pressure using the linear actuator. The method can further include transferring the at least one subterranean core sample from the retrieval vessel to the testing vessel. The method can also include sealing the testing vessel with the at least one subterranean core sample at the sampling pressure, where the testing vessel allows the at least one subterranean core sample to be tested while the at least one subterranean core sample is maintained at the sampling pressure.

In another aspect, the disclosure can generally relate to a method of performing a test on a core sample. The method can include transferring at least a portion of a core sample from a first vessel to a second vessel, where the core sample is maintained at a first pressure that is at least a substantially equivalent pressure during the transfer of the core sample from the first vessel to the second vessel. The method can also include performing a test on the core sample in the second vessel at the first pressure. The method can further include reducing the pressure on the core sample in the second vessel. The method can also include repeating the test on the core sample in the second vessel at a second pressure that is lower than the first pressure. The method can further include creating a model of hydrocarbon production as a function of pressure for a subterranean reservoir from which the core sample was retrieved for hydrocarbon production.

In yet another aspect, the disclosure can generally relate to a method of performing a test on a core sample. The method can include transferring at least a portion of a core sample from a first vessel to a second vessel, where the core sample is maintained at a substantially equivalent pressure or placed under a higher pressure during the transfer of the core sample from the first vessel to the second vessel. The method can also include performing a plurality of tests on the core sample in the second vessel as the second vessel is depressurized over time to analyze a fluid composition or a petrophysical analysis of the core sample over the time. The method can further include determining, using the fluid composition or results of the petrophysical analysis of the core sample, a fluid saturation of the core sample, where the fluid saturation is used to calibrate test measurements on at least one other core sample performed at ambient pressure.

These and other aspects, objects, features, and embodiments will be apparent from the following description and the appended claims.

BRIEF DESCRIPTION OF THE DRAWINGS

The drawings illustrate only example embodiments of methods, systems, and devices for tool systems for transferring pressurized reservoir core samples and are therefore not to be considered limiting of its scope, as tool systems for transferring pressurized reservoir core samples may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 22A through 22E show a system at a time when pressurized reservoir core samples are transferred in accordance with certain example embodiments.

DETAILED DESCRIPTION

Figure 1:
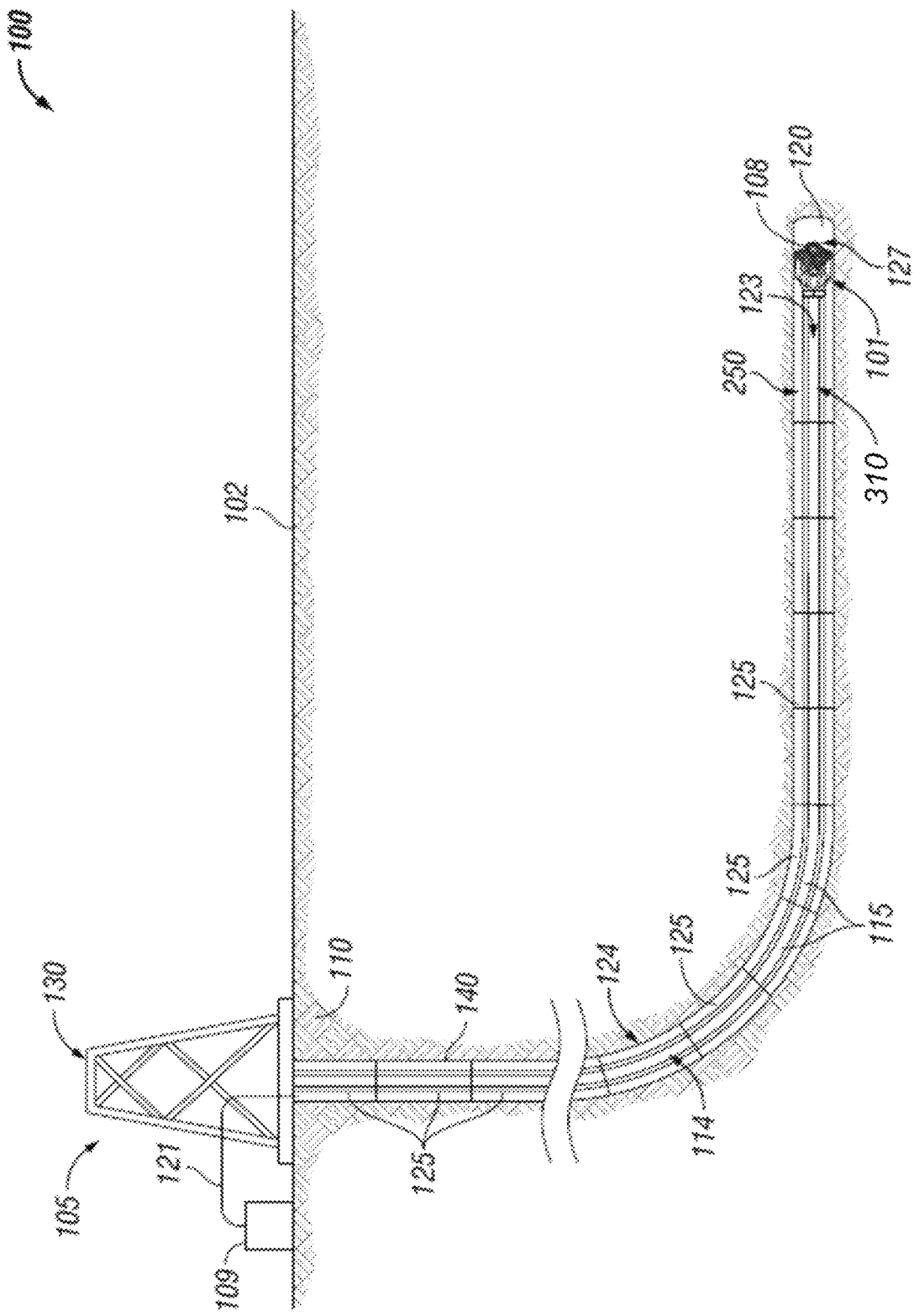
FIG. 1 shows a schematic diagram of a field system in which pressurized reservoir core samples are collected and which are later transferred under pressure in accordance with certain example embodiments.

The example embodiments discussed herein are directed to systems, apparatuses, and methods of tool systems for transferring and testing pressurized reservoir core samples. While the example tool systems shown in the figures and described herein are directed to use with samples taken from a subterranean wellbore, example tool systems can also be used in other applications, aside from a wellbore, in which pressurized core samples are taken. Thus, the examples of tool systems for transferring pressurized reservoir core samples described herein are not limited to pressurized core samples taken in a subterranean wellbore or within a reservoir within a subterranean formation.

A user as described herein may be any person that is involved with a field operation in a subterranean wellbore and/or a retrieving or analyzing pressurized sidewall core samples within the subterranean wellbore for a field system. Examples of a user may include, but are not limited to, a roughneck, a company representative, a drilling engineer, a tool pusher, a service hand, a field engineer, an electrician, a mechanic, an operator, a consultant, a contractor, and a manufacturer's representative. In an automated system, a user can be a controller (e.g., controller 204).

Any example tool system for transferring and testing pressurized reservoir core samples, or portions (e.g., components) thereof, described herein can be made from a single piece (as from a mold). When an example tool system for transferring and testing pressurized reservoir core samples, or portions thereof, is made from a single piece, the single piece can be cut out, bent, stamped, and/or otherwise shaped to create certain features, elements, or other portions of a component. Alternatively, an example tool system for transferring and testing pressurized reservoir core samples (or portions thereof) can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example subterranean coring assembly) can be made of one or more of a number of suitable materials, including but not limited to metal (e.g., stainless steel), ceramic, rubber, plastic, resin, fiberglass, and thermoplastic.

A coupling feature (including a complementary coupling feature) as described herein can allow one or more components and/or portions of an example tool system for transferring and testing pressurized reservoir core samples (e.g., a flow regulating device) to become mechanically coupled, directly or indirectly, to another portion (e.g., a wall) of the tool system for transferring and testing pressurized reservoir core samples. A coupling feature can include, but is not limited to, a portion of a hinge, an aperture, a recessed area, a protrusion, a slot, a spring clip, a tab, a detent, and mating threads. One portion of an example tool system for transferring and testing pressurized reservoir core samples can be coupled to another portion of the tool system for transferring and testing pressurized reservoir core samples by the direct use of one or more coupling features.

In addition, or in the alternative, a portion of an example tool system for transferring and testing pressurized reservoir core samples can be coupled to another portion of the tool system for transferring and testing pressurized reservoir core samples using one or more independent devices that interact with one or more coupling features disposed on a component of the tool system for transferring and testing pressurized reservoir core samples. Examples of such devices can include, but are not limited to, a pin, a hinge, a gimbal, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

TERMINOLOGY: The following terms will be used throughout the specification and will have the following meanings unless otherwise indicated.

Formation: Hydrocarbon exploration processes, hydrocarbon recovery (also referred to as hydrocarbon production) processes, or any combination thereof may be performed on a formation. The formation refers to practically any volume under a surface. For example, the formation may be practically any volume under a terrestrial surface (e.g., a land surface), practically any volume under a seafloor, etc. A water column may be above the formation, such as in marine hydrocarbon exploration, in marine hydrocarbon recovery, etc. The formation may be onshore. The formation may be offshore (e.g., with shallow water or deep water above the formation). The formation may include faults, fractures, overburdens, underburdens, salts, salt welds, rocks, sands, sediments, pore space, etc. Indeed, the formation may include practically any geologic point(s) or volume(s) of interest (such as a survey area) in some embodiments.

The formation may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Examples of hydrocarbons are many, and hydrocarbons may include oil, natural gas, kerogen, bitumen, clathrates (also referred to as hydrates), etc. The hydrocarbons may be discovered by hydrocarbon exploration processes.

The formation may also include at least one wellbore. For example, at least one wellbore may be drilled into the formation in order to confirm the presence of the hydrocarbons. As another example, at least one wellbore may be drilled into the formation in order to recover (also referred to as produce) the hydrocarbons. The hydrocarbons may be recovered from the entire formation or from a portion of the formation. For example, the formation may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in.

The formation, the hydrocarbons, or any combination thereof may also include non-hydrocarbon items. For example, the non-hydrocarbon items may include connate water, brine, tracers, items used in enhanced oil recovery or other hydrocarbon recovery processes, items from other treatments (e.g., items used in conformance control), etc.

In short, each formation may have a variety of characteristics, such as petrophysical rock properties, reservoir fluid properties, reservoir conditions, hydrocarbon properties, or any combination thereof. For example, each formation (or even zone or portion of the formation) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, a formation having a permeability in the range of 0.01 microdarcy to 10 millidarcy, a formation having a permeability in the range of 10 millidarcy to 40,000 millidarcy, etc.

The terms "formation", "subsurface formation", "hydrocarbon-bearing formation", "reservoir", "subsurface reservoir", "subsurface region of interest", "subterranean reservoir", "subsurface volume of interest", and the like may be used synonymously. The terms "formation", "hydrocarbons", and the like are not limited to any description or configuration described herein.

Wellbore: A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations). The wellbore may also be configured to be in fluidic communication with the surface, such as in fluidic communication with a surface facility that may include oil/gas/water separators, gas compressors, storage tanks, pumps, gauges, sensors, meters, pipelines, etc.

The wellbore may be used for injection (sometimes referred to as an injection wellbore) in some embodiments. The wellbore may be used for production (sometimes referred to as a production wellbore) in some embodiments. The wellbore may be used for a single function, such as only injection, in some embodiments. The wellbore may be used for a plurality of functions, such as production then injection, in some embodiments. The use of the wellbore may also be changed, for example, a particular wellbore may be turned into an injection wellbore after a different previous use as a production wellbore. The wellbore may be drilled amongst existing wellbores, for example, as an infill wellbore. A wellbore may be utilized for injection and a different wellbore may be used for hydrocarbon production, such as in the scenario that hydrocarbons are swept from at least one injection wellbore towards at least one production wellbore and up the at least one production wellbore towards the surface for processing. On the other hand, a single wellbore may be utilized for injection and hydrocarbon production, such as a single wellbore used for hydraulic fracturing and hydrocarbon production. A plurality of wellbores (e.g., tens to hundreds of wellbores) are often used in a field to recover hydrocarbons.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel). As used herein, a horizontal section of a wellbore is drilled in a horizontal direction (or substantially horizontal direction). For example, a horizontal section of a wellbore is drilled towards the bedding plane direction. A horizontal section of a wellbore may be, but is not limited to, a horizontal section of a horizontal wellbore. On the other hand, a vertical wellbore is drilled in a vertical direction (or substantially vertical direction). For example, a vertical wellbore is drilled perpendicular (or substantially perpendicular) to the bedding plane direction.

The wellbore may include a plurality of components, such as, but not limited to, a casing, a liner, a tubing string, a heating element, a sensor, a packer, a screen, a gravel pack, artificial lift equipment (e.g., an electric submersible pump (ESP)), etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the formation, producing a fluid from the formation, or any combination thereof. The casing may be cemented in place, with the cement positioned in the annulus between the formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered (sometimes referred to as produced) from the formation using primary recovery (e.g., by relying on pressure to recover the hydrocarbons), secondary recovery (e.g., by using water injection (also referred to as waterflooding) or natural gas injection to recover hydrocarbons), enhanced oil recovery (EOR), or any combination thereof. Enhanced oil recovery or simply EOR refers to techniques for increasing the amount of hydrocarbons that may be extracted from the formation. Enhanced oil recovery may also be referred to as tertiary oil recovery. Secondary recovery is sometimes just referred to as improved oil recovery or enhanced oil recovery. EOR processes include, but are not limited to, for example: (a) miscible gas injection (which includes, for example, carbon dioxide flooding), (b) chemical injection (sometimes referred to as chemical enhanced oil recovery (CEOR) that includes, for example, polymer flooding, alkaline flooding, surfactant flooding, conformance control, as well as combinations thereof such as alkaline-polymer (AP) flooding, surfactant-polymer (SP) flooding, or alkaline-surfactant-polymer (ASP) flooding), (c) microbial injection, (d) thermal recovery (which includes, for example, cyclic steam and steam flooding), or any combination thereof. The hydrocarbons may be recovered from the formation using a fracturing process. For example, a fracturing process may include fracturing using electrodes, fracturing using fluid (oftentimes referred to as hydraulic fracturing), etc. The hydrocarbons may be recovered from the formation using radio frequency (RF) heating. Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments.

Other definitions: The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate." The term "optimize" in this context is defined as improving accuracy and/or precision of the NMR (or other form of testing technology) measurement workflow. For example, this includes the NMR T1-T2 cutoffs for more realistic reservoir evaluations.

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

In certain example embodiments, retrieval vessels and example tool systems for transferring and testing pressurized reservoir core samples are subject to meeting certain standards and/or requirements. For example, the American Petroleum Institute (API), the American Society of Mechanical Engineers (ASME), the International Standards Organization (ISO), and the Occupational Health and Safety Administration (OSHA) set standards for subterranean field operations and for testing vessels under high pressure (e.g., 5,000 psi). Use of example embodiments described herein meet (and/or allow a corresponding device to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of tool systems for transferring and testing pressurized reservoir core samples will be described more fully hereinafter with reference to the accompanying drawings, in which example embodiments of tool systems for transferring and testing pressurized reservoir core samples are shown. Tool systems for transferring and testing pressurized reservoir core samples may, however, be embodied in many different forms and should not be construed as limited to the example embodiments set forth herein. Rather, these example embodiments are provided so that this disclosure will be thorough and complete, and will fully convey the scope of tool systems for transferring and testing pressurized reservoir core samples to those of ordinary skill in the art. Like, but not necessarily the same, elements in the various figures are denoted by like reference numerals for consistency.

Terms such as "first", "second", "end", "inner", "outer", "top", "bottom", "upward", "downward", "up", "down", "distal", and "proximal", when present, are used merely to distinguish one component (or part of a component or state of a component) from another. Such terms are not meant to denote a preference or a particular orientation. Also, the names given to various components described herein are descriptive of one embodiment and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

Unless defined otherwise, all technical and scientific terms used herein have the same meanings as commonly understood by one of ordinary skill in the art to which the disclosed invention belongs. All citations referred herein are expressly hereby incorporated by reference herein.

OVERVIEW: One embodiment of a method of performing a test on a core sample comprises transferring at least a portion of a core sample from a first core containment vessel, or first vessel, or retrieval vessel, to a second core containment vessel, or second vessel, or testing vessel, and performing a test on the core sample in the second vessel. The core sample is maintained at a substantially equivalent pressure or placed under a higher pressure during the transfer of the core sample from the first vessel to the second vessel. By doing so, the test and the test results may be more accurate (e.g., more representative of reservoir conditions). For example, embodiments consistent with the present disclosure may be utilized for characterizing the core samples and their fluid contents, both while at the initial received pressure and during the depressurization process.

FIG. 1 shows a schematic diagram of a land-based field system 100 in which pressurized reservoir core samples can be taken within a subterranean wellbore in accordance with one or more example embodiments. Referring to FIG. 1, the field system 100 in this example includes a wellbore 120 that is formed by a wall 140 in a subterranean formation 110 using field equipment 130. The field equipment 130 can be located above a surface 102, and/or within the wellbore 120. The surface 102 can be ground level for an onshore application and the sea floor for an off-shore application. The point where the wellbore 120 begins at the surface 102 can be called the entry point.

The subterranean formation 110 can include one or more of a number of formation types, including but not limited to shale, limestone, sandstone, clay, sand, and salt. In certain embodiments, a subterranean formation 110 can also include one or more reservoirs in which one or more resources (e.g., oil, gas, water, steam) can be located. One or more of a number of field operations (e.g., coring, tripping, drilling, setting casing, extracting downhole resources) can be performed to reach an objective of a user with respect to the subterranean formation 110.

The wellbore 120 can have one or more of a number of segments, where each segment can have one or more of a number of dimensions. Examples of such dimensions can include, but are not limited to, size (e.g., diameter) of the wellbore 120, a curvature of the wellbore 120, a total vertical depth of the wellbore 120, a measured depth of the wellbore 120, and a horizontal displacement of the wellbore 120. The field equipment 130 can be used to create and/or develop (e.g., insert casing pipe, extract downhole materials) the wellbore 120. The field equipment 130 can be positioned and/or assembled at the surface 102. The field equipment 130 can include a derrick, a tool pusher, a clamp, a tong, drill pipe, a drill bit, the retrieval vessel 310, tubing pipe 115, a power source, and casing pipe 125.

The field equipment 130 can also include one or more devices that measure and/or control various aspects (e.g., direction of wellbore 120, pressure, temperature) of a field operation associated with the wellbore 120. For example, the field equipment 130 can include a wireline tool that is run through the wellbore 120 to provide detailed information (e.g., curvature, azimuth, inclination) throughout the wellbore 120. Such information can be used for one or more of a number of purposes. For example, such information can dictate the size (e.g., outer diameter) of casing pipe to be inserted at a certain depth in the wellbore 120.

Inserted into and disposed within the wellbore 120 of FIG. 1 are a number of casing pipes 125 that are coupled to each other to form the casing string 124. In this case, each end of a casing pipe 125 has mating threads (a type of coupling feature) disposed thereon, allowing a casing pipe 125 to be mechanically coupled to an adjacent casing pipe 125 in an end-to-end configuration. The casing pipes 125 of the casing string 124 can be mechanically coupled to each other directly or using a coupling device, such as a coupling sleeve. The casing string 124 is not disposed in the entire wellbore 120. Often, the casing string 124 is disposed from approximately the surface 102 to some other point in the wellbore 120. The open hole portion 127 of the wellbore 120 extends beyond the casing string 124 at the distal end of the wellbore 120.

Each casing pipe 125 of the casing string 124 can have a length and a width (e.g., outer diameter). The length of a casing pipe 125 can vary. For example, a common length of a casing pipe 125 is approximately 40 feet. The length of a casing pipe 125 can be longer (e.g., 60 feet) or shorter (e.g., 10 feet) than 40 feet. The width of a casing pipe 125 can also vary and can depend on the cross-sectional shape of the casing pipe 125. For example, when the cross-sectional shape of the casing pipe 125 is circular, the width can refer to an outer diameter, an inner diameter, or some other form of measurement of the casing pipe 125. Examples of a width in terms of an outer diameter can include, but are not limited to, 7 inches, 7⅝ inches, 8⅝ inches, 10¾ inches, 13⅜ inches, and 14 inches.

The size (e.g., width, length) of the casing string 124 can be based on the information gathered using field equipment 130 with respect to the wellbore 120. The walls of the casing string 124 have an inner surface that forms a cavity 123 that traverses the length of the casing string 124. Each casing pipe 125 can be made of one or more of a number of suitable materials, including but not limited to stainless steel. In certain example embodiments, each casing pipe 125 is made of one or more of a number of electrically conductive materials.

A number of tubing pipes 115 that are coupled to each other and inserted inside the cavity 123 form the tubing string 114. The collection of tubing pipes 115 can be called a tubing string 114. The tubing pipes 115 of the tubing string 114 are mechanically coupled to each other end-to-end, usually with mating threads (a type of coupling feature). The tubing pipes 115 of the tubing string 114 can be mechanically coupled to each other directly or using a coupling device. Each tubing pipe 115 of the tubing string 114 can have a length and a width (e.g., outer diameter). The length of a tubing pipe 115 can vary. For example, a common length of a tubing pipe 115 is approximately 30 feet. The length of a tubing pipe 115 can be longer (e.g., 40 feet) or shorter (e.g., 10 feet) than 30 feet. Also, the length of a tubing pipe 115 can be the same as, or different than, the length of an adjacent casing pipe 125.

The width of a tubing pipe 115 can also vary and can depend on one or more of a number of factors, including but not limited to the target depth of the wellbore 120, the total length of the wellbore 120, the inner diameter of the adjacent casing pipe 125, and the curvature of the wellbore 120. The width of a tubing pipe 115 can refer to an outer diameter, an inner diameter, or some other form of measurement of the tubing pipe 115. Examples of a width in terms of an outer diameter for a tubing pipe 115 can include, but are not limited to, 7 inches, 5 inches, and 4 inches.

In some cases, the outer diameter of the tubing pipe 115 can be such that a gap exists between the tubing pipe 115 and an adjacent casing pipe 125. The walls of the tubing pipe 115 have an inner surface that forms a cavity that traverses the length of the tubing pipe 115. The tubing pipe 115 can be made of one or more of a number of suitable materials, including but not limited to steel.

At the distal end of the tubing string 114 within the wellbore 120 is a bottomhole assembly (BHA) 101. The BHA 101 can include a retrieval vessel 310. Alternatively, the retrieval vessel 310 can be further uphole and integrated with the tubing pipes 115 as part of the tubing string 114. The retrieval vessel 310 is used to obtain and retain a sample (a core) of the subterranean formation 110, either in the open hole portion 127 of the wellbore 120 or through the casing string 124, by cutting into the formation 110. The BHA 101 can also include one or more other components, including but not limited to one or more tubing pipes 115 and one or more stabilizers.

Figure 2:
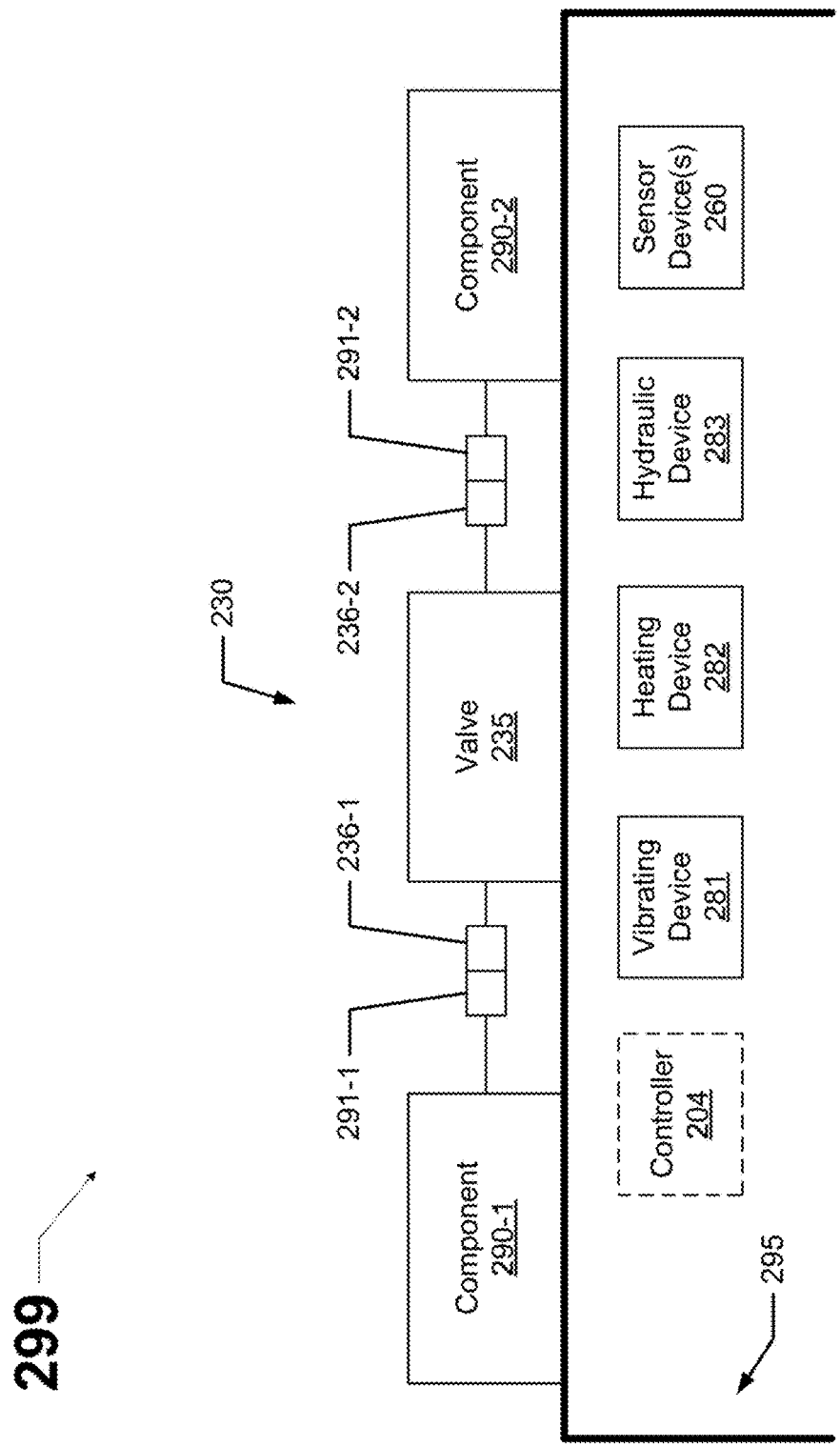
FIG. 2 shows a general tool system for transferring pressurized reservoir core samples in accordance with certain example embodiments.

FIG. 2 shows a general tool system 299 for transferring pressurized reservoir core samples in accordance with certain example embodiments. Referring to FIGS. 1 and 2, the system 299 of FIG. 2 includes a frame 295 upon which a valve assembly 230 (which includes a valve 235), a component 290-1, and another component 290-2 are mounted. As shown below, the valve assembly 230 can be mounted on a gimbal to enable a rotational degree of freedom that moves the valve assembly 230 and the components 290 coupled thereto to move between a vertical orientation and a horizontal orientation, where the vertical orientation helps facilitate the transfer of the subterranean core samples by way of gravitational loading. The valve 235 of the valve assembly 230 is coupled to and disposed between component 290-1 and component 290-2. Specifically, the valve 235 has two coupling features 236. Coupling feature 236-1 couples (directly or indirectly) to a coupling feature 291-1 of component 290-1, and coupling feature 236-2 couples (directly or indirectly) to a coupling feature 291-2 of component 290-2. These coupling features 236 and coupling features 291 can be, for example, one or more threaded apertures (into which one or more bolts can be inserted) or mating threads.

Component 290-1 and component 290-2 are interchangeable parts of the system 299. As such, the corresponding coupling features 291 are detachably coupled to the coupling features 236 of the valve 235. In the example systems described herein, a component 290 can be a retrieval vessel 310 (first appearing in FIGS. 3A through 3D), a linear actuator 320 (first appearing in FIGS. 3A through 3D), and a testing vessel 740 (first appearing in FIGS. 7A through 7D). Each of these components 290 can include any of a number of modifications (e.g., addition of an adapter) to allow the component 290 to become detachably coupled to the valve 235. The various components 290 are moved and/or replaced during different steps in the process of transferring pressurized subterranean core samples from the retrieval vessel 310 to the testing vessel 740.

Before, during, and after the transfer of the core samples from the retrieval vessel 310 to the testing vessel 740, the core samples are maintained at a substantially equivalent pressure or placed under a higher pressure relative to the pressure of the subterranean formation from which the core samples are taken. By doing so, the subsequent testing, conducted on the core samples while they are disposed within the testing vessel 740 under pressure, and the corresponding test results may be more accurate (e.g., more representative of reservoir conditions). For example, embodiments consistent with the present disclosure may be utilized for characterizing the core samples and their fluid contents, both while at the initial received pressure and during the depressurization process.

Furthermore, embodiments consistent with the present disclosure may be utilized for characterizing core samples that have been recovered and maintained at elevated pressure and/or temperature. In certain embodiments, the core samples have been maintained at the original reservoir pressure and/or temperature, so that there are minimal or no structural changes to the samples, and/or minimal or no changes to the composition and phase of the fluids contained in the samples. In certain embodiments, the core samples have been maintained at representative conditions. In certain example embodiments, representative conditions may refer to when the core samples have been maintained at an elevated pressure and/or temperature that is/are representative of the original reservoir pressure and/or temperature, such that the fluids contained in the core samples have not undergone a phase transition (e.g., at a bubble point or dew point) and the fluid contents of the samples remain representative of reservoir conditions. Additionally, in certain example embodiments, representative conditions may refer to the structure of the core samples having changed less than if the pressure and/or temperature had been allowed to reach ambient conditions. In some embodiments, a non-miscible fluid, such as a fluorocarbon, has been deployed surrounding the samples in the first vessel to further minimize changes to the composition of the fluids contained in the samples due to a pressure decrease from the reservoir to the surface.

The valve 235 can be any type of valve, including but not limited to a ball valve, a plug valve, a pinch valve, and a gate valve. The valve 235 can be linear (as in this case) so that component 290-1 and component 290-2 are axially aligned and accessible to each other through the valve 235 when the valve 235 is an a fully open position. The valve 235 can be operated manually (e.g., using a handle) or automatically (e.g., using the optional controller 204). The valve 235 can have a fully open position, a closed position, and any of a number of partially open positions. The valve 235 can be substantial enough in structure to withstand the high pressures (e.g., 5000 psi, 10000 psi) at which the pressurized subterranean core samples are typically maintained.

The system 299 can also include one or more of a number of other devices. For example, the system 299 can include one or more sensor devices 260, a vibrating device 281, a heating device 282, a hydraulic device 283, and an optional controller 204. A sensor device can include any type of sensor that measures one or more parameters. Examples of types of sensor devices 260 can include, but are not limited to, a fluid flow meter, a pressure sensor, an air flow monitor, a torque sensor, a gas detector, and a resistance temperature detector. Examples of a parameter that is measured by a sensor device 260 can include, but are not limited to, a temperature, a level of gas, a level of humidity, a flow rate, and a pressure wave. Measurements taken by a sensor device 260 can be delivered to the optional controller 204 for processing.

A heating device 282 can provide a controlled amount of heat to one or more parts of the system 299. For example, when component 290-2 is retrieval vessel 310 filled with pressurized reservoir core samples (also called pressurized subterranean core samples herein), the heating device 282 can apply heat to the retrieval vessel 310 to make at least some of the fluid contents of the retrieval vessel 310 less viscous and help initiate and propagate movement of the core samples out of the retrieval vessel 310 to the testing vessel 740. The heating device 282 can be controlled manually or by the optional controller 204.

The vibrating device 281 is configured to apply vibrations to one or more parts of the system 299. For example, when component 290-1 is retrieval vessel 310 filled with pressurized reservoir core samples (also called pressurized subterranean core samples, subterranean core samples, or core samples herein) and reservoir fluids, the vibrating device 281 can apply vibrational mechanical energy to the retrieval vessel 310 to help initiate and propagate movement of the core samples out of the retrieval vessel 310 to the testing vessel 740. The vibrating device 281 can be controlled manually or by the optional controller 204 to any required frequency of vibration.

The hydraulic device 283 is designed to control the pressure within one or more parts of the system 299. The hydraulic device 283 can include one or more pieces of equipment, including but not limited to a motor, a compressor, a pump, piping, fittings, and tubing. The hydraulic device 283 can be used to equalize and maintain a sampling pressure of the core samples within the retrieval vessel 310 or the testing vessel 740. The hydraulic device 283 can also be used to fill and pressurize fluid within a part (e.g., the testing vessel 740 before receiving the core samples) of the system 299.

The optional controller 204 can be used to control some or all of the system 299. For example, the controller 204 can control the heating device 282, a motor (e.g., for the vibrating device 281, for the hydraulic device 283), and/or another other component of the system 299. The controller 204 can include one or more of a number of components. Such components can include, but are not limited to, an electrical motor (e.g., stepper, servo), torque sensor feedback, a control engine, a communication module, a timer, an energy metering module, a power module, a hardware processor, memory, a transceiver, an application interface, an energy storage device, one or more switches, a storage repository, and a security module. The controller 204 can correspond to a computer system as described below with regard to FIG. 23. The components shown in FIG. 2 are not exhaustive, and in some embodiments, one or more of the components shown in FIG. 2 may not be included in an example system 299. Any component of the example system 299 can be discrete or combined with one or more other components of the system 299.

The frame 295 can be any type of suitable structure having any of a number of features and/or components to facilitate all steps in the process of transferring pressurized subterranean core samples from the retrieval vessel 310 to the testing vessel 740. For example, in addition to allowing for the replacement of components 290, the frame 295 can allow for the movement (e.g., rotation) of one or more components 290 and/or the valve assembly 230 (including portions thereof). For example, the frame 295 can include a gimbal (e.g., gimbal 331 shown in FIGS. 3A through 3D below) to which the valve assembly 230 is coupled, allowing the valve assembly 230 to rotate.

Figure 3A:
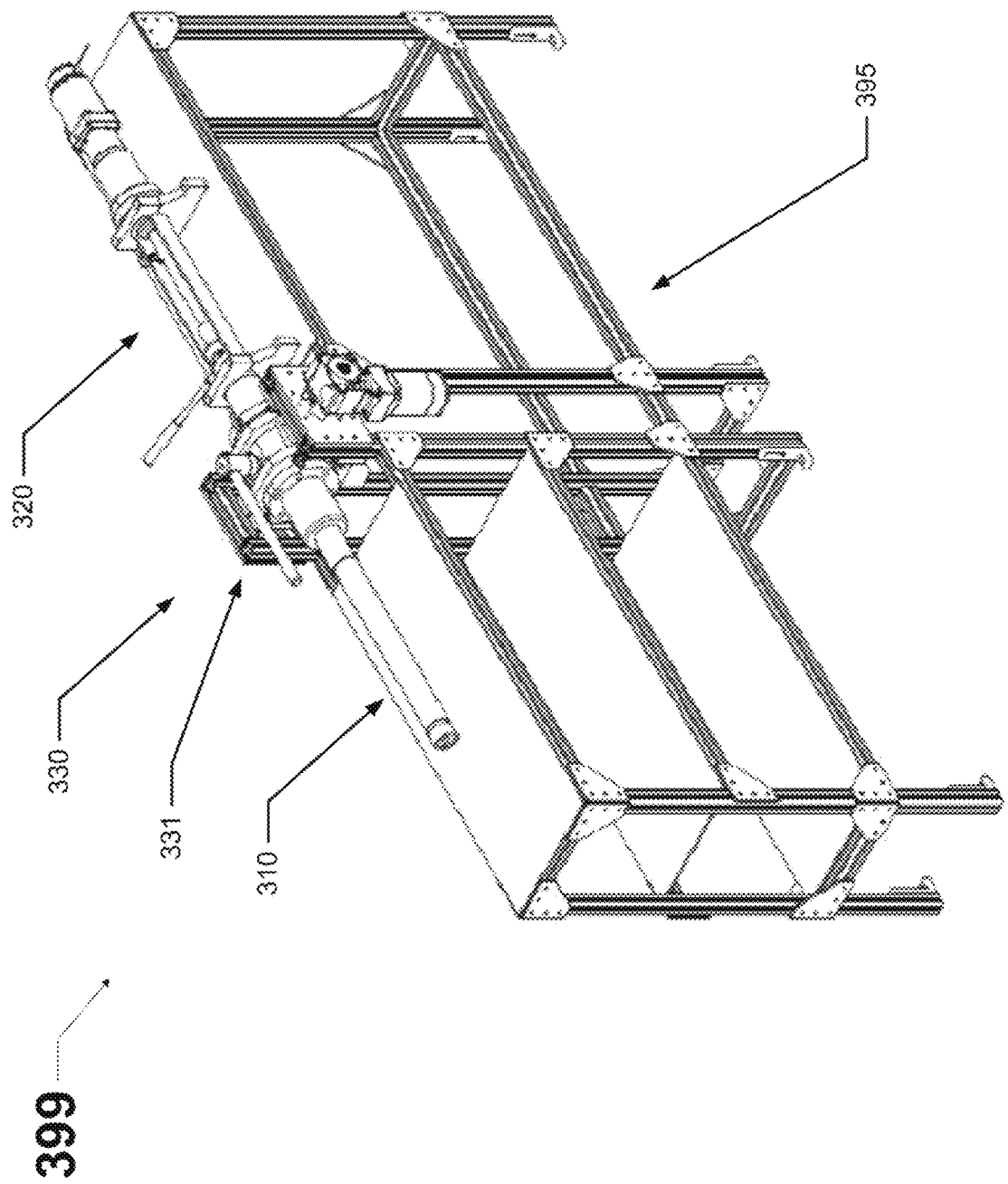
FIGS. 3A through 3D show various views of a tool system for transferring pressurized reservoir core samples at a point in time in accordance with certain example embodiments.
Figure 3B:
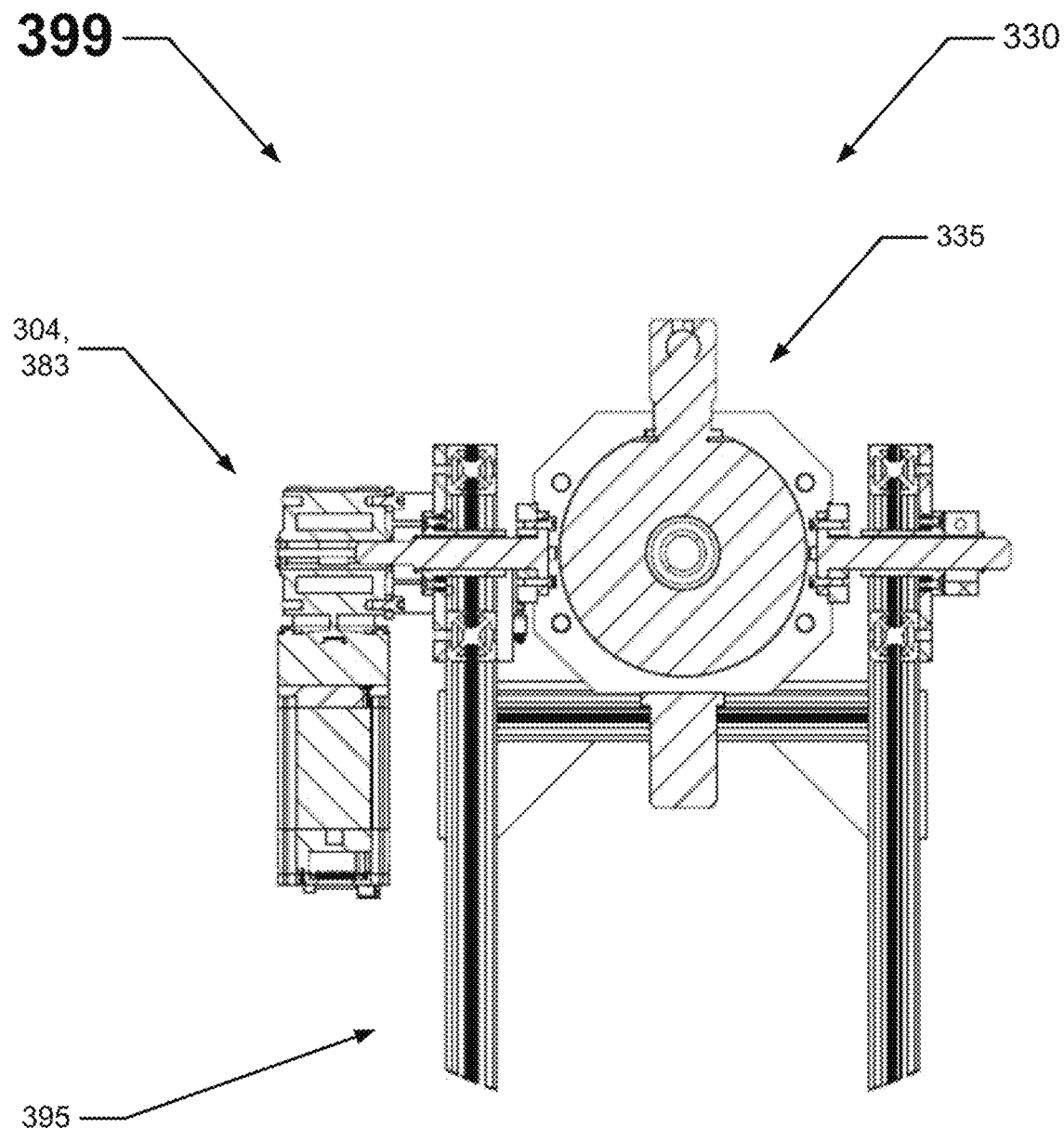
Figure 3C:
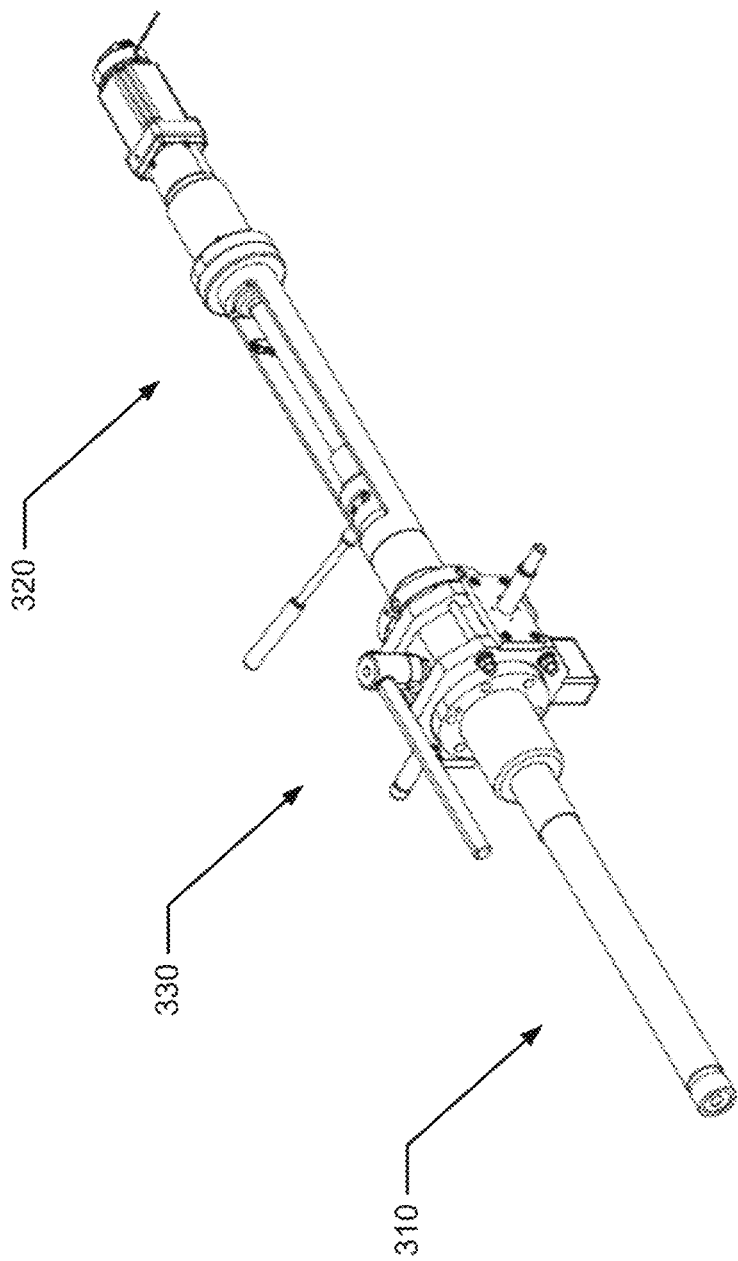
Figure 3D:
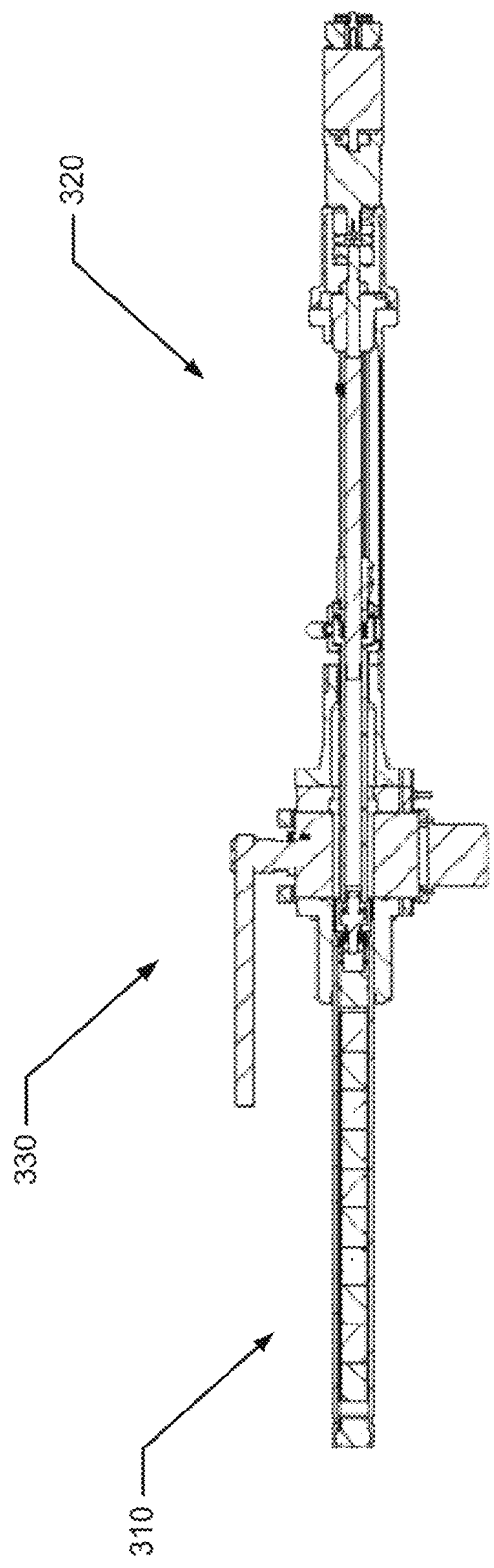

FIGS. 3A through 3D show various views of a tool system 399 for transferring pressurized reservoir core samples at a point in time in accordance with certain example embodiments. Specifically, FIG. 3A shows an isometric perspective view of the system 399. FIG. 3B shows a cross-sectional front view of the system 399. FIG. 3C shows an isometric perspective view of an assembly of the retrieval vessel 310, the valve assembly 330 (which includes a valve 335), and the linear actuator 320. FIG. 3D shows a cross sectional side view of the assembly of FIG. 3C. Referring to FIGS. 1 through 3D, the parts (e.g., the frame 395, the valve assembly 330) of the system 399 of FIGS. 3A through 3D are substantially the same as the corresponding parts of the system 299 of FIG. 2 above. Also, the configuration of the system 399 of FIGS. 3A through 3D is a configuration of the system 299 shown in FIG. 2.

The system 399 also includes a controller 304 and a hydraulic device 383, as shown in FIG. 3B. A gear-actuated gimbal system 331 can be utilized to enable a rotational degree of freedom which can rotate the valve assembly 330 from a horizontal to a vertical orientation to help facilitate transfer of core samples by way of gravitational loading. The gimbal system 331 can be manually or electrically actuated (e.g., by a gearmotor) and controlled (e.g., by the controller 304). Since the retrieval vessel 310 and the linear actuator 320 are detachably coupled to the valve 335 of the valve assembly 330, the retrieval vessel 310 and the linear actuator 320 are considered components (e.g., components 290). The retrieval vessel 310 is designed to collect and/or house one or more pressurized subterranean core samples and reservoir fluids taken from the sidewall of a wellbore. The retrieval vessel 310 is removed from a BHA or general core retrieval tooling for use in the example system 399. The retrieval vessel 310 is known in the art. The retrieval vessel 310 may be constructed of magnetic and/or metallic material. As a result, it is not possible to test the pressurized subterranean core samples disposed within the retrieval vessel 310 using technologies such as NMR. Example embodiments of the system may be designed to transfer the subterranean core samples under the same pressure to a testable vessel, which in this case has a non-metallic and/or non-magnetic measurement zone (e.g., shown as measurement zone 761 in FIG. 7A below) within the linear actuator 320.

The linear actuator 320 is configured to perform one or more functions associated with removing pressure barriers (e.g., a plug, a spring, a piston head) from the retrieval vessel 310 while maintaining the high sampling pressure within the retrieval vessel 310. In this case, the linear actuator 320 works through the valve 335 when the valve 335 is in a fully open (or near fully open) position. In certain example embodiments, the linear actuator 320 is designed to integrate one or more tools (e.g., a spring extractor, piston removal device) that are used to prepare or otherwise internally access the retrieval vessel 310 and/or the testing vessel 740 for the transfer of pressurized subterranean core samples while maintaining initial pressure of the retrieval vessel 310. Details of an example linear actuator 320 are provided below with respect to FIG. 4.

Figure 4:
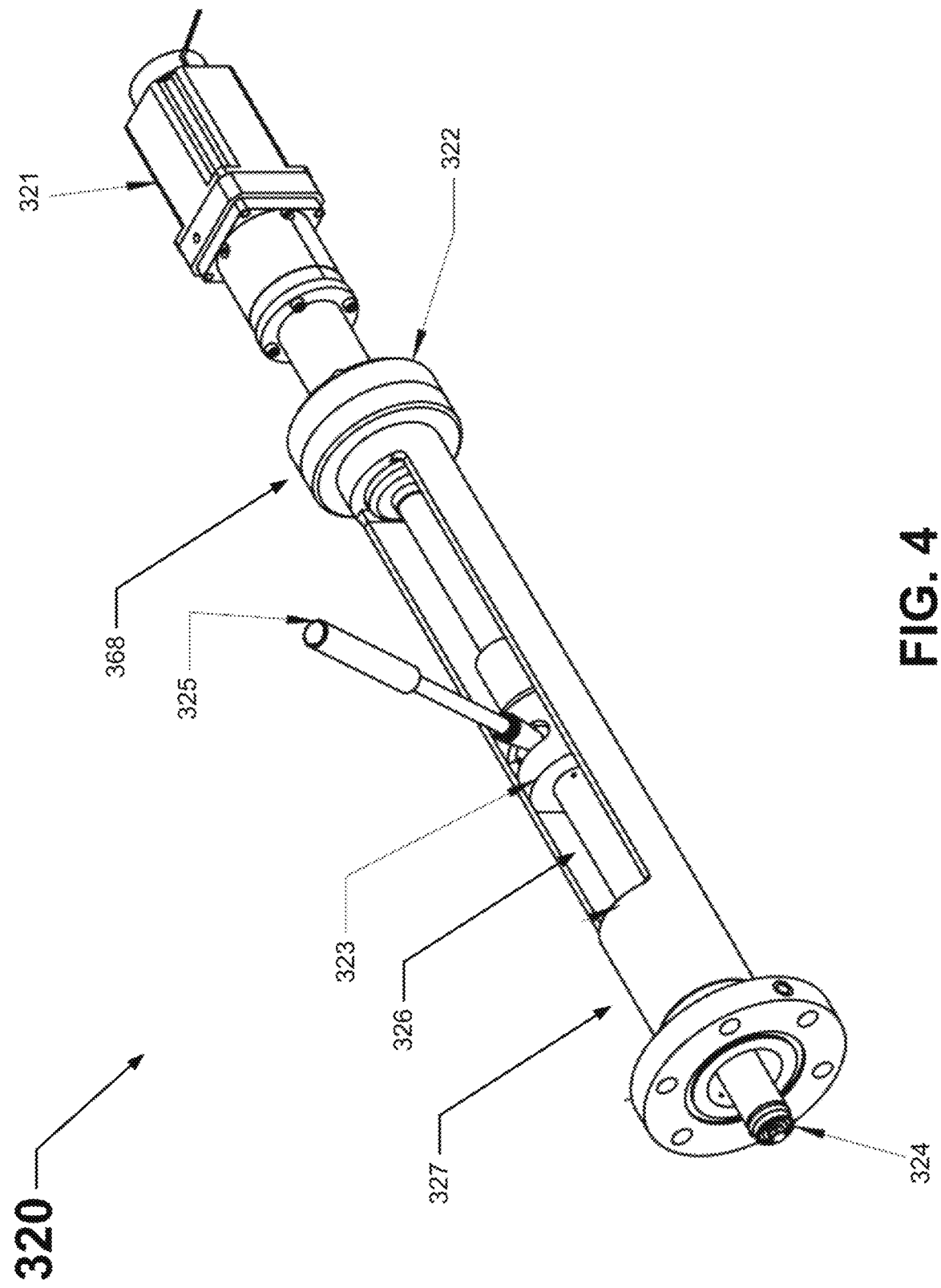
FIG. 4 shows a linear actuator in accordance with certain example embodiments.

FIG. 4 shows a linear actuator 320 in accordance with certain example embodiments. Referring to FIGS. 1 through 4, the linear actuator 320 can include one or more of a number of components having one or more of a number of configurations. For example, in this case, the linear actuator 320 includes a housing 327, an actuator rod 326, a handle 325, a retaining sleeve 323, a plug removal head 324, a torque meter 368 (a type of sensor device 260), a gearmotor mount 322, and a motor 321. As used herein, the term linear actuator should not be used literally. For example, in some alternative embodiments, the actuator can be non-linear. Rather, the linear actuator 320 should be defined for its purpose, which is to facilitate preparing the retrieval vessel 310 and the testing vessel 740 for the transfer of subterranean core samples while maintaining the sampling pressure at which the core samples were taken.

Figure 5A:
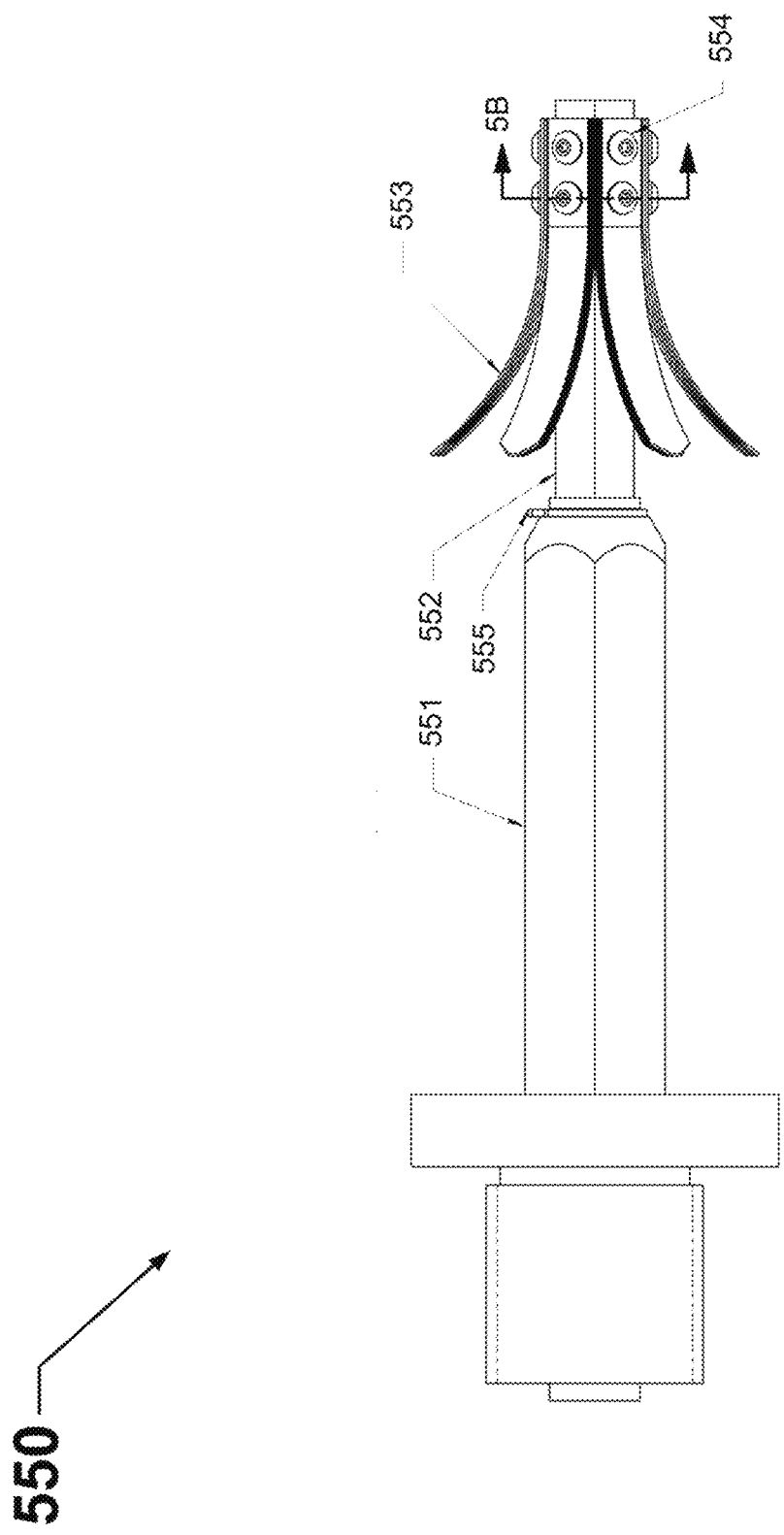
FIGS. 5A through 5C show various views of an extractor in accordance with certain example embodiments.
Figure 5B:
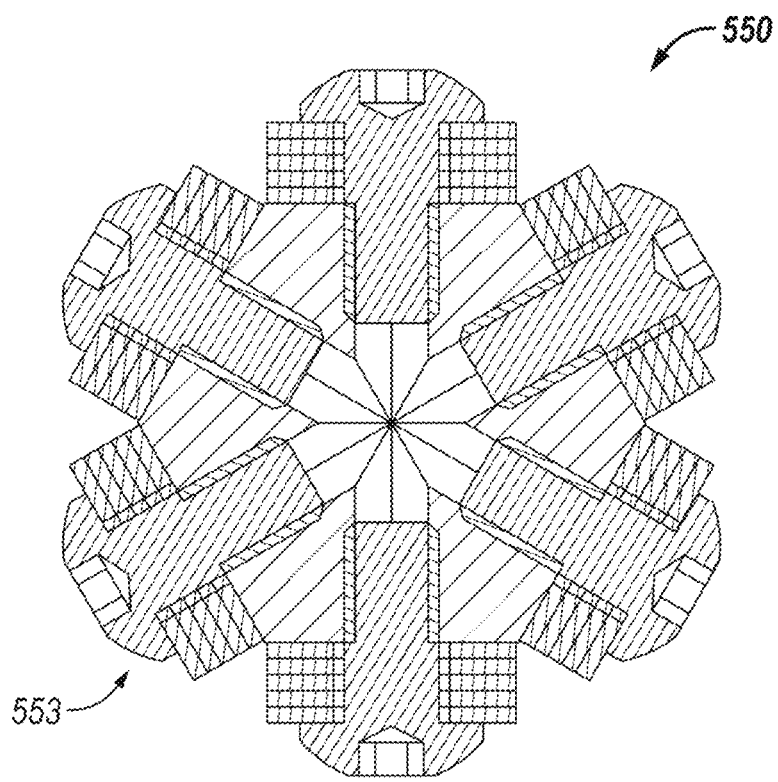
Figure 5C:
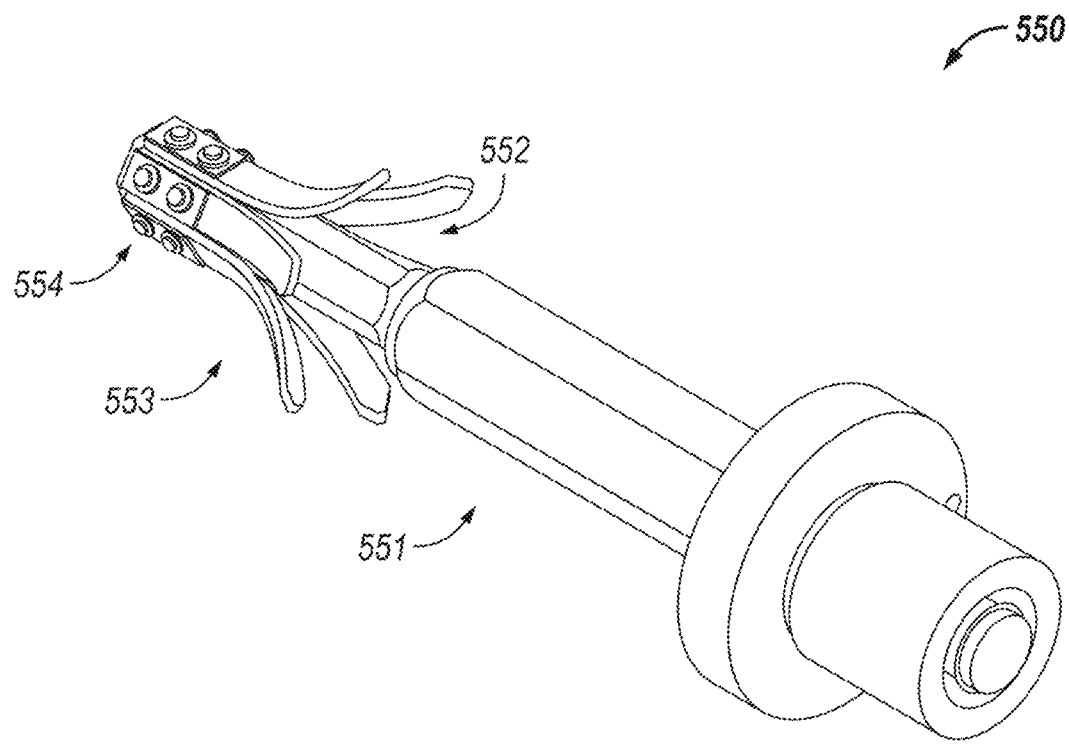

FIGS. 5A through 5C show various views of an extractor 550 in accordance with certain example embodiments. Specifically, FIG. 5A shows a side view of the extractor 550. FIG. 5B shows a front view of the extractor 550. FIG. 5C shows a top-side-rear perspective view of the extractor 550. Referring to FIGS. 1 through 5C, as discussed above, the linear actuator 320 is designed to integrate with one or more ancillary tools, one of which is the extractor 550. For example, the extractor 550 can be used by the linear actuator 320 to extract a spring and plug, both of which are used to maintain the pressure within the retrieval vessel 310. The extractor 550 can include one or more of a number of components having one or more of a number of configurations. For example, in this case, the extractor 550 can include a plug removal head 551, an extractor shaft 552, multiple curved extractor springs 553, multiple fastening devices 554 to secure the curved extractor springs 553 to the extractor shaft 552, and a retaining ring 555. The extractor 550 functions to remove any pressure boundaries and associated components (e.g., threaded plugs, springs) of the retrieval vessel 310 so that access to the core samples for transfer is realized.

Figure 6:
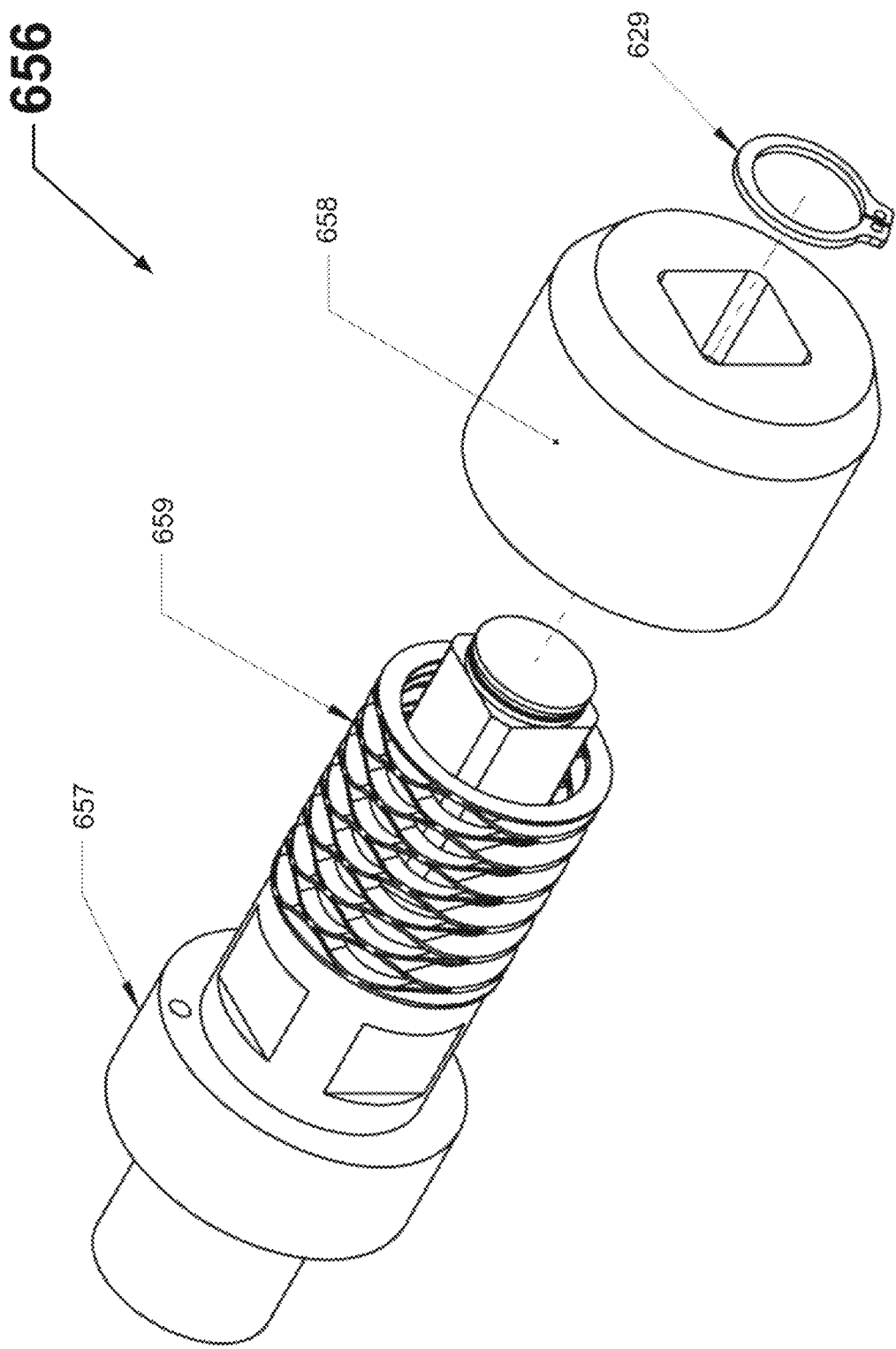
FIG. 6 shows a piston head removal assembly in accordance with certain example embodiments.

FIG. 6 shows a piston head removal assembly 656 in accordance with certain example embodiments. Referring to FIGS. 1 through 6, as discussed above, the linear actuator 320 is designed to integrate with one or more ancillary tools, one of which is the piston head removal assembly 656. For example, the piston head removal assembly 656 can be used by the linear actuator 320 to extract a piston head, which is also used, along with the spring and plug, to maintain the pressure within the retrieval vessel 310. The extractor 550 can include one or more of a number of components having one or more of a number of configurations. For example, in this case, the piston head removal assembly 656 can include a shaft 657, an interface 658, a stacked wave disc spring 659, and a retaining ring 629.

Figure 7A:
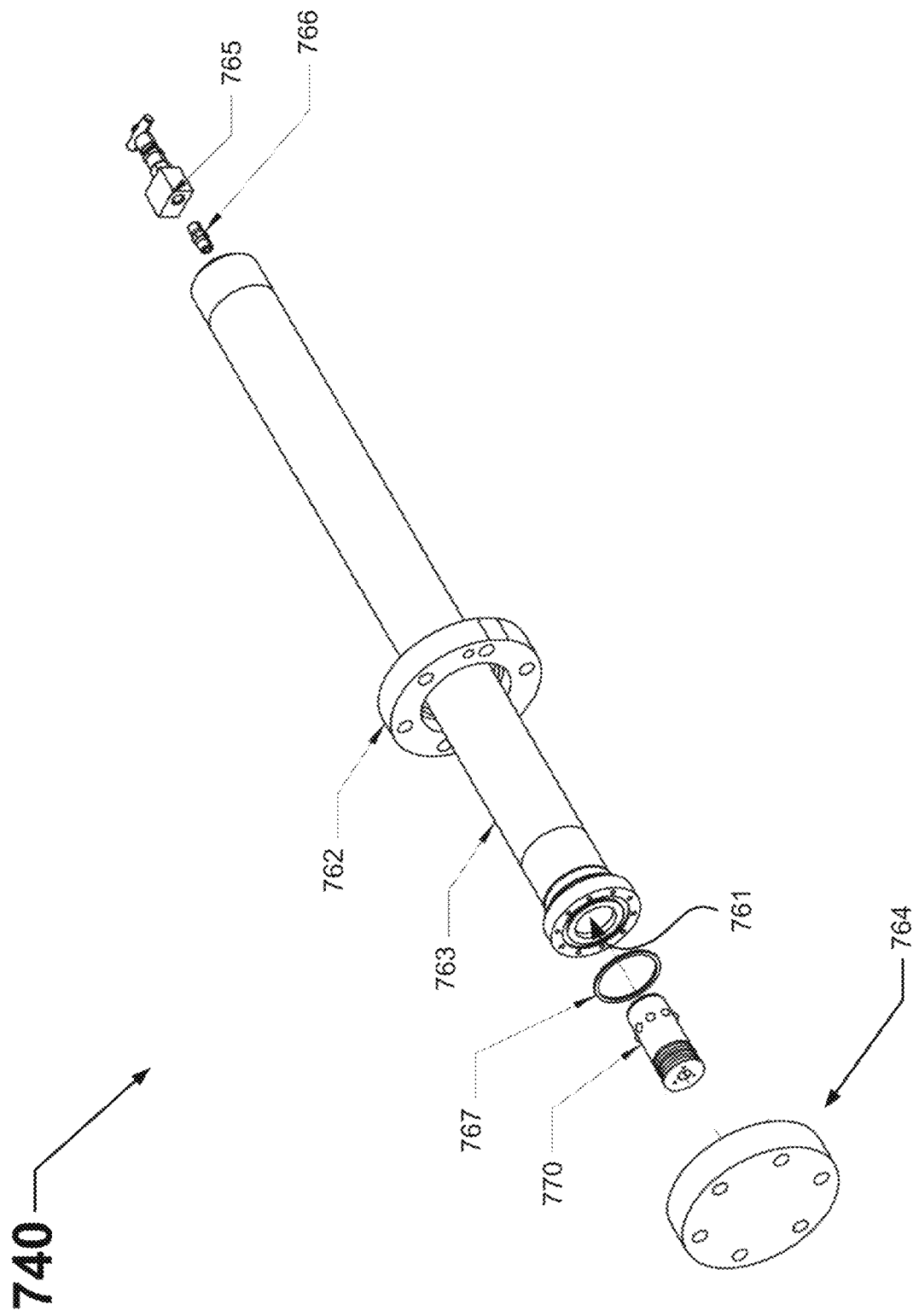
FIGS. 7A through 7D show various views of a testing vessel assembly in accordance with certain example embodiments.
Figure 7B:
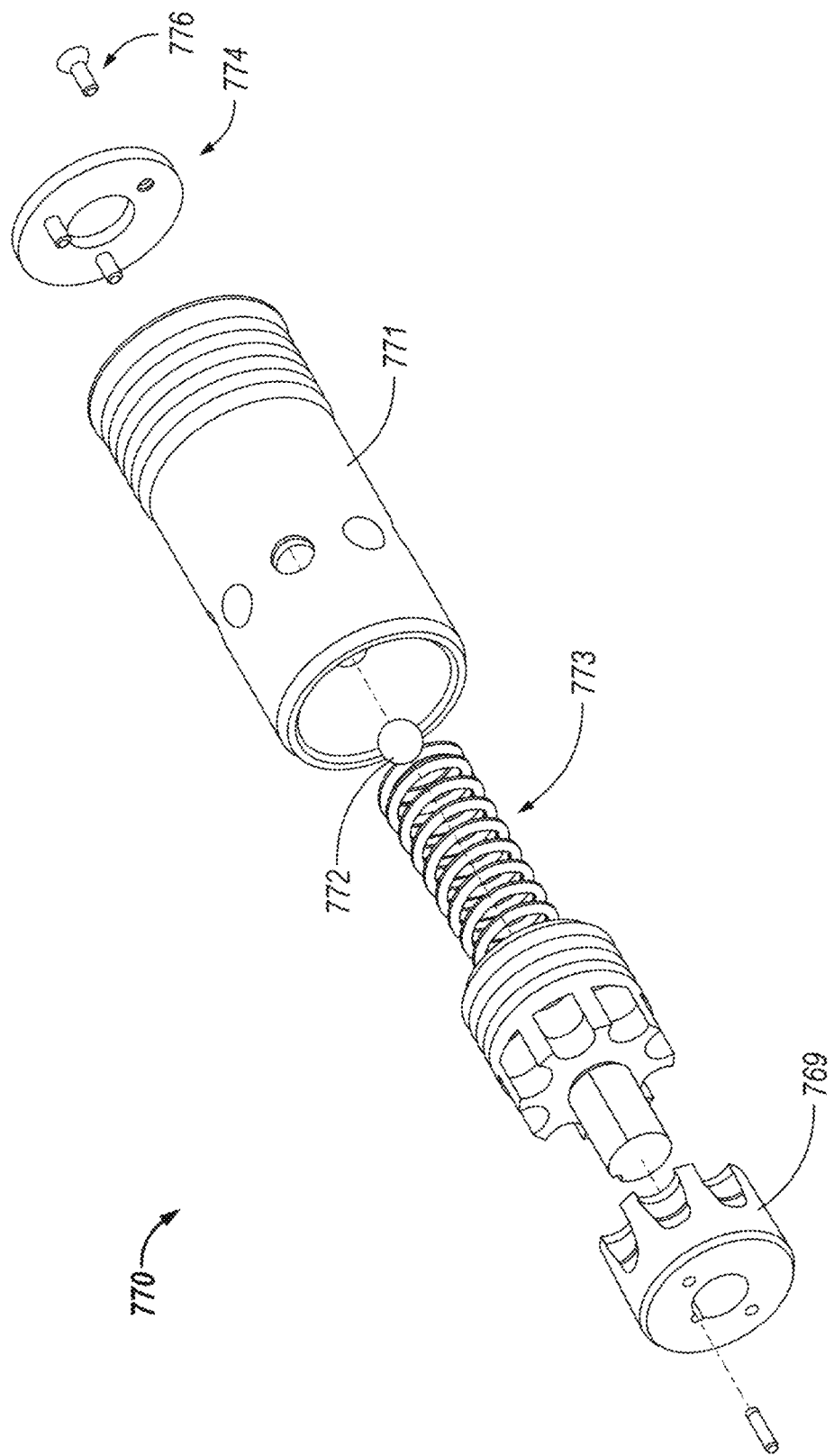
Figure 7C:
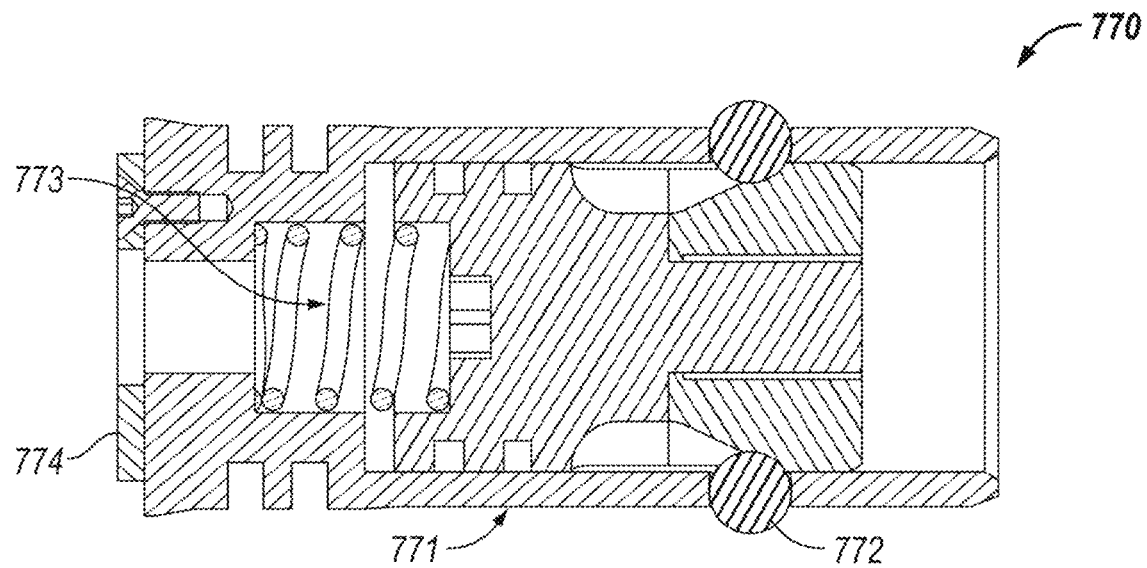
Figure 7D:
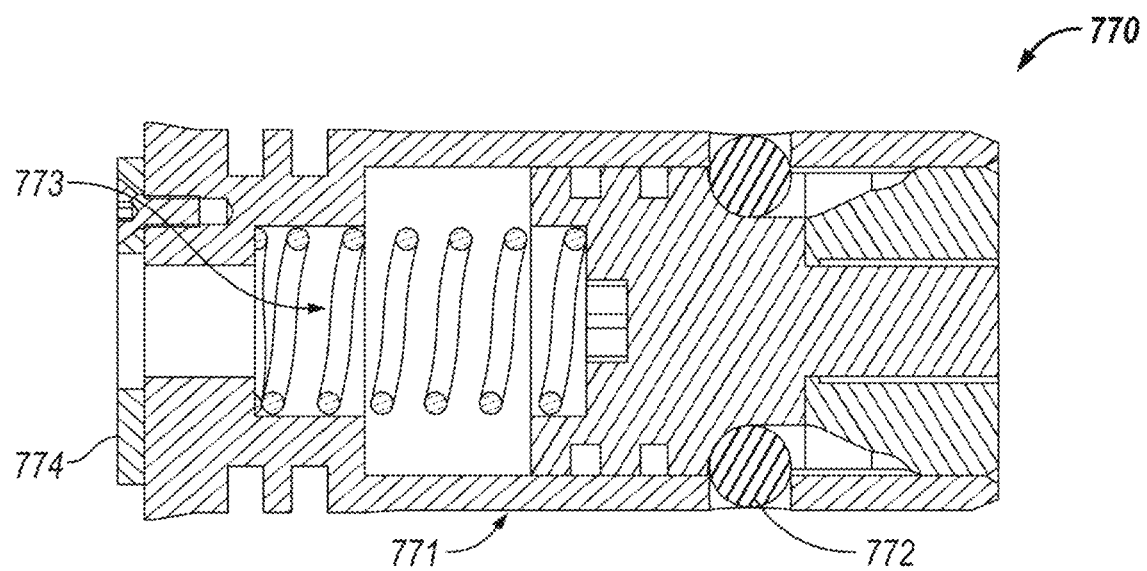

FIGS. 7A through 7D show various views of a testing vessel assembly 740 in accordance with certain example embodiments. Specifically, FIG. 7A shows an exploded isometric view of the testing vessel assembly 740. FIG. 7B shows an exploded isometric view of a testing vessel plug 770 of the testing vessel assembly 740. FIG. 7C shows a cross-sectional side view of the testing vessel plug 770 in a pressurized (closed) condition. FIG. 7D shows a cross-sectional side view of the testing vessel plug 770 in an un-pressurized (open) condition.

Referring to FIGS. 1 through 7D, the testing vessel assembly 740 of FIG. 7A is configured to provide a measurement zone 761 or region within a housing 763 that maintains the subterranean core samples at the sampling pressure while being made of materials (non-magnetic material, non-metallic material) that have a low background signal when subjected to some of the testing technologies (e.g., NMR) used to test subterranean core samples. As defined herein, a low background signal may be equal to or less than 1% of the originating signal from the sample measured during the process. The value may be verified by internal lab measurements to calibrate the system prior to operation. In certain embodiments, the measurement zone 761 defined within the housing 763 of the testing vessel 740 is the region of the testing vessel 740 and the volume contained within that region that may be measured by a test when the testing vessel 740 is appropriately placed in or otherwise subjected to a test instrument.

In certain embodiments, the measurement zone 761 of the testing vessel 740 also includes the region of the testing vessel 740 and the volume contained within that region that may influence a test, for instance, by negatively interfering with the test even when not directly measured when the testing vessel 740 is appropriately placed in or subjected to a test instrument. In certain embodiments, the measurement zone 761 of the testing vessel 740 is the region where the subterranean core samples are housed within testing vessel 740. In certain embodiments, the measurement zone 761 of the testing vessel 740 is the region where the subterranean core samples are housed within testing vessel 740, in addition to about an inch away from the end subterranean core samples. In certain example embodiments, the measurement zone 761 of the testing vessel 740 is the region where the subterranean core samples are housed within the testing vessel 740, in addition to about two inches away from the end subterranean core samples.

The testing vessel assembly 740 can include one or more of a number of components having one or more of a number of configurations. For example, in this case, the testing vessel assembly 740 includes a joint flange 762, the housing 763, the testing vessel plug 770, a blank flange 764, a vent valve 765, a nipple fitting 766, and a face seal 767. The testing vessel assembly 740 can be called by other names, such as a testing vessel 740 and a fiber overwrap vessel assembly 740.

As an example, the testing vessel assembly 740 can be constructed using a fiber overwrap design. In such a case, the construction can involve wrapping low/no noise resin and fiber material around a non-metallic and/or non-magnetic tube to provide structural integrity. The testing vessel assembly 740 (or at least portions thereof that form the measurement zone 761) can be designed for low/no noise while also being able to maintain the same or higher pressure present in the retrieval vessel. As another example, the testing vessel assembly 740 can be constructed using a low/no noise glass/thermoplastic composite to construct the measurement zone 761 of the testing vessel assembly 740.

As used herein, no noise materials may refer to materials that give no signal in a test performed on the testing vessel assembly 740. In certain example embodiments, low noise materials may refer to materials that give an acceptably small signal in a test performed on the testing vessel assembly 740, that do not interfere with or otherwise obscure the signal given in the test by the core samples contained in the measurement zone 761 of the testing vessel assembly 740.

The testing vessel assembly 740 can include metallic flanged ends structurally integrated into the non-metallic center portion (e.g., the measurement zone 761) of the testing vessel assembly 740. The metallic ends facilitate incorporation of flanges for attachment to the valve 335 and also facilitate threading for pressure fittings and fasteners. In some cases, the flanged end caps are made of titanium (e.g., non-ferrous, non-magnetic metal).

Similarly, the testing vessel plug 770 of the testing vessel 740 is configured to, when used with the housing 928 of FIGS. 9A and 9B below, plug and seal the cavity of the testing vessel 740 to maintain a pressure (e.g., a sampling pressure) within the testing vessel 740. The core samples in the measurement zone 761 of the testing vessel 740 are maintained at a substantially equivalent pressure or placed under a higher pressure during the transfer of the one or more subterranean core sample from the retrieval vessel 310 to the testing vessel 740. By doing so, the testing and corresponding test results on the subterranean core samples can be more accurate (e.g., more representative of reservoir conditions). For example, embodiments consistent with the present disclosure may be utilized for characterizing the subterranean core samples and their fluid contents, both while at the initial received pressure (called the sampling pressure herein) and during the depressurization process. Furthermore, embodiments consistent with the present disclosure may be utilized for characterizing subterranean core samples that have been recovered and maintained at elevated pressure and/or temperature.

In certain embodiments, the subterranean core samples have been maintained at the original reservoir pressure (sampling pressure) and/or temperature, so that there are minimal or no structural changes to the subterranean core samples, and/or minimal or no changes to the composition and phase of the fluids contained in the subterranean core samples. In certain example embodiments, representative conditions may refer to when the subterranean core samples have been maintained at an elevated pressure and/or temperature that is/are representative of the original reservoir pressure and/or temperature, such that the fluids contained in the subterranean core samples have not undergone a phase transition (e.g., at a bubble point or dew point) and the fluid contents of the subterranean core samples remain representative of reservoir conditions.

Additionally, in certain embodiments, representative conditions may refer to the structure of the subterranean core samples having changed less than if the pressure and/or temperature had been allowed to reach ambient conditions. The testing vessel plug 770 can include one or more of a number of components having one or more of a number of configurations. For example, in this case, the testing vessel plug 770 includes a plug piston assembly 769, a housing 771, multiple retaining balls 772, a compression spring 773, an attachment ring 774, and multiple fastening devices 776 (e.g., screws).

The testing vessel plug 770 is designed so that it incorporates no threaded interfaces as to keep the inner bore of the testing vessel 740 as smooth and obstruction free as possible. A smooth bore increases the likelihood that the core samples will be transferred unencumbered by any irregular bore features. The testing vessel plug 770 functions on the principal of differential pressure, whereby once the testing vessel plug 770 is in place and external pressure is released, the resulting differential pressure shifts the plug piston assembly 769. The shift in the plug piston assembly 769 causes the retaining balls 772 to be forced radially outward into a corresponding retaining feature (groove) on the inner surface of the housing 763 where they are secured and able to react the internal pressure loading.

The testing vessel plug 770 is removed by releasing the internal pressure of the testing vessel 740, thereby eliminating the differential pressure bias. The compression spring 773 returns the piston of the plug piston assembly 769 to an inactive state. FIGS. 7C and 7D depict the articulation of the testing vessel plug 770 where FIG. 7C depicts an activated plug with an internally biased pressure differential and FIG. 7D is shown inactivated with no pressure bias. Internal pressure is referenced as to the right of the testing vessel plug 770 depicted on FIGS. 7C and 7D and is external to the left with sealing grooves depicted in the center of the outer diameter of the testing vessel plug 770.

Figure 8A:
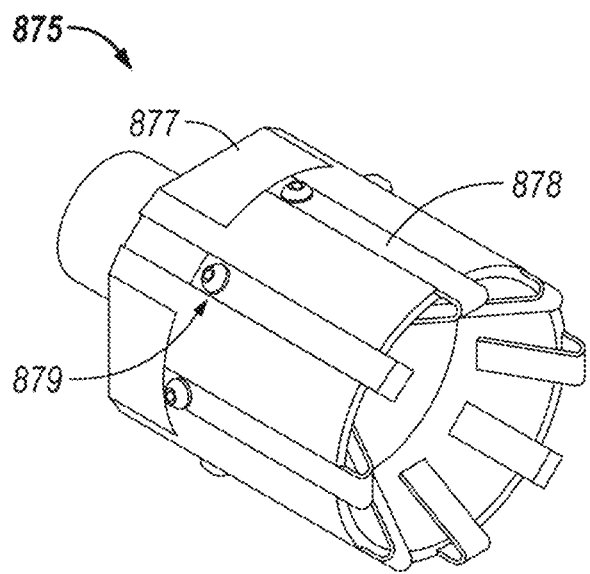
FIGS. 8A through 8C show various views of a spring extractor assembly in accordance with certain example embodiments.
Figure 8B:
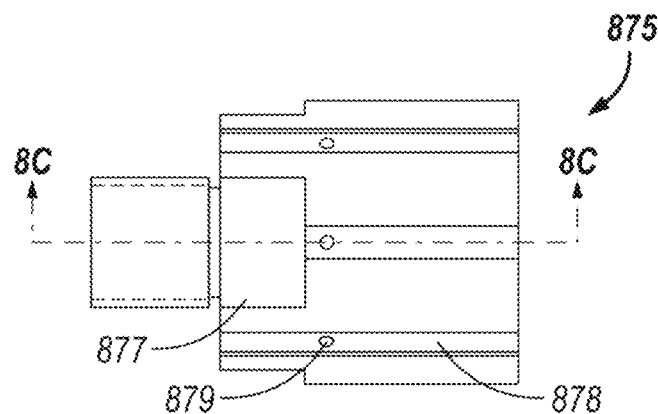
Figure 8C:
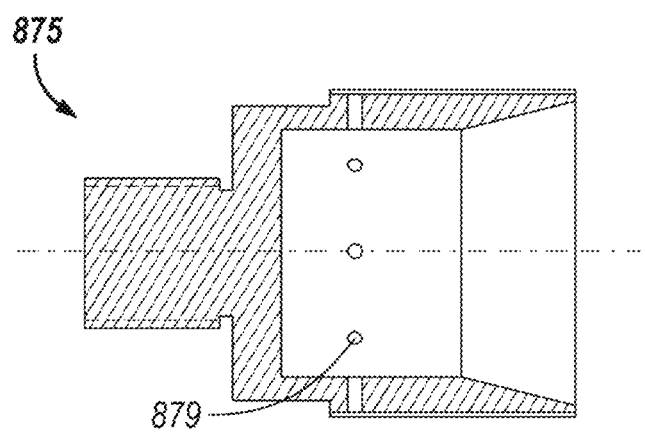

FIGS. 8A through 8C show various views of a spring extractor assembly 875 in accordance with certain example embodiments. Specifically, FIG. 8A shows an isometric perspective view of the spring extractor assembly 875. FIG. 8B shows a side view of the spring extractor assembly 875. FIG. 8C shows a cross-sectional side view of the spring extractor assembly 875. Referring to FIGS. 1 through 8C, as discussed above, the linear actuator 320 is designed to integrate with one or more ancillary tools, one of which is the spring extractor assembly 875. For example, the spring extractor assembly 875 is a device that can be used as a substitute for part of the extractor 550 for removing the spring within the retrieval vessel 310. The spring extractor assembly 875 can include one or more of a number of components having one or more of a number of configurations. For example, in this case, the spring extractor assembly 875 includes multiple spring remover heads 877 that each covers a bottom part of some of the leaf extractor springs 878, and where each leaf extractor spring 878 is secured to a housing by a fastening device 879 (e.g., a screw). The spring extractor assembly 875 is designed to be inserted over a compression spring that can be an integral component of the retrieval vessel. Leaf extractor springs 878 deflect as they are inserted over the compression spring, allowing insertion, however hook into and hold onto the spring during retraction/removal.

Figure 9A:
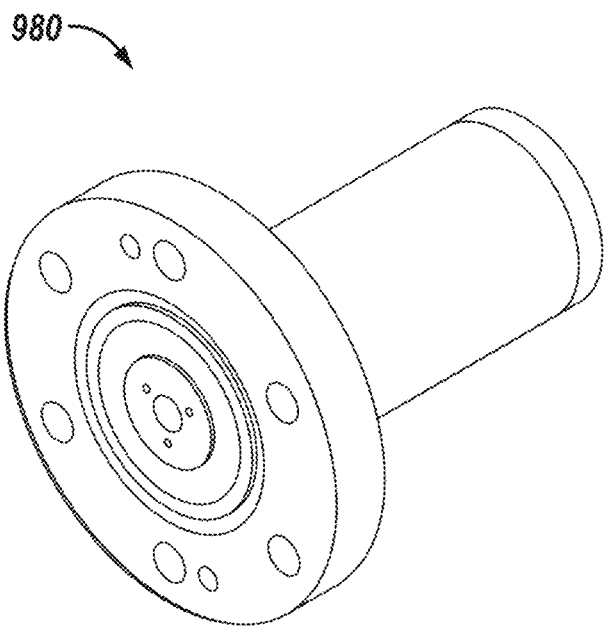
FIGS. 9A and 9B show various views of a testing vessel plug assembly in accordance with certain example embodiments.
Figure 9B:
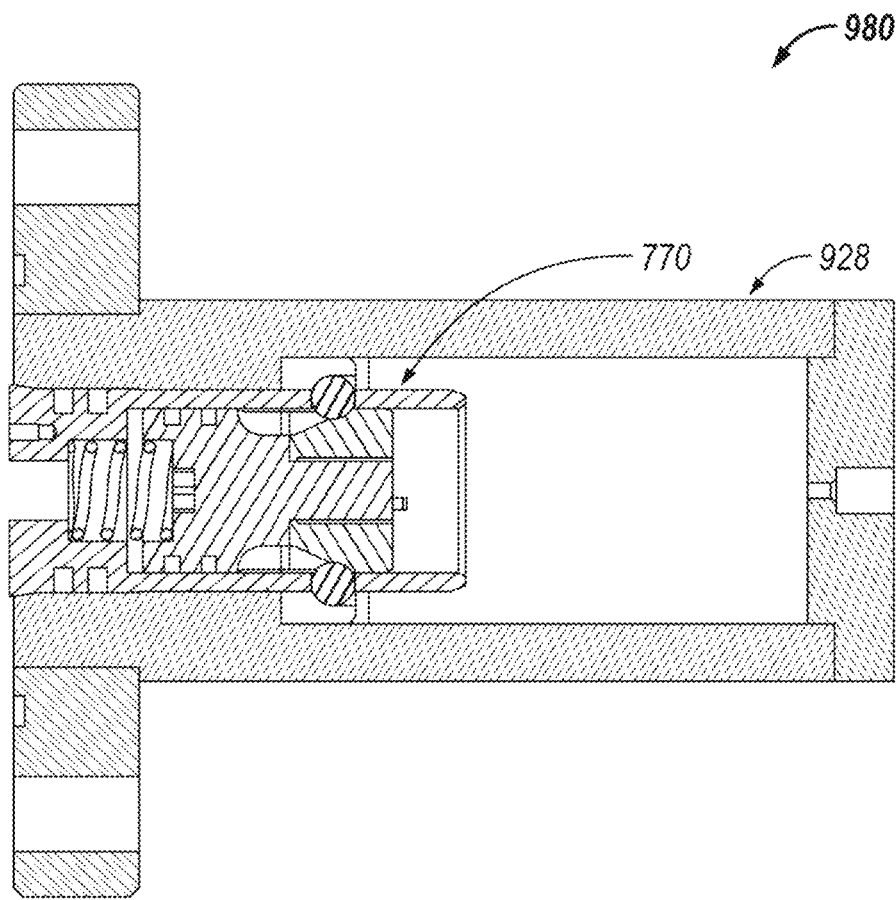

FIGS. 9A and 9B show various views of a testing vessel plug assembly 980 in accordance with certain example embodiments. Specifically, FIG. 9A shows an isometric perspective view of the testing vessel plug assembly 980. FIG. 9B shows a cross-sectional side view of the testing vessel plug assembly 980. Referring to FIGS. 1 through 9B, the testing vessel plug assembly 980 is configured to plug and seal the cavity of the testing vessel 740 to maintain a pressure (e.g., a sampling pressure) within the testing vessel 740. The testing vessel plug assembly 980 can include one or more of a number of components having one or more of a number of configurations. For example, in this case, the testing vessel plug assembly 980 includes the testing vessel plug 770 disposed in a housing 928.

Figure 10A:
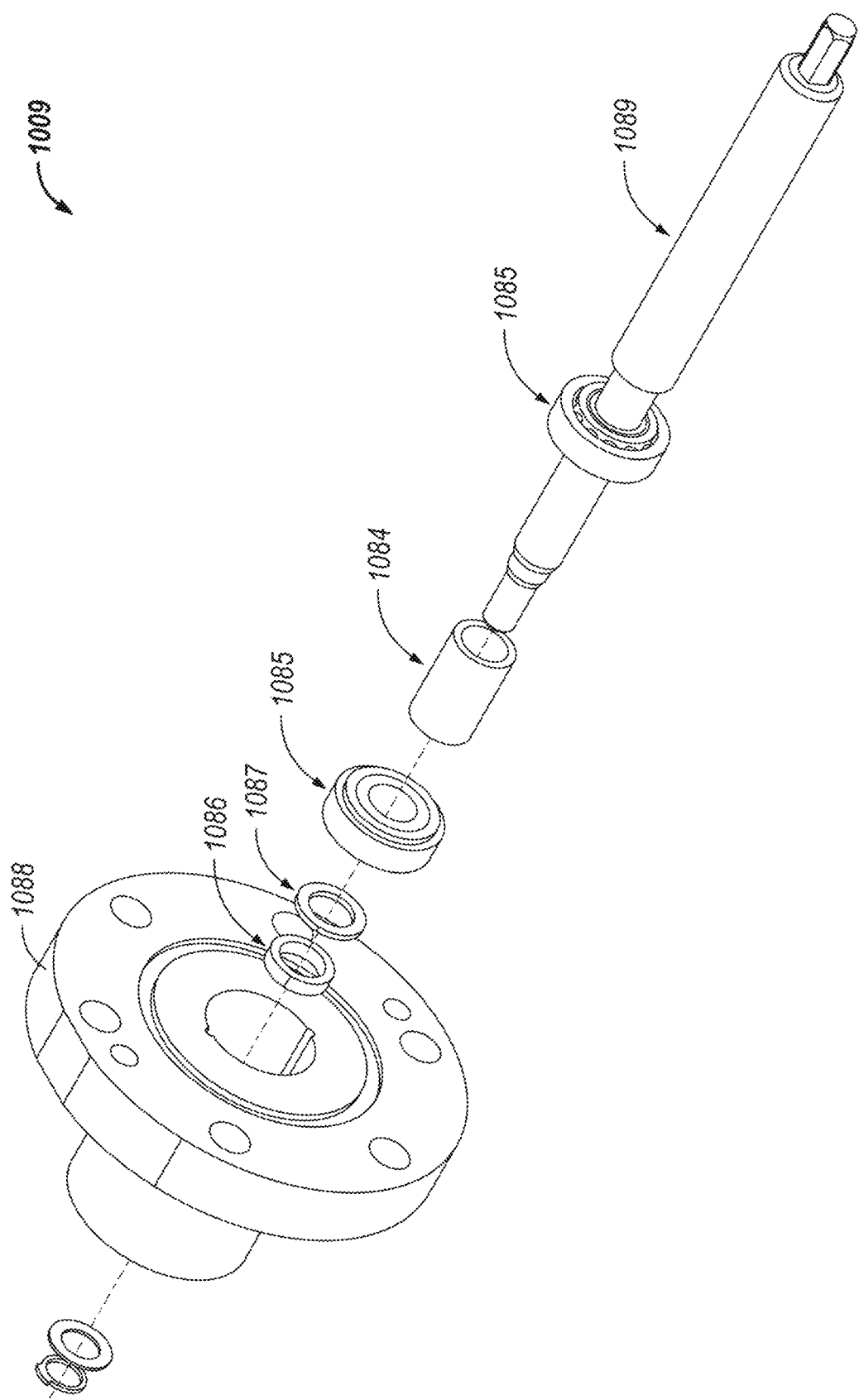
FIGS. 10A and 10B show various views of a plug breaker assembly in accordance with certain example embodiments.
Figure 10B:
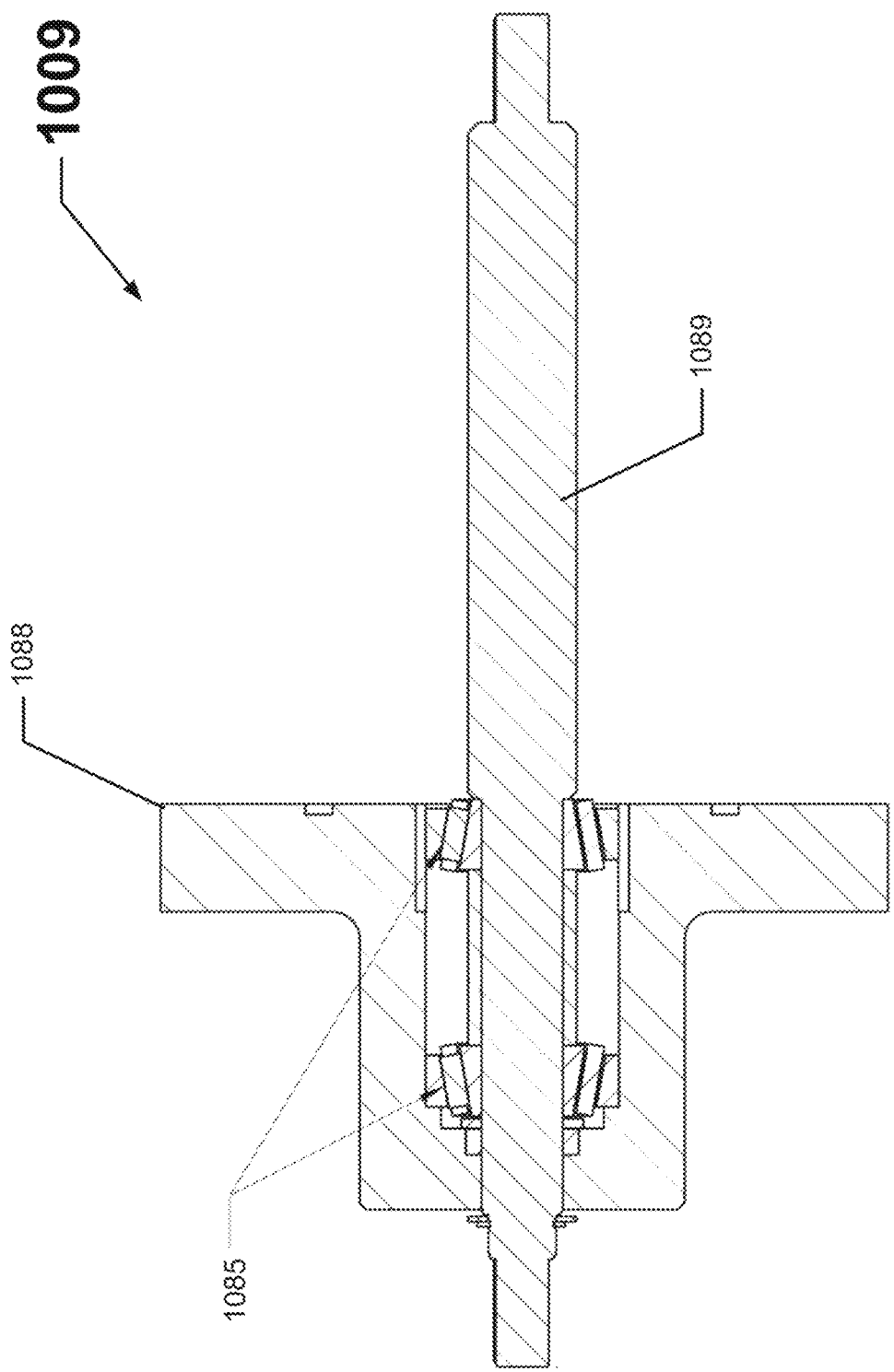

FIGS. 10A and 10B show various views of a plug breaker assembly 1009 in accordance with certain example embodiments. Specifically, FIG. 10A shows a bottom-side-top perspective view of the plug breaker assembly 1009. FIG. 9B shows a cross-sectional side view of the plug breaker assembly 1009. Referring to FIGS. 1 through 10B, the plug breaker assembly 1009 is configured to break down and/or remove at least one of the pressure barrier components within the retrieval vessel (e.g., retrieval vessel 310). The plug breaker assembly 1009 is able to apply higher torque loads than the linear actuator 320 to remove higher preloaded threaded pressure barriers such as large threaded plugs. The plug breaker assembly 1009 can include one or more of a number of components having one or more of a number of configurations. For example, in this case, the plug breaker assembly 1009 includes a flange 1088, a shaft 1088, a sleeve 1084, two tapered roller bearings 1085, a rotary seal 1086, and brass shim 1087.

Figure 11:
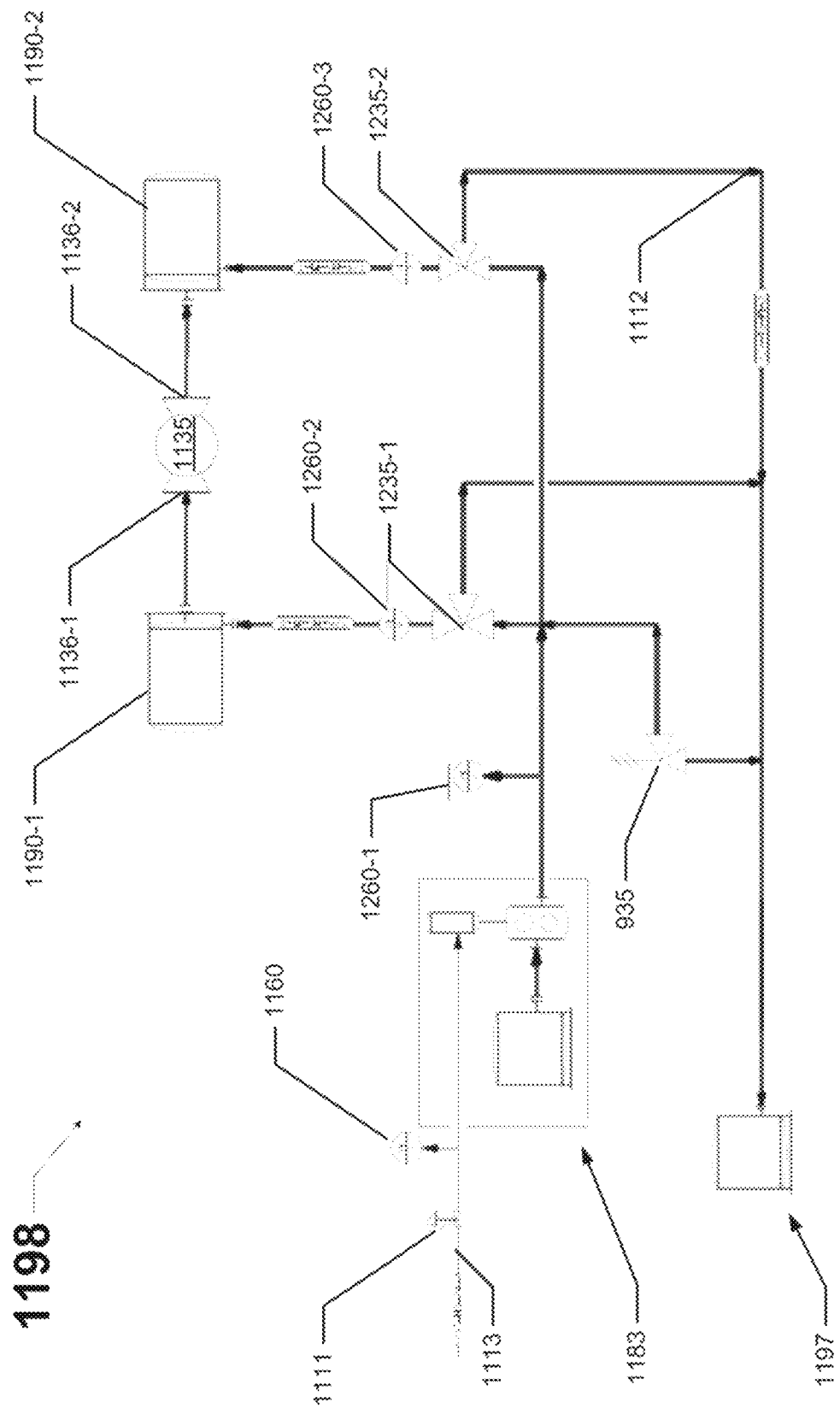
FIG. 11 shows a schematic of a tool system in accordance with certain example embodiments.
Figure 12A:
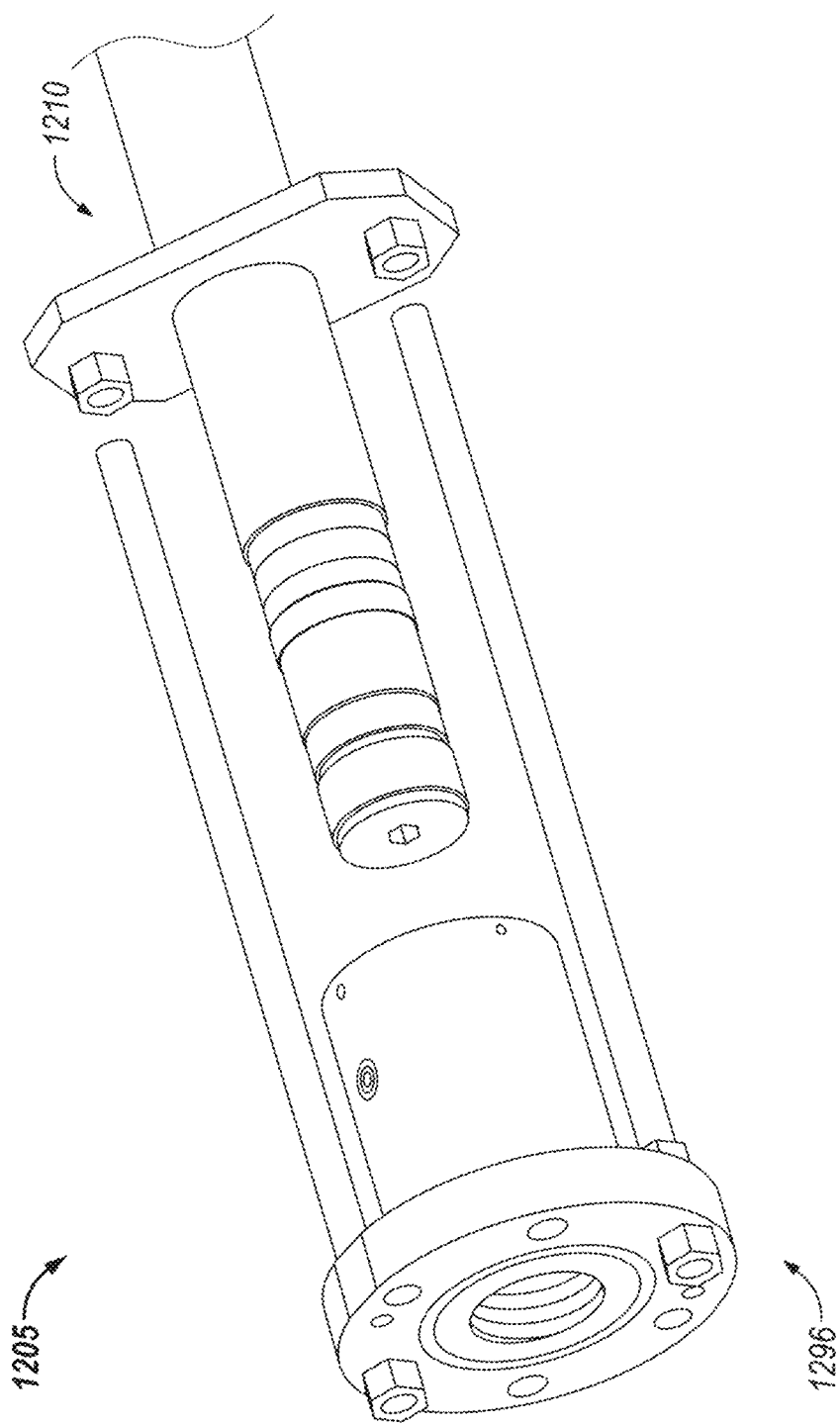
FIGS. 12A through 21 show a method for transferring pressurized reservoir core samples in accordance with certain example embodiments.
Figure 12B:
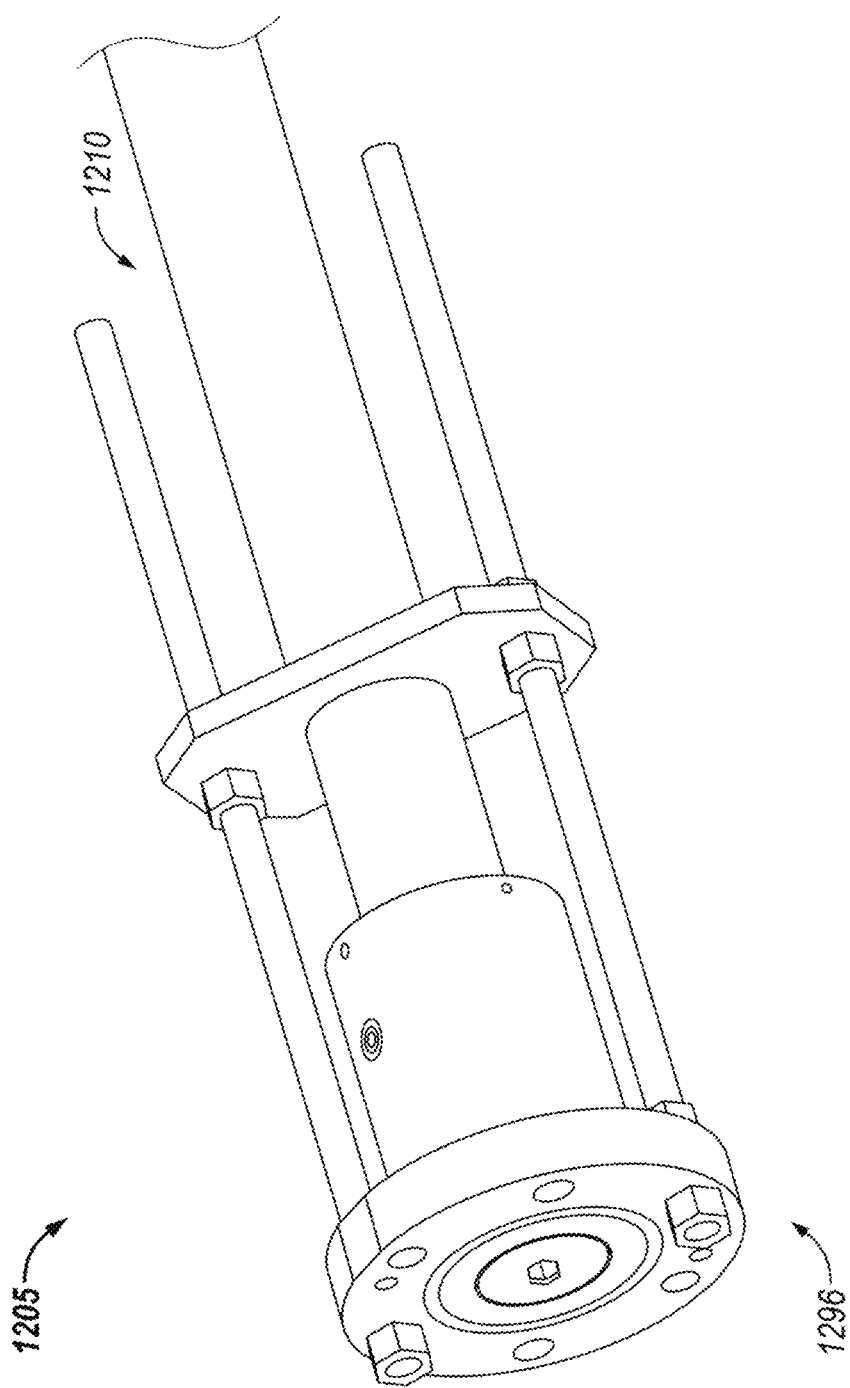

FIG. 11 shows a schematic piping and instrumentation diagram drawing 1198 of a tool system in accordance with certain example embodiments. Referring to FIGS. 1 through 11, the schematic drawing 1198 shows the piping configuration of an example tool system. The various parts (e.g., the valve 1135, the components 1190, the hydraulic device 1183) of the schematic drawing 1198 of FIG. 11 are substantially the same as the corresponding parts of the figures discussed above. In this case, piping 1113 feeds air through a regulator 1111 and measured by a sensor device 1160 in the form of a pressure gauge to part of the hydraulic device 1183, which in this case is an air-driven hydraulic pump. The hydraulic device 1183 outputs pressurized fluid (e.g., fluorinert up to 6000 psi) through a number of hydraulics lines 1112 as measured by a sensor devices 1260-1, 1260-2, and 1260-3 each in the form of a pressure gauge.

The pressurized fluid from the hydraulic device 1183 is distributed to component 1190-1 through a valve 1235-1 in the form of a three-way valve when the valve 1235-1 is open and to an excess fluid catch tank 1197 when the valve 1235-1 is closed. Simultaneously, the pressurized fluid from the hydraulic device 1183 is distributed to component 1190-2 through a valve 1235-2 in the form of a three-way valve when the valve 1235-2 is open and to the excess fluid catch tank 1197 when the valve 1235-2 is closed. The fluid flowing through the open valve 1235-1 to component 1190-1 is measured by sensor device 1260-2 in the form of a pressure gauge, and the fluid flowing through the open valve 1235-2 to component 1190-2 is measured by sensor device 1260-3 in the form of a pressure gauge.

Components 1190-1 and 1190-2 are equivalent to components 290-1 and 290-2 of FIG. 2. Similarly, valve 1135 of FIG. 11 is equivalent to valve 235 of FIG. 2. As the case with FIG. 2, the valve 1135 is mechanically and detachably coupled to component 1190-1 using coupling feature 1136-1 and to component 1190-2 using coupling feature 1136-2. Valve 1135 in this case is a ball valve. There is also a valve 935 in the form of a pressure relief integrated with the hydraulic lines 1112 between the output of the hydraulic device 1183 and the excess fluid catch tank 1197.

FIGS. 12A through 21 show various stages for transferring pressurized reservoir core samples in accordance with certain example embodiments. Referring to FIGS. 1 through 21, FIGS. 12A and 12B show a step 1205 in the process where an adapter flange 1296 is installed on the end of the retrieval vessel 1210. Prior to this point in time (prior to step 1205), the retrieval vessel 1210 (also sometimes called a core vault) is removed from a BHA or general core retrieval tool. Tests should be performed to ensure that the subterranean core samples are still pressurized and/or to determine the level of pressurization required to transfer the core samples to the testing vessel 740. Any devices of FIGS. 12A through 21 can be substantially the same as the corresponding devices of FIGS. 1 through 11.

In step 1205, the adapter flange 1296 is placed about the end (e.g., the pressure tube) of the retrieval vessel 1210. Moderate resistance can be caused by the seal compression. When enough axial force is applied to compress the initial radial seal, the screw threads of the two long screws can be engaged. After the threads of the screws of the adapter flange 1296 have engaged, the retrieval vessel 1210 can be rotated/threaded and fully seated in position within the adapter flange 1296. The fully seated position can be verified when the cap of the retrieval vessel 1210 is recessed by a certain amount from the face of the adapter flange 1296. To secure the adapter flange 1296 to the retrieval vessel 1210, a number of set screws can be provided and torqued to a certain amount. In some cases, a user may mark a reference line on the tube/flange interface of the retrieval vessel 1210 to visually indicate any relative movement during the process.

Figure 13:
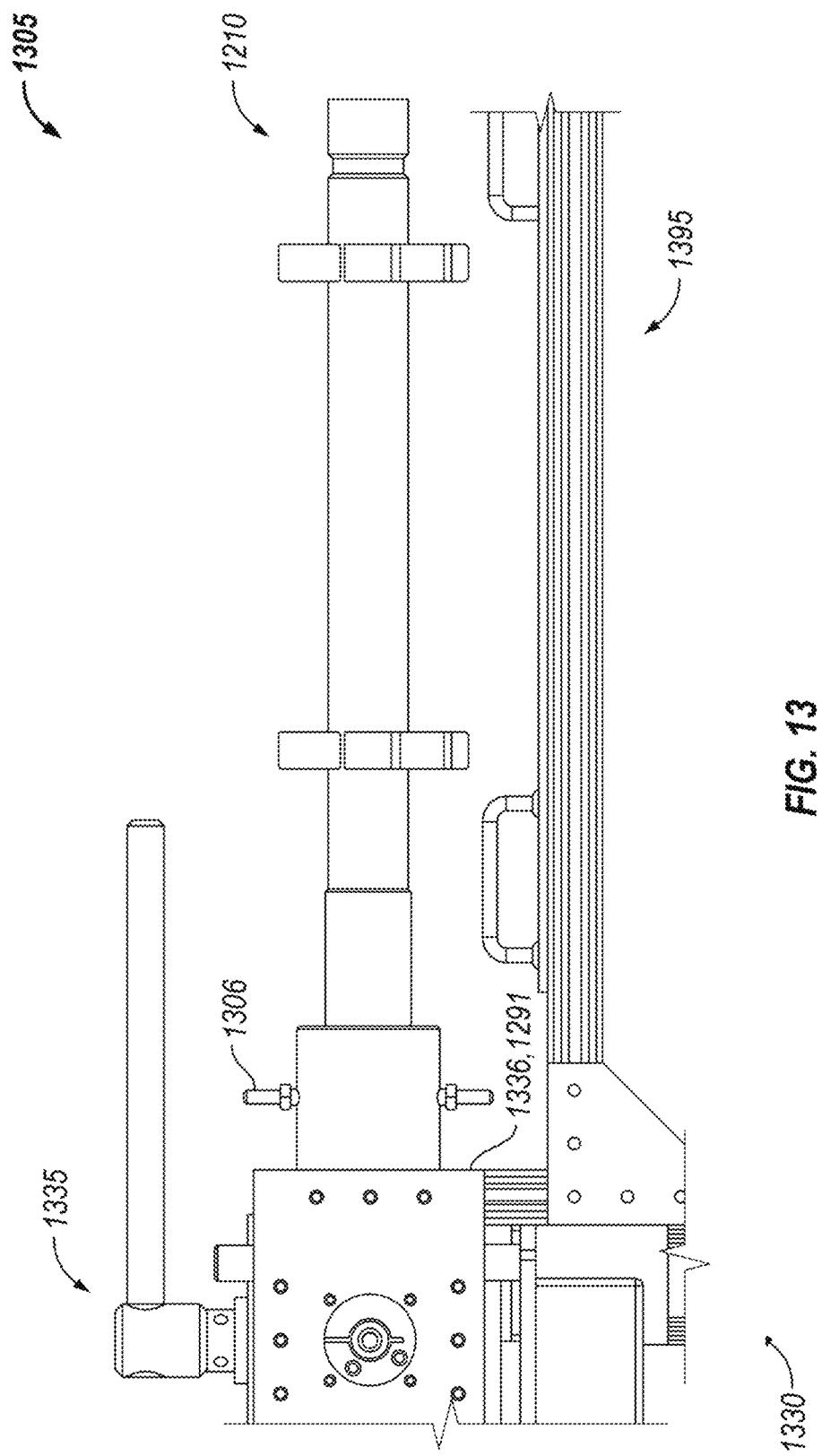

In step 1305, shown in FIG. 13 and some period of time after step 1205, hydraulic lines are installed to access and equalize to the internal pressure of the retrieval vessel 1210. Here, the retrieval vessel 1210 is coupled to the valve 1335 of the valve assembly 1330 using coupling features 1336 of the valve 1335 (in this case, a ball valve) and coupling features 1291 of the retrieval vessel 1210. The valve assembly is mounted on a frame 1395. The combined retrieval vessel 1210 and adapter flange 1296 is connected to the valve 1335 using bolts (or other fastening devices), which act as the coupling features 1336 of the valve 1335. A high pressure line is then connected to the lower port of the adapter flange (not shown in FIG. 13).

A user can then vent the upper port 1306 and pressurize the retrieval vessel 1210, adapter flange 1296, and valve 1335 with a hydraulic device (e.g., hydraulic device 1183 in the form of an air driven pump) until fluid trickles from the upper port, which removes all air from the internal adapter flange. At that point, a user can close the upper port and pressurize the combined volume to match the internal volume of the retrieval vessel 1210 using the hydraulic device and one or more valves (e.g., pressure relief valve 935 of FIG. 11). Using a tool (e.g., a long reach allen wrench) that extends through the open valve 1335, the tool can be used to open the access valve hex located on the retrieval vessel 1210. For example, by rotating the access valve hex counter-clockwise 1-1.5 full turns, the access valve hex will open. Once open, the pressures will equalize, thereby gaining access to the internal pressure of the core chamber of the retrieval vessel 1210 while a hydraulic device (e.g., hydraulic device 1183) maintains pressure. FIG. 13 also shows at least 2 pressure ports 1306.

Figure 14:
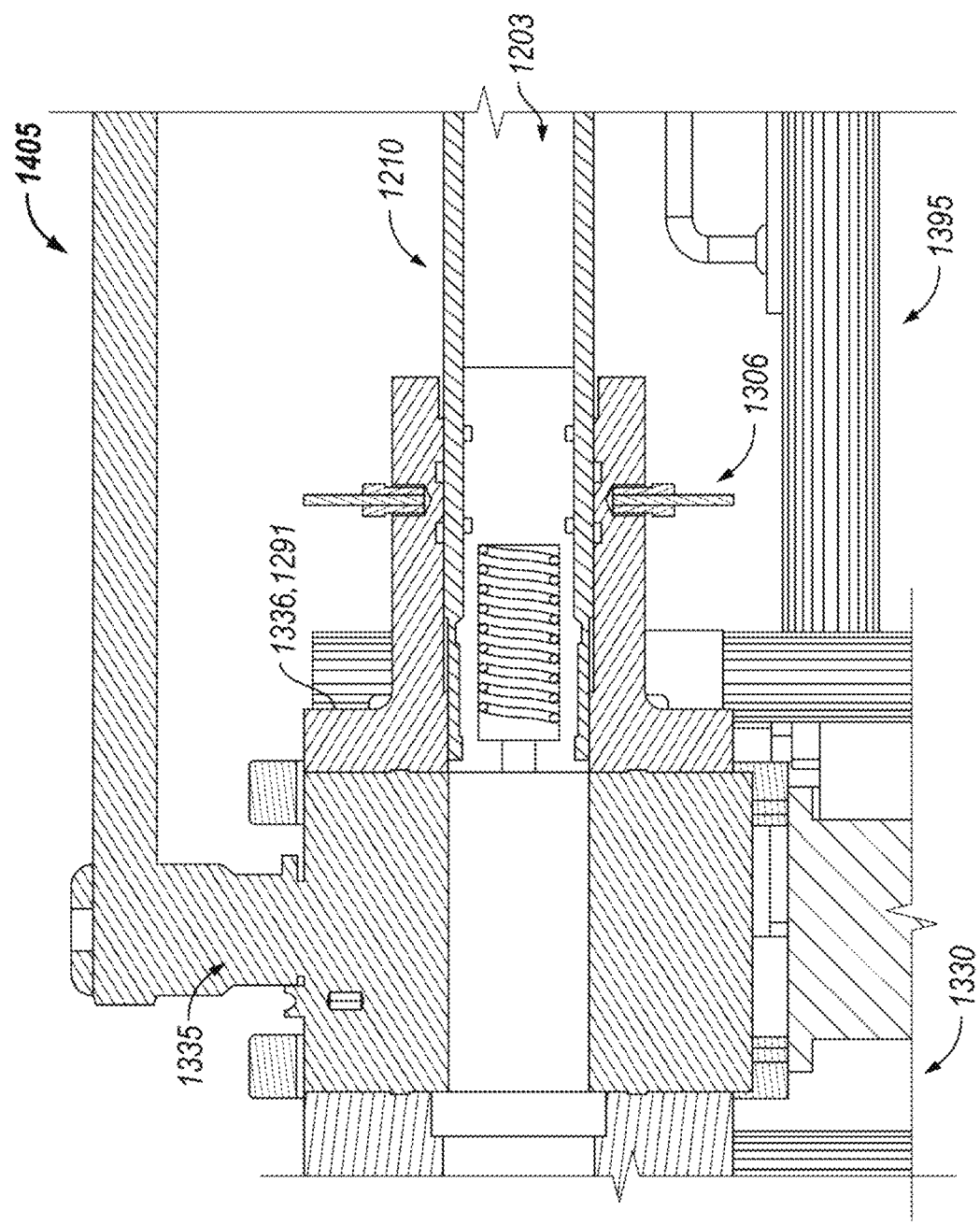

In step 1405, shown in FIG. 14, a view is provided as to the three pressure barrier components (spring, plug, and piston head) within the retrieval vessel 1210. As in FIG. 13, the combined retrieval vessel 1210 and adapter flange 1296 is connected to the valve 1335 of the valve assembly 1330 using bolts (or other fastening devices), which are disposed in the coupling features 1336 of the valve 1335 and the coupling features 1291 of the retrieval vessel 1210. Some of the core samples 1203 are shown within the retrieval vessel 1210 in FIG. 14.

Figure 15:
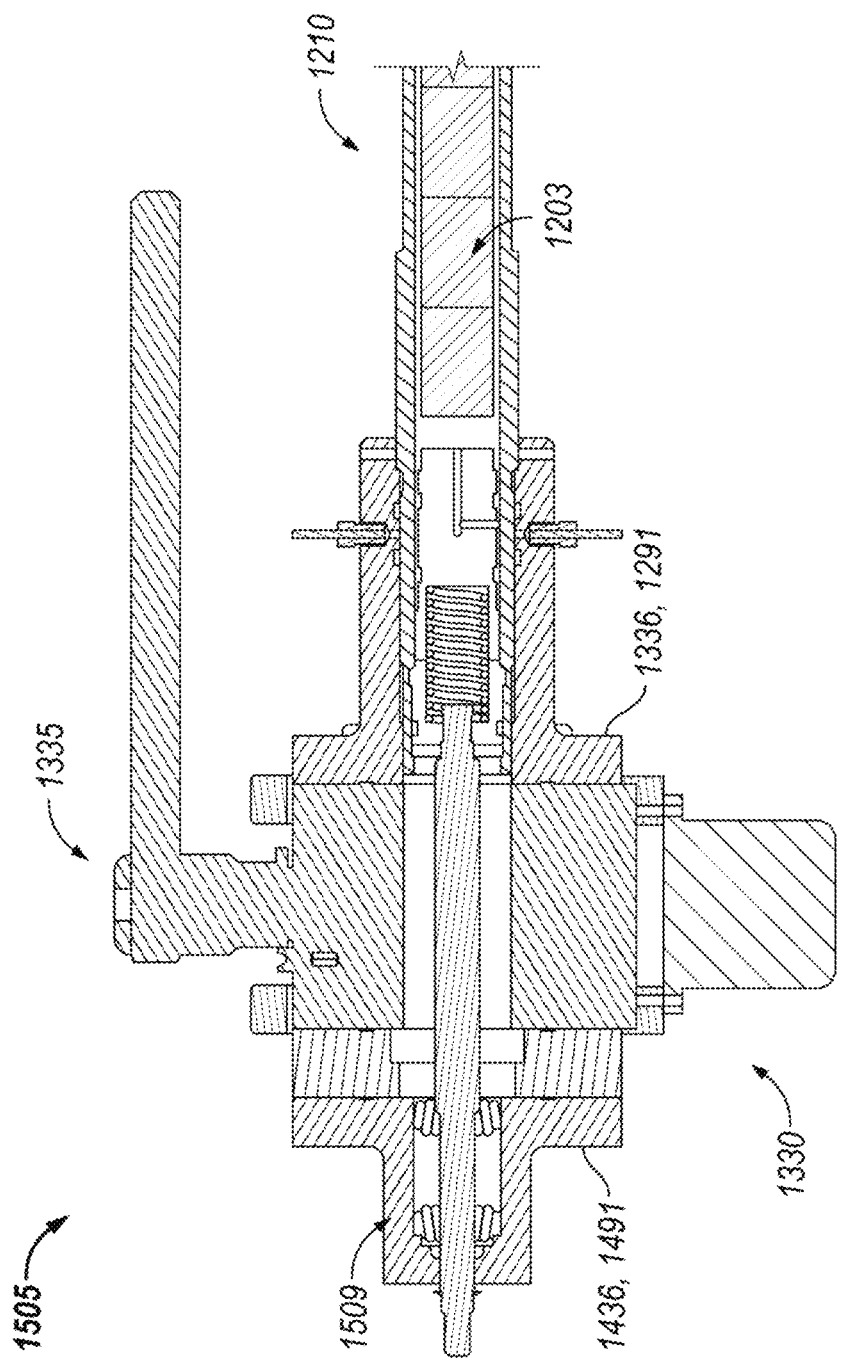

In step 1505, shown in FIG. 15 and some period of time after step 1305, the plug of the retrieval vessel 1210 is broken loose. For example, a plug breaker assembly 1509 is installed onto the valve 1335 and fastened with coupling features (e.g., bolts) of the valve 1335 properly. A user can then pressurize, using the hydraulic device, the valve 1335 and the internal volume of the plug breaker assembly 1509 with a fluid (e.g., fluorinert) to a pressure equal to the sampling pressure of the core samples within the retrieval vessel 1210. Doing so equalizes pressure across the plug of the retrieval vessel 1210 and eliminate any differential pressure, preload, and/or friction induced by differential pressure loads.

By rotating the plug breaker assembly 1509 with sufficient torque (e.g., 350 ft*lbf) until the plug of the retrieval vessel 1210 is broken loose. If needed, a user can apply an opposing rotation (e.g., clockwise torque of 30 ft*lbf) to re-seat/re-torque, to a lesser degree, the plug in the retrieval vessel 1210. A user can then isolate the pressure to the cavity of the retrieval vessel 1210 by moving the valve 1335 to the fully closed position. A user can also then bleed pressure and fluid from the internal volume of the plug breaker assembly 1509. The plug breaker assembly 1509 can then be removed from the valve 1335. Some of the core samples 1203 are shown within the retrieval vessel 1210 in FIG. 15.

Figure 16:
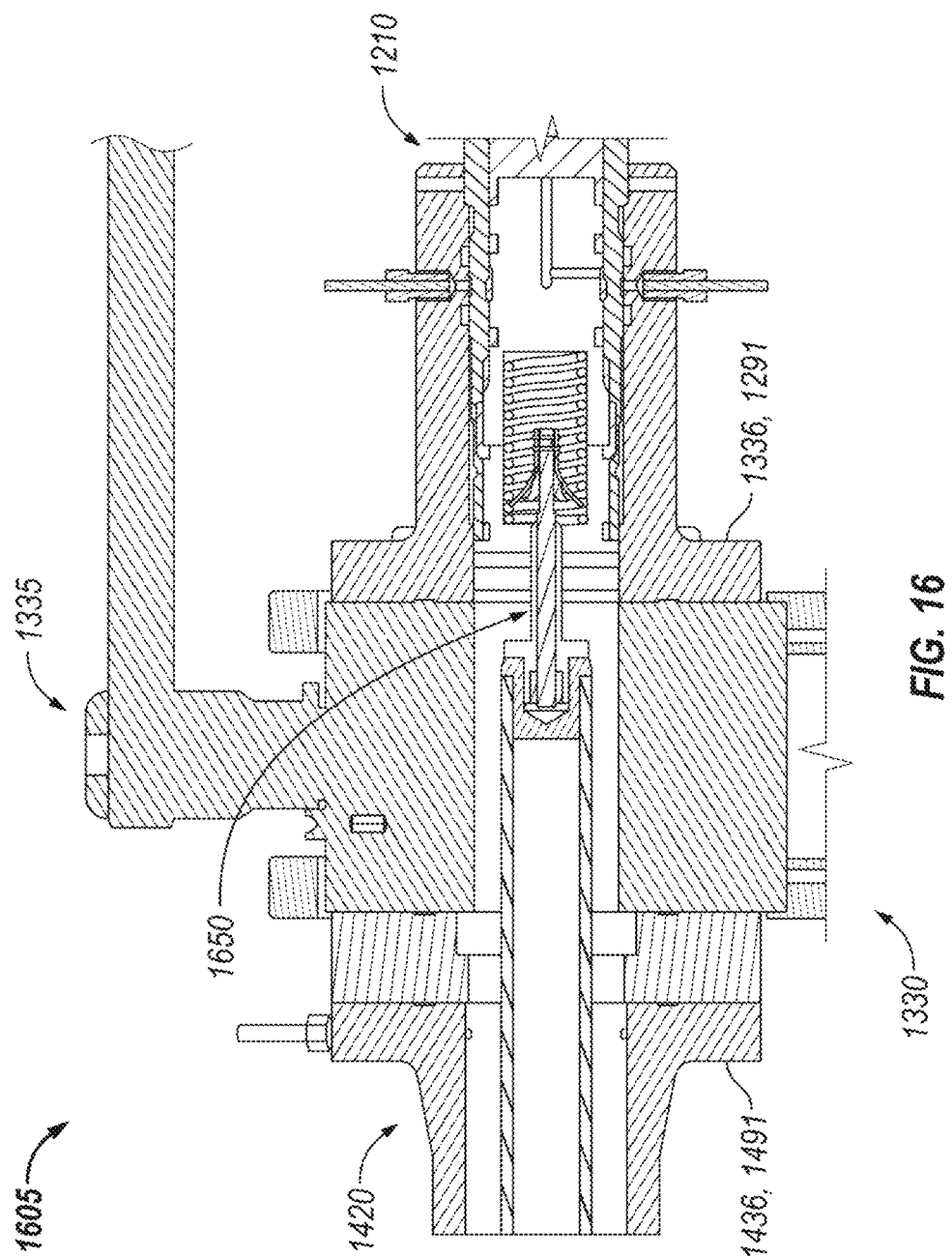

In step 1605, shown in FIG. 16 and some period of time after step 1505, the plug hex of the retrieval vessel 1210 is engaged. The linear actuator 1420 is installed in this step 1605. A user can remove the coupling features 1336 (e.g., bolts) from step 1305 above and slide the pressurized retrieval vessel 1210 away from the valve 1355 by some distance (e.g., about 6 inches). A user can also secure the CVFO brackets. An extractor 1650 (also sometimes called a plug removal head) can then be installed and secured to the rod of the linear actuator 1420.

If the linear actuator 1420 is not already coupled to the valve 1355 of the valve assembly 1350, then the coupling features 1491 of the linear actuator 1420 are coupled to the coupling features 1436 of the valve 1355 using bolts. Once the valve 1355 is fully open and the linear actuator 1420 is in the start (e.g., home, zero) position, a user can advance the linear actuator 1420 through the valve 1355 by a certain distance (e.g., 10 inches). A user can then verify that the extractor 1650 protrudes past the face of the valve 1355 by some distance (e.g., 2.77 inches). A user can then recouple the combined retrieval vessel 1210/adapter flange 1296 to the coupling features 1336 of the valve 1355 with the plug removal head engaged through the plug hex of the retrieval vessel 1210.

Once this is accomplished, the plug and spring of the retrieval vessel 1210 are removed. For example, a user can install a high-pressure hydraulic line to the lower port of the linear actuator 1420. The inner chamber of the retrieval vessel 1210 can then be isolated by closing the pressure port.

A user can then vent the upper plug and pressurize the combined system with the hydraulic device until fluid trickles from the upper port, which removes all air from the combined volume. The upper port is then closed. The pressure of the combined system can then be adjusted to the internal pressure of the retrieval vessel 1210 by adjusting a pressure relief/over pressure valve and air driven pump of the hydraulic device.

Once this is done, the user can unthread the hex plug of the retrieval vessel 1210 to fully disengage the hex plug from the vessel. The linear actuator 1420 can then be returned to the home position, which draws out the plug and spring of the retrieval vessel 1210 by the extractor 1650. Afterwards, the valve 1355 can be moved to the fully closed position, and the pressure valve of the linear actuator 1420 can be closed. The bleed valve of the linear actuator 1420 can then be opened, and the resulting fluid can be purged to the excess fluid catch tank (e.g., excess fluid catch tank 1197). The user can then retract the linear actuator 1420 and remove the plug and spring from the linear actuator 1420.

Figure 17:
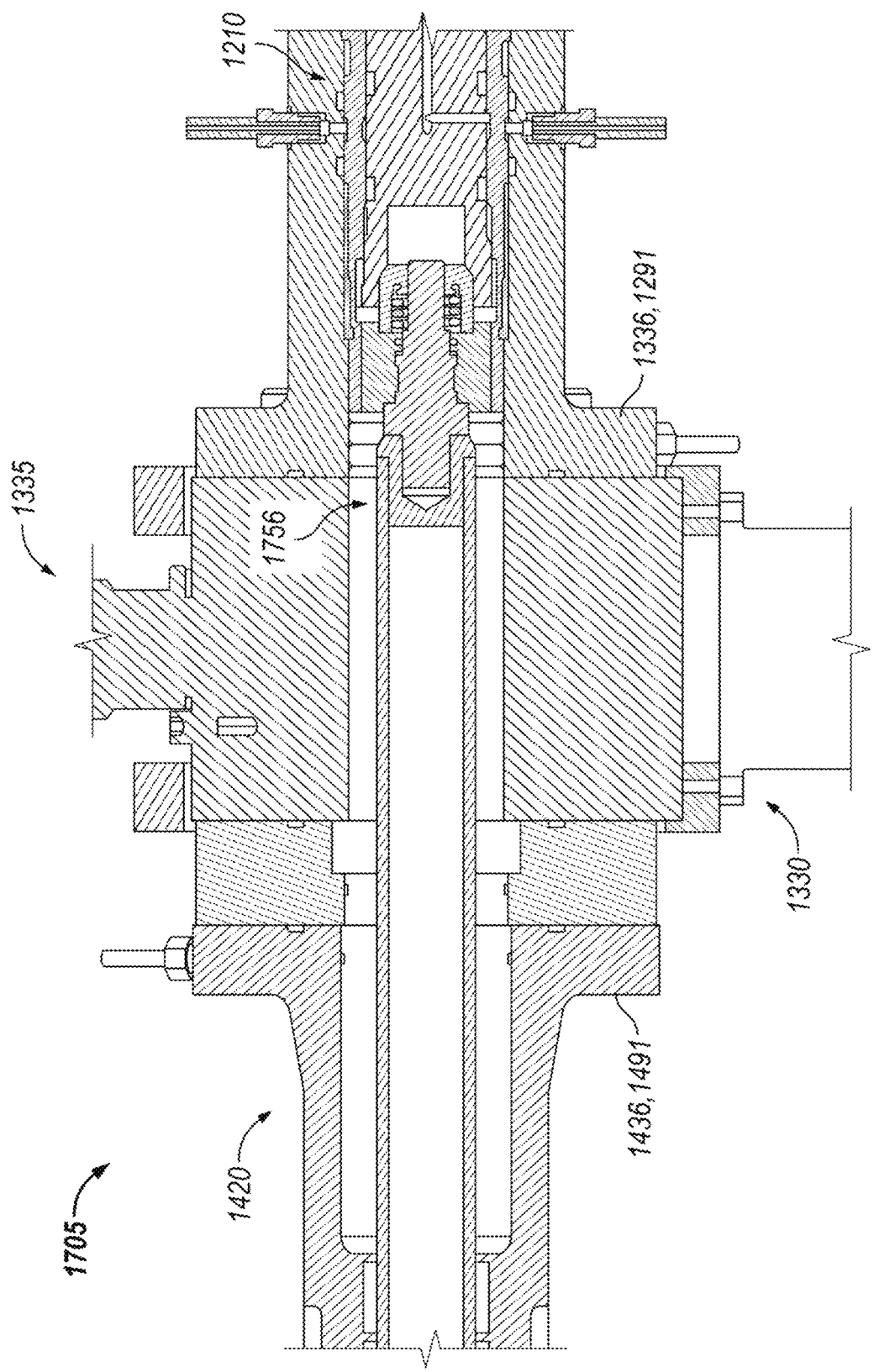

In step 1705, shown in FIG. 17 and some period of time after step 1605, the piston of the retrieval vessel 1210 is removed. For example, the piston head removal assembly 1756 can be inserted into the linear actuator 1420. If the linear actuator 1420 is not already coupled to the valve 1335 of the valve assembly 1330, then the coupling features 1436 of the valve 1335 should engage the linear actuator 1420. In either case, the valve 1335 is in the fully closed position. The working chamber of the linear actuator can then be pressurized using the hydraulic device until the pressure of the working chamber equals the sampling pressure of the retrieval vessel 1210. Once this is done, the valve 1335 is moved to the fully open position.

At this point, the linear actuator 1420 is operated to move the piston head removal assembly 1756 through the valve 1335 into the retrieval vessel 1210 by some distance (e.g., 11.5 inches) until the piston head removal assembly 1756 contacts the piston within the retrieval vessel 1210. By rotating the shaft of the linear actuator 1420 in a direction (e.g., counterclockwise), the threads of the piston align with the threads of the piston head removal assembly 1756, the piston head removal assembly 1756 becomes properly aligned to engage the piston. At that point, by rotating the shaft of the linear actuator 1420 in the opposite direction (e.g., clockwise), the piston head removal assembly 1756 engages the piston. By continuing to rotate the shaft of the linear actuator 1420 in the same direction (e.g., translating to one-half of an inch, six full turns), the piston head removal assembly 1756 becomes fully engaged with the piston.

The shaft of the linear actuator can then be retracted, pulling the piston head removal assembly 1756 and the piston together through the valve 1335 into the linear actuator. The valve 1335 can then be moved to the fully closed position to isolate and maintain the sampling pressure within the retrieval vessel 1210. To assist in maintaining this sampling pressure, the hydraulic device can be used to ensure that the sampling pressure level is maintained in the retrieval vessel 1210. Any fluid in the linear actuator 1420 can be drained, and the joint piston head removal assembly 1756 and piston can be removed from the linear actuator 1420.

Figure 18:
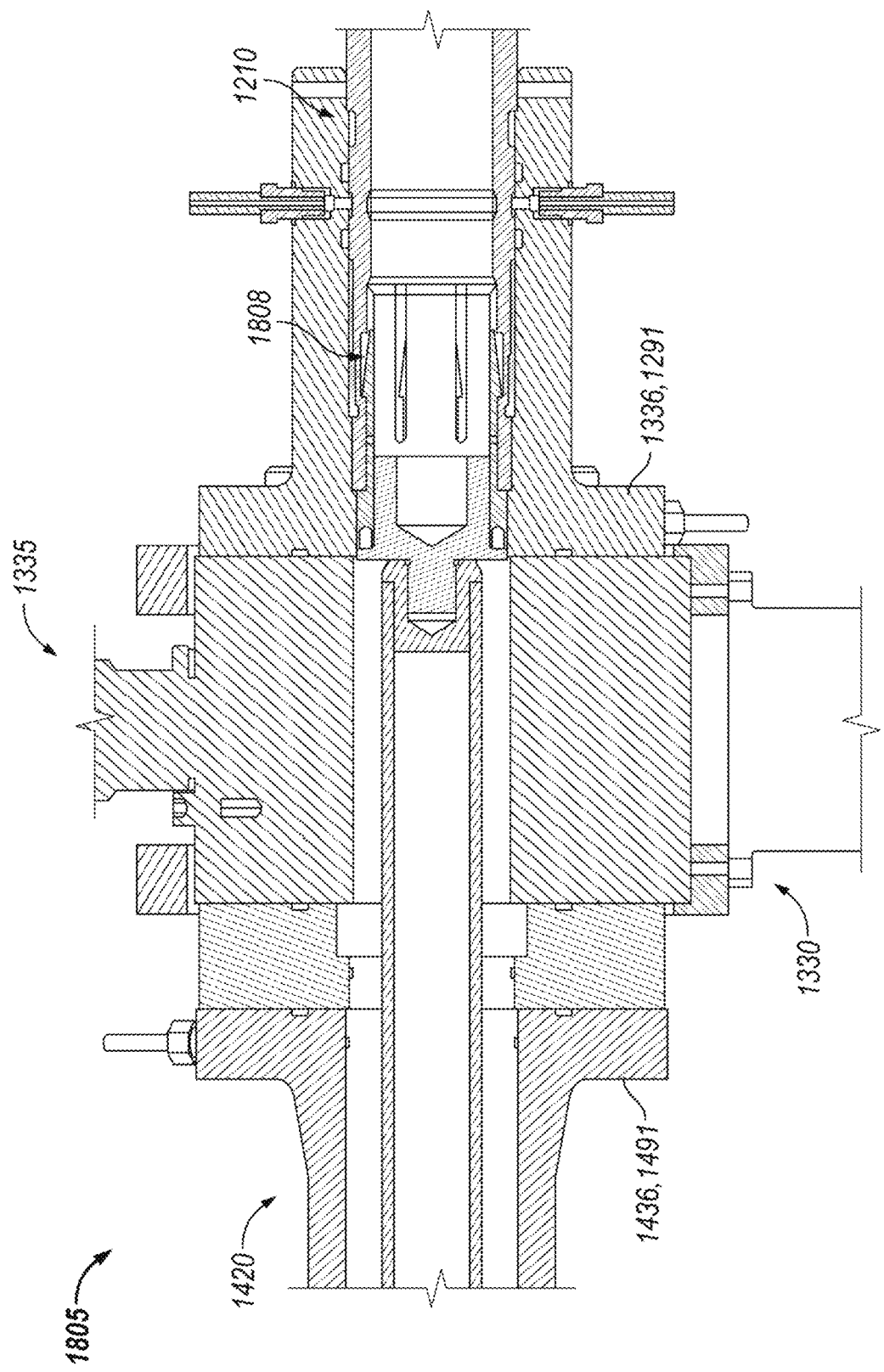

In step 1805, shown in FIG. 18 and some period of time after step 1705, a sleeve 1808 is installed. For example, with the valve 1335 in the fully closed position, the sleeve 1808 can be placed in the linear actuator 1420. If the linear actuator 1420 is not already coupled to the valve 1335 of the valve assembly 1330, then the coupling features 1436 of the valve 1335 should couple to the coupling features 1491 of the linear actuator 1420. The working chamber of the linear actuator 1420 can then be pressurized using the hydraulic device until the pressure of the working chamber equals the sampling pressure of the retrieval vessel 1210. Once this is done, the valve 1335 is moved to the fully open position.

At this point, the linear actuator 1420 is operated to move the sleeve 1808 through the valve 1335 into the retrieval vessel 1210 by some distance (e.g., 10.85 inches) until the sleeve 1808 is installed in the retrieval vessel 1210. The shaft of the linear actuator can then be retracted, leaving the sleeve in the retrieval vessel 1210. The valve 1335 can then be moved to the fully closed position to isolate and maintain the sampling pressure within the retrieval vessel 1210. To assist in maintaining this sampling pressure, the hydraulic device can be used to ensure that the sampling pressure level is maintained in the retrieval vessel 1210. Any fluid in the linear actuator 1420 can be drained. The linear actuator 1420 can then be decoupled from the valve 1335.

After this, while not shown in a figure, the subterranean core samples are transferred from the retrieval vessel 1210 to the testing vessel assembly (e.g., testing vessel assembly 740). For example, with the valve 1335 in the fully closed position, the testing vessel assembly can be directly coupled to the valve 1335 of the valve assembly 1330 using the coupling features 1436 of the valve 1335. The testing vessel assembly can then be pressurized using the hydraulic device until the pressure of the testing vessel assembly equals the sampling pressure of the retrieval vessel 1210. Once this is done, the valve 1335 is moved to the fully open position.

Then, the assembly of the valve 1335, the testing vessel assembly, and the retrieval vessel 1210 is rotated vertically so that the retrieval vessel 1210 is located higher than the valve 1335. At this point, a vibrating device (e.g., vibrating device 281) and/or a heating device (e.g., heating device 282) applied to the retrieval vessel 1210 can be operated. While maintaining this vertical orientation, gravity will cause the subterranean core samples to drop into the testing vessel assembly. This transfer process can take some amount of time (e.g., 5 minutes, 30 minutes). When the transfer process is complete, the valve 1335 is moved to the fully closed position, and the assembly of the valve 1335, the testing vessel assembly, and the retrieval vessel 1210 is rotated back to a horizontal position. With the chamber of the retrieval vessel 1210 now void of the subterranean core samples, the retrieval vessel 1210 can be depressurized and drained, and the retrieval vessel 1210 can be decoupled from the valve 1335.

Figure 19:
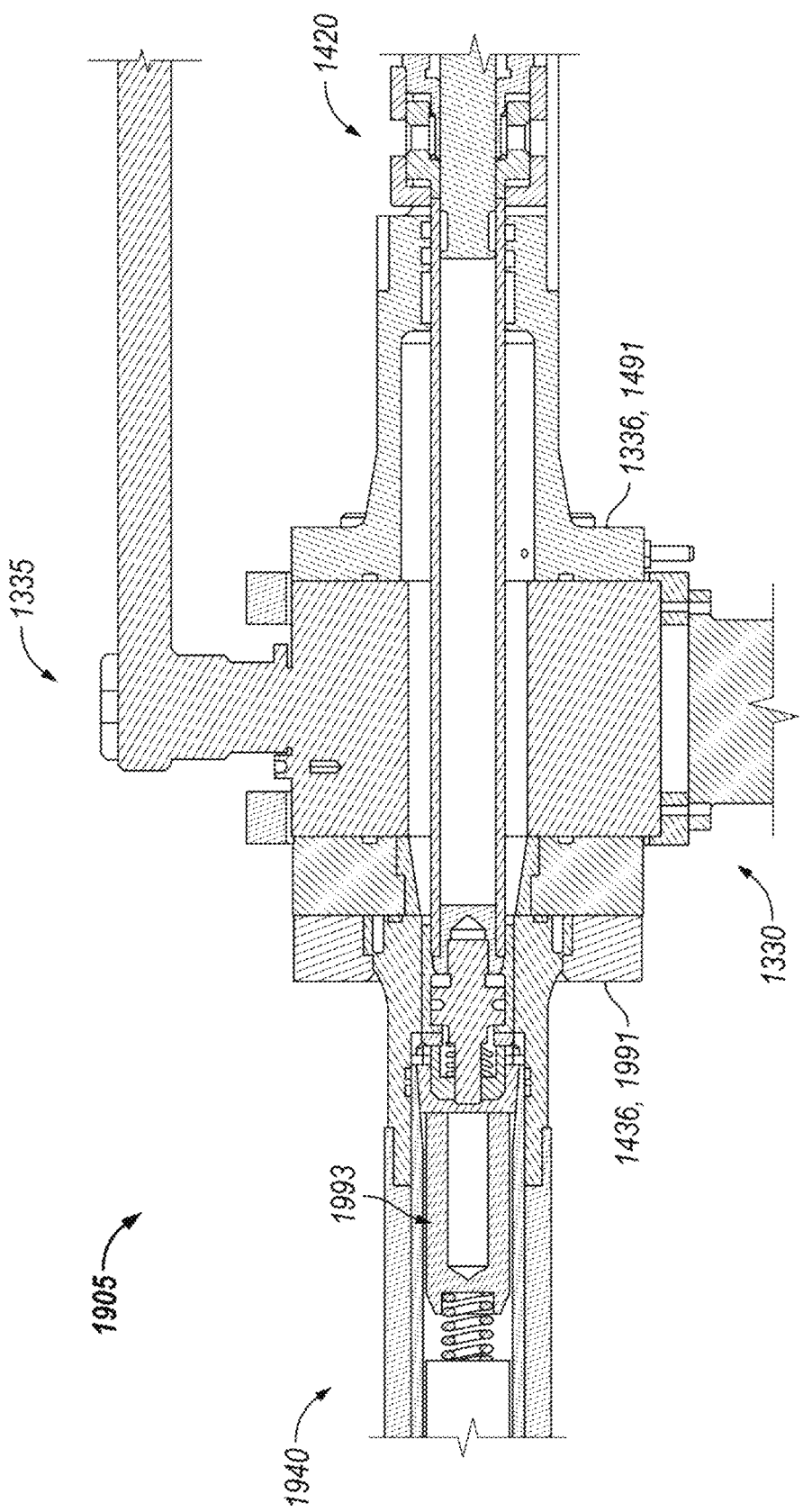
Figure 20:
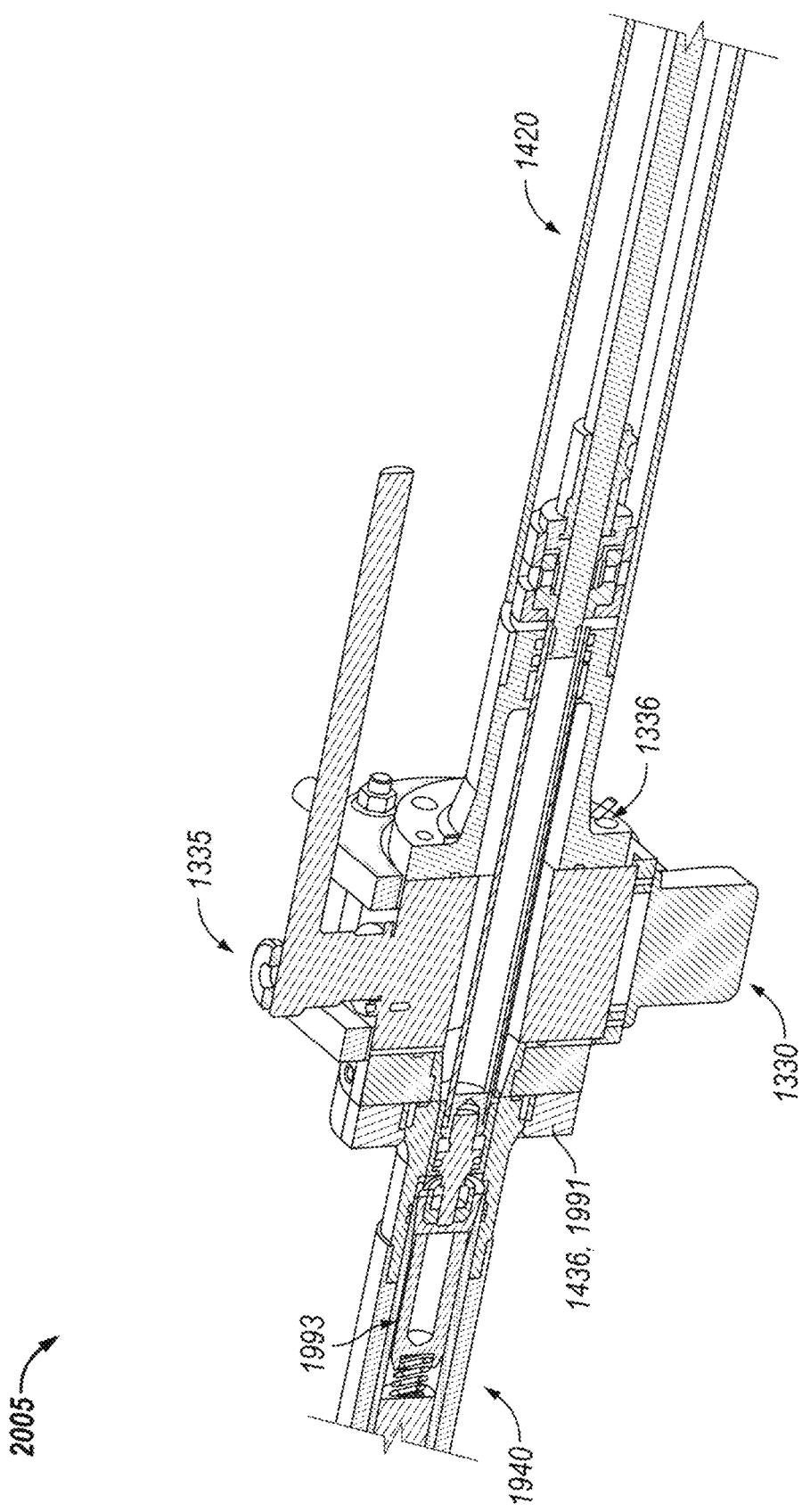

In step 1905, shown in FIGS. 19 and 20 and some period of time after step 1805, a core spacer assembly 1993 is inserted. With the coupling features 1991 of the testing vessel assembly 1940 still indirectly (using bolts) coupled to the coupling features 1336 of the valve 1335, and with the valve 1335 in the fully closed position, the core spacer assembly 1993 with piston head removal is inserted into the linear actuator 1420, and the linear actuator 1420 is coupled to the valve 1335 of the valve assembly 1330 using the coupling features 1336 of the valve 1335 and the coupling features 1491 of the linear actuator 1420. The working chamber of the linear actuator 1420 can then be pressurized using the hydraulic device until the pressure of the working chamber equals the sampling pressure of the testing vessel assembly 1940. Once this is done, the valve 1335 is moved to the fully open position.

At this point, the linear actuator 1420 can be advanced by some distance (e.g., 12 inches), pushing the core spacer assembly 1993 forward. The linear actuator 1420 can then be retracted. When the linear actuator 1420 is retracted, the core spacer assembly 1993 remains within the testing vessel 1940. The valve 1335 can then be moved to the fully closed position to isolate and maintain the sampling pressure within the testing vessel 1940. To assist in maintaining this sampling pressure, the hydraulic device can be used to ensure that the sampling pressure level is maintained in the testing vessel 1940. Any fluid in the linear actuator 1420 can be drained. The linear actuator 1420 can then be decoupled from the valve 1335.

Figure 21:
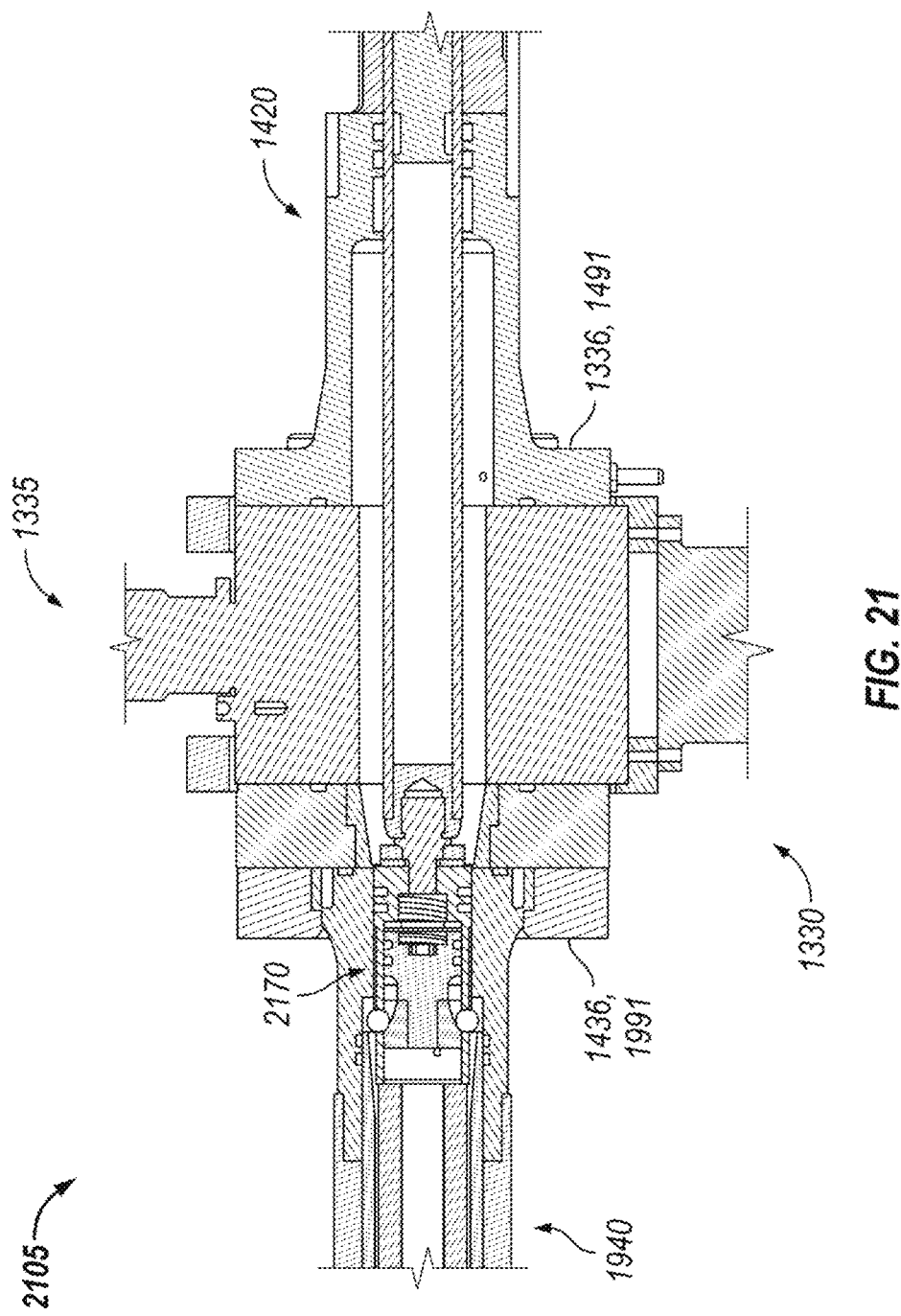

In step 2105, shown in FIG. 21 and some period of time after step 1905, a testing vessel plug assembly 2170 is installed. For example, with the valve 1335 in the fully closed position, the testing vessel plug assembly 2170 can be placed in the linear actuator 1420. If the linear actuator 1420 is not already coupled to the valve 1335 of the valve assembly 1330, then the coupling features 1336 of the valve 1335 should couple to the coupling features 1491 of the linear actuator 1420. The working chamber of the linear actuator 1420 can then be pressurized using the hydraulic device until the pressure of the working chamber equals the sampling pressure of the testing vessel 1210. Once this is done, the valve 1335 is moved to the fully open position.

At this point, the linear actuator 1420 can be advanced by some distance (e.g., 10.57 inches), pushing the testing vessel plug assembly 2170 forward and into position relative to the testing vessel 1940. When the testing vessel plug assembly 2170 is pushed far enough forward, the testing vessel plug assembly 2170 becomes installed relative to the testing vessel 1940. Once installed, the testing vessel plug assembly 2170 keeps the testing vessel 1940 pressurized at the sampling pressure. The linear actuator 1420 can then be retracted. When the linear actuator 1420 is retracted, the testing vessel plug assembly 2170 remains coupled to the testing vessel 1940. The valve 1335 can then be moved to the fully closed position to isolate and maintain the sampling pressure within the testing vessel 1940. To assist in maintaining this sampling pressure, the hydraulic device can be used to ensure that the sampling pressure level is maintained in the testing vessel 1940. Any fluid in the linear actuator 1420 can be drained. The linear actuator 1420 can then be decoupled from the valve 1335.

Finally, the testing vessel 1940 can be decoupled from the valve 1335, at which time the subterranean core samples within testing vessel 1940 and maintained at sampling pressure can be tested through the testing vessel 1940 because the testing vessel 1940 is made of non-magnetic material, non-metallic material, and/or some other material that has a low noise profile when exposed to testing such as using NMR.

FIGS. 22A through 22E show a system 2299 at a time when pressurized reservoir core samples 2203 are transferred in accordance with certain example embodiments. Referring to FIGS. 1 through 22E, the sequence shown in FIGS. 22A through 22E corresponds to some of what is described in step 1905 of FIG. 19 above. The system 2299 of FIGS. 22A through 22E includes a frame 2295 on which is mounted a valve assembly 2230, to which is coupled a retrieval vessel 2210 and a testing vessel 2240. The valve assembly 2230 also includes a vibrating device 2281. These components of the system 2299 are substantially the same as the corresponding components discussed above with respect to FIGS. 1 through 21.

Figure 22A:
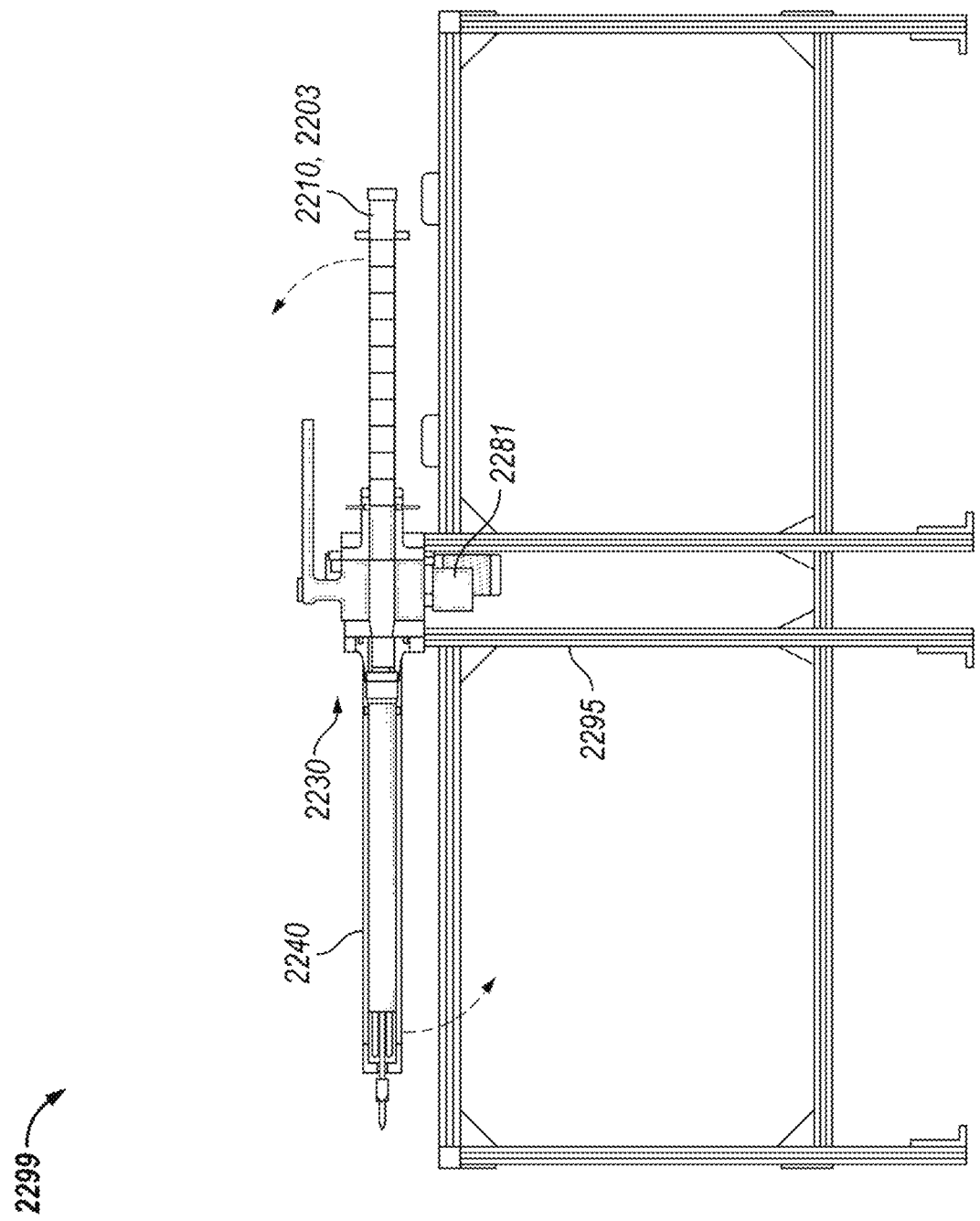
Figure 22B:
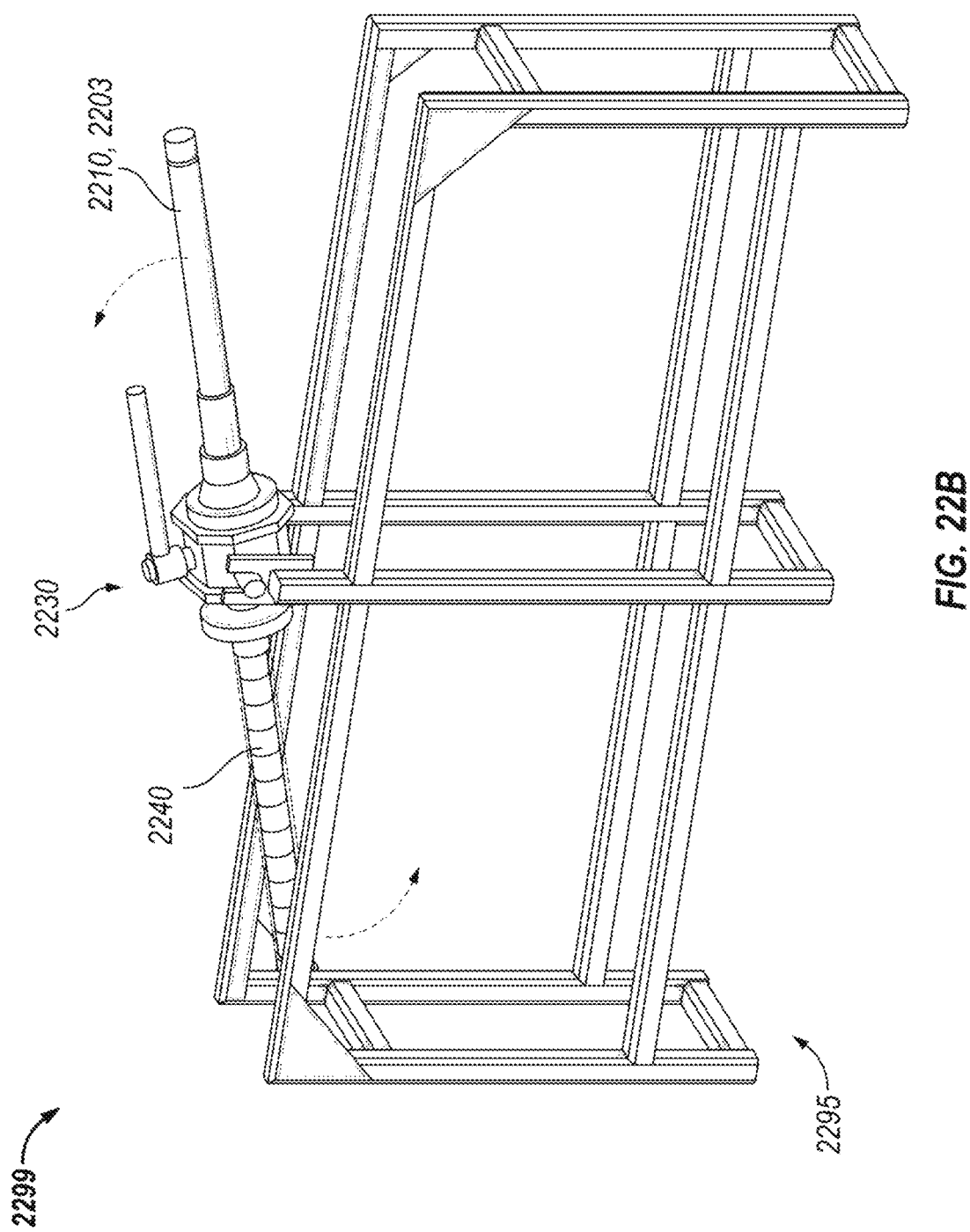

In FIG. 22A, the valve of the valve assembly 2230, the retrieval vessel 2210, and the testing vessel 2240 are oriented such that the retrieval vessel 2210 and the testing vessel 2240 are horizontal relative to the ground on which the frame 2295 sits. The subterranean core samples 2203 are disposed inside the retrieval vessel 2210. The pressure within the assembly of the valve assembly 2230, the retrieval vessel 2210, and the testing vessel 2240 is substantially the sampling pressure at which the subterranean core samples 2203 were taken. In FIG. 22B, the assembly of the valve assembly 2230, the retrieval vessel 2210, and the testing vessel 2240 begin rotating about a gimbal between the valve assembly 2230 and the frame 2295. The rotation in FIG. 22B puts the retrieval vessel 2210 slightly above the valve assembly 2230 and the testing vessel 2240 slightly below the valve assembly 2230.

Figure 22D:
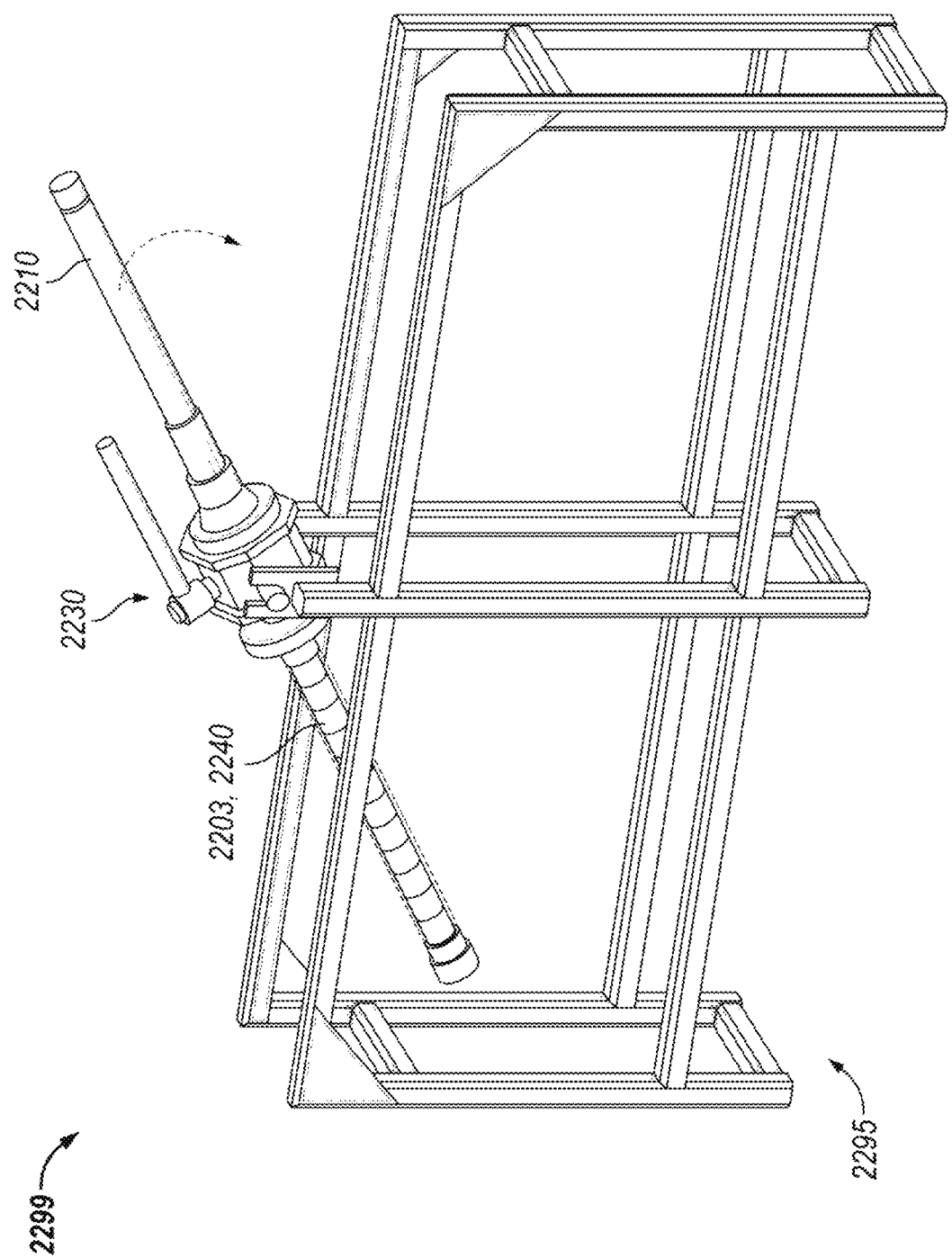
Figure 22E:
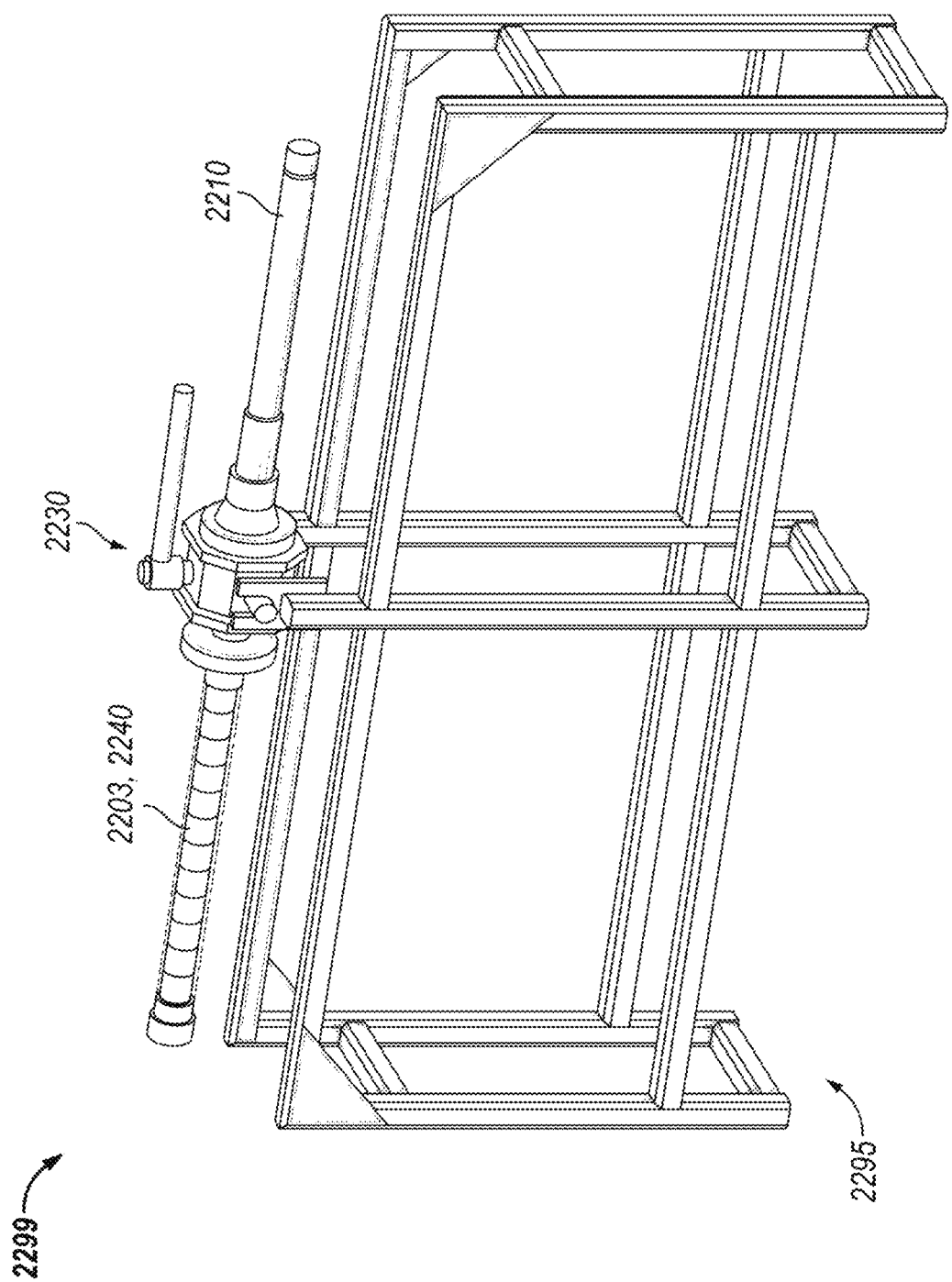

In FIG. 22C, the assembly of the valve assembly 2230, the retrieval vessel 2210, and the testing vessel 2240 continues its rotation until the assembly is vertical. The subterranean core samples 2203, assisted by gravity, the vibrating device 2281, and/or an optional heating device (e.g., heating device 282) slide through the valve of the valve assembly 2230 and into the testing vessel 2240. In FIG. 22D, the assembly of the valve assembly 2230, the retrieval vessel 2210, and the testing vessel 2240 retraces its path toward horizontal, with the subterranean core samples 2203 remaining in the testing vessel 2240 under the sampling pressure. In FIG. 23E, the assembly of the valve assembly 2230, the retrieval vessel 2210, and the testing vessel 2240 returns to a horizontal orientation, and the subterranean core samples 2203 remaining in the testing vessel 2240 under the sampling pressure.

Figure 23:
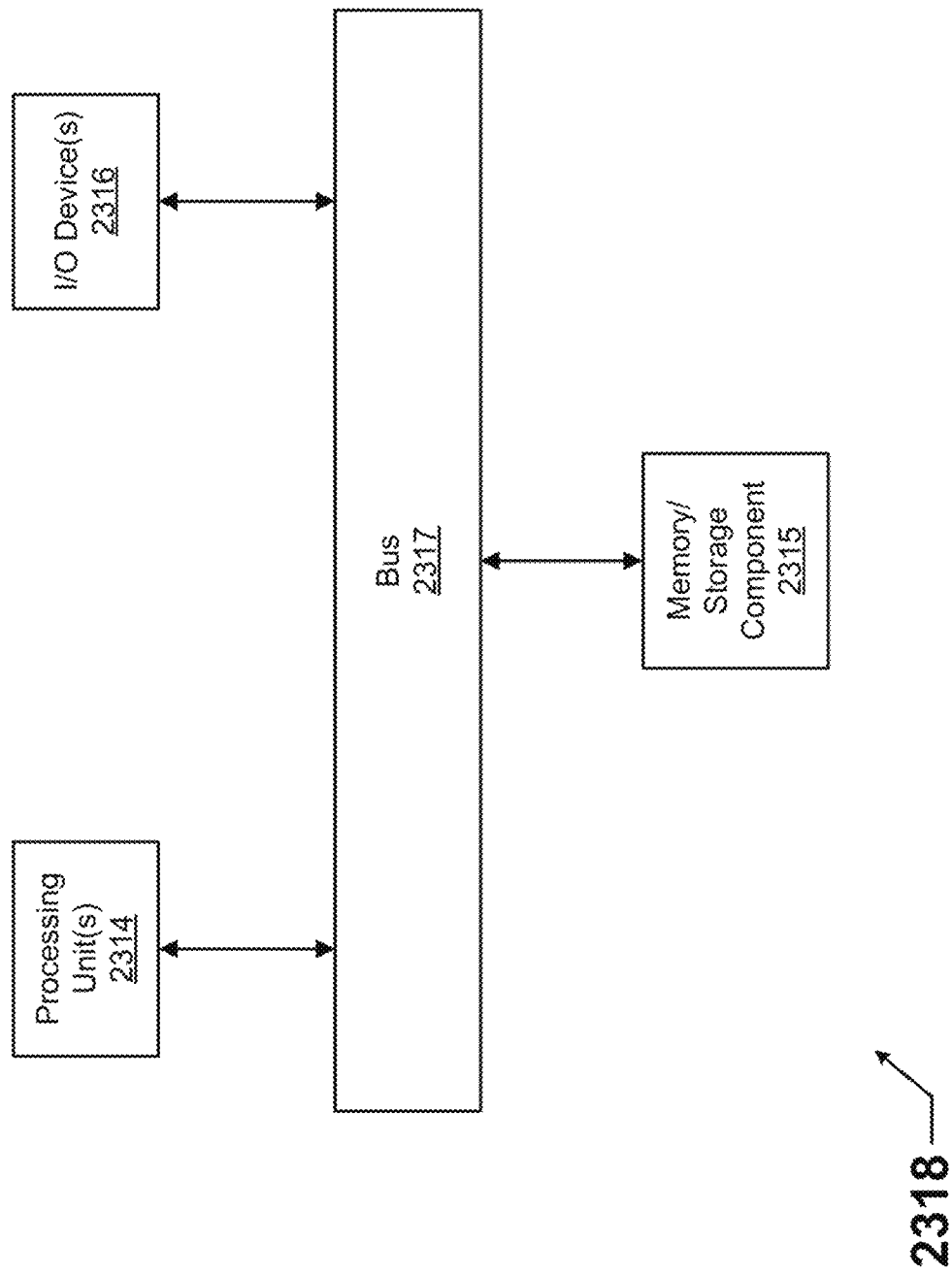
FIG. 23 shows a computing device in accordance with certain example embodiments.

FIG. 23 shows a computing device in accordance with certain example embodiments. FIG. 23 illustrates one embodiment of a computing device 2318 that implements one or more of the various techniques described herein, and which is representative, in whole or in part, of the elements described herein pursuant to certain exemplary embodiments. For example, the controller 204 of FIG. 2 and its various components (e.g., hardware processor, memory, control engine) can be considered a computing device 2318 as in FIG. 2. Computing device 2318 is one example of a computing device and is not intended to suggest any limitation as to scope of use or functionality of the computing device and/or its possible architectures. Neither should computing device 2318 be interpreted as having any dependency or requirement relating to any one or combination of components illustrated in the example computing device 2318.

Computing device 2318 includes one or more processors or processing units 2314, one or more memory/storage components 2315, one or more input/output (I/O) devices 2316, and a bus 2317 that allows the various components and devices to communicate with one another. Bus 2317 represents one or more of any of several types of bus structures, including a memory bus or memory controller, a peripheral bus, an accelerated graphics port, and a processor or local bus using any of a variety of bus architectures. Bus 2317 includes wired and/or wireless buses.

Memory/storage component 2315 represents one or more computer storage media. Memory/storage component 2315 includes volatile media (such as random access memory (RAM)) and/or nonvolatile media (such as read only memory (ROM), flash memory, optical disks, magnetic disks, and so forth). Memory/storage component 2315 includes fixed media (e.g., RAM, ROM, a fixed hard drive, etc.) as well as removable media (e.g., a Flash memory drive, a removable hard drive, an optical disk, and so forth).

One or more I/O devices 2316 allow a customer, utility, or other user to enter commands and information to computing device 2318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 2318 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 2318 includes at least the minimal processing, input, and/or output means necessary to practice one or more embodiments.

Further, those skilled in the art will appreciate that one or more elements of the aforementioned computer device 2318 is located at a remote location and connected to the other elements over a network in certain exemplary embodiments. Further, one or more embodiments is implemented on a distributed system having one or more nodes, where each portion (e.g., control engine) of the implementation is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 24:
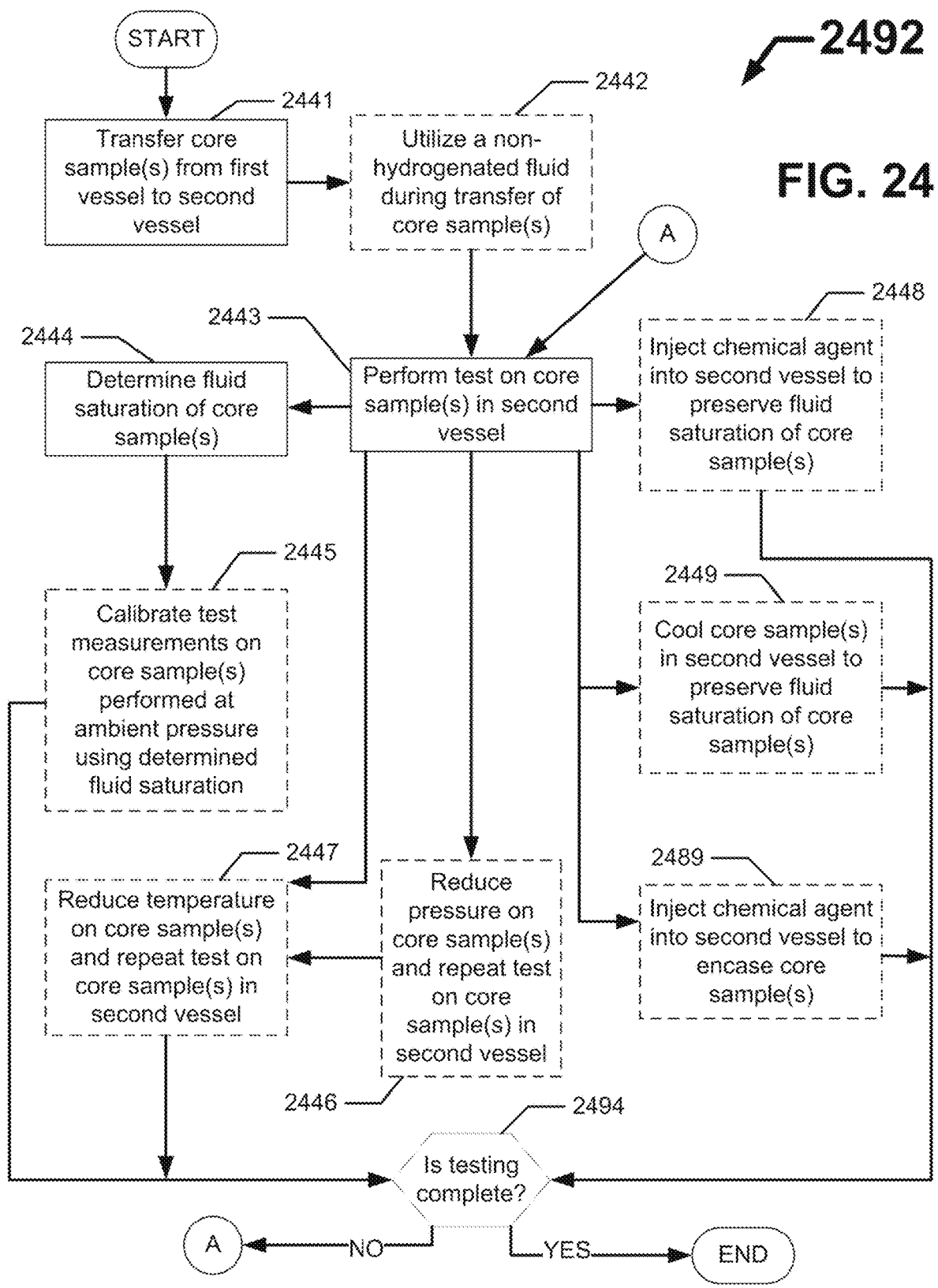
FIG. 24 shows a flowchart of a method for performing a test on a core sample according to certain example embodiments.

FIG. 24 shows a flowchart 2492 of a method for performing a test on a core sample according to certain example embodiments. While the various steps in this flowchart 2492 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 24 may be included in performing this method. Accordingly, the specific arrangement of steps should not be construed as limiting the scope. Further, a particular computing device, such as the computing device 2318 discussed above with respect to FIG. 23, may be used to perform or facilitate performance of one or more of the steps (or portions thereof) for the method shown in FIG. 24 in certain example embodiments. Any of the functions (or portions thereof) performed below by a controller 204 may involve the use of one or more protocols, one or more algorithms, and/or stored data stored in a storage repository. In addition, or in the alternative, any of the functions (or portions thereof) in the method may be performed by a user.

The method shown in FIG. 24 is merely an example that may be performed by using an example system described herein. In other words, systems for performing a test on a core sample may perform other functions using other methods in addition to and/or aside from those shown in FIG. 24. Referring to FIGS. 1 through 24, the method shown in the flowchart 2492 of FIG. 24 begins at the START step and proceeds to step 2441, where at least a portion of a core sample is transferred from a first core containment vessel, or first vessel (e.g., substantially similar to the retrieval vessel 310 discussed above), to a second core containment vessel, or second vessel (e.g., substantially similar to the linear actuator 320 discussed above). In certain embodiments, the core sample (or simply "sample") can be substantially similar to the core samples discussed above. For example, a core sample can include rock and fluid retrieved from a wellbore of a subterranean reservoir. In some embodiments, the core sample can be retrieved from a wellbore from a subterranean reservoir using a pressure coring process. In one embodiment, transferring at least a portion of a core sample from a first vessel to a second vessel further comprises subsampling the core sample. As an example, a core sample with a length of about 3 meters may be retrieved and stored in the first vessel. Subsequently, a subsample may be obtained from the core sample that is 3 meters long, and the subsample may be transferred to the second vessel while maintaining pressure and/or temperature. In some embodiments, one or more subsamples may be generated in the first vessel, in a transfer tool, or any combination thereof.

In some embodiments, the core sample is retrieved from a wellbore from a subterranean reservoir using a rotary sidewall coring process. Moreover, in one embodiment, the core sample comprises a plurality of rock and fluid samples retrieved from various depths in a wellbore of a subterranean reservoir, for example, using a rotary sidewall coring process. However, it is possible to retrieve a single core sample with the rotary sidewall coring process. The core sample may comprise a sidewall core sample or practically any other core sample that may be retrieved from the subterranean reservoir.

In some embodiments, a single core sample may be at least 1 inch in length (e.g., at least 1.25 inches in length, at least 1.5 inches in length, at least 1.75 inches in length). In some embodiments, a single core sample may be 2 inches or less in length (e.g., 1.75 inches or less in length, 1.5 inches or less in length, 1.25 inches or less in length). The length of the single core sample may be in an amount ranging from any of the minimum values described above to any of the maximum values described above. For example, in some embodiments, a single core sample may be between 1 inch and 2 inches (e.g., between 1.25 inches and 2 inches, between 1.5 inches and 2 inches). In some embodiments, a single core sample may be any length less than 1 inch, although tests on such samples may yield a larger error than for samples having a length at least 1 inch.

The second vessel may include at least one core sample, and a plurality of core samples in an amount up to the capacity of the measurement zone (e.g., substantially similar to the measurement zone 761 discussed above) or region of the second vessel. In some embodiments, the second vessel includes at least 2 core samples. In some embodiments, a plurality of core samples may include at least 5 core samples (e.g., at least 6 core samples, at least 7 core samples, at least 8 core samples, at least 9 core samples, at least 10 core samples, at least 11 core samples, at least 12 core samples, at least 13 core samples, at least 14 core samples). In some embodiments, a plurality of core samples may include 15 core samples or less (e.g., 14 core samples or less, 13 core samples or less, 12 core samples or less, 11 core samples or less, 10 core samples or less, 9 core samples or less, 8 core samples or less, 7 core samples or less, 6 core samples or less). The quantity of core samples in a plurality of core samples may be in an amount ranging from any of the minimum values described above to any of the maximum values described above. For example, in some embodiments, a plurality of core samples may include between 5 core samples and 15 core samples (e.g., between 5 core samples and 10 core samples, between 10 core samples and 12 core samples, between 10 core samples and 15 core samples, between 11 core samples and 15 core samples, between 12 core samples and 15 core samples). As an example, the first vessel may contain 10-15 core samples with each core sample having a length of between 1 inch and 2 inches, and all of those core samples may be transferred from the first vessel to the second vessel.

Thus, those of ordinary skill in the art will appreciate that the term "core sample" may therefore include practically any core sample that may be transferred from the first vessel to the second vessel, such as, but not limited to, transferring a single core sample from the first vessel to the second vessel, transferring a plurality of core samples from the first vessel to the second vessel, transferring at least a portion of a core sample from the first vessel to the second vessel (e.g., via subsampling the core sample and transferring the subsample from the first vessel to the second vessel, by transferring less than all core samples available in the first vessel to the second vessel such as leaving 9 core samples in the first vessel and only transferring one core sample from the first vessel to the second vessel, etc.).

Turning to the vessels, in some embodiments, the test on the core sample is unable to be performed using the first vessel due to interference between the first vessel and equipment used for the test. For example, the first vessel may be constructed of a magnetic material that may interfere with the test. For example, the first vessel may be constructed of a metallic material that may interfere with the test. For example, the first vessel may be constructed of magnetic and metallic material that may interfere with the test. However, in some embodiments, a measurement zone or region of the second vessel may be constructed of a non-magnetic material and/or a non-metallic material such that the test may be performed without interference in or distortion of the measurements taken during the test. For example, metallic or magnetic material of the measurement zone of the second vessel put the measurement zone outside the "metallic exclusion zone" and/or the "magnetic exclusion zone" of the spectrometer or other measuring device. Those of ordinary skill in the art will appreciate that these exclusion zones depends on the design and configuration of the spectrometer or other measuring device, as defined for example by the manufacturer. As another example, the measurement zone of the second vessel comprises a non-metallic material such that the test may be performed. For example, the measurement zone of the second vessel may comprise non-magnetic and/or non-metallic material such that the test may be performed.

In certain embodiments, the measurement zone of the second vessel is the region of the vessel and the volume contained within that region that may be measured by a test when the second vessel is appropriately placed in a test instrument. In certain embodiments, the measurement zone of the second vessel also includes the region of the vessel and the volume contained within that region that may influence a test, for instance, by negatively interfering with the test even when not directly measured when the second vessel is appropriately placed in a test instrument. In certain embodiments, the measurement zone of the second vessel is the region where the cores are housed within the second vessel. In certain embodiments, the measurement zone of the second vessel is the region where the cores are housed within the second vessel, in addition to about an inch away from the end cores. In certain exemplary embodiments, the measurement zone of the second vessel is the region where the cores are housed within the second vessel, in addition to about two inches away from the end cores.

In some embodiments, the non-magnetic material comprises a non-magnetic alloy, alumina, titanium, fiberglass, polyether ether ketone (PEEK), glass-fiber filled PEEK, a PEEK composite, polyphenylene sulfide (PPS), glass-fiber filled PPS, a PPS composite, polytetrafluoroethylene (PTFE), glass-fiber filled PTFE, a PTFE composite, a thermoplastic composite, a ceramic, or any combination thereof. In one embodiment, the second vessel (e.g., non-magnetic, non-metallic, or any combination thereof) is constructed of a thermoplastic liner and with a titanium endcap and titanium flange interface for the ball-valve (e.g., substantially similar to the valve assembly 330 and/or the valve assembly 1330 discussed above). In one embodiment, the endcap and the interface are integrally wound to a fiber overwrap and are sealed with O-rings. As will be discussed further below with respect to step 2443, transferring the core sample from the first vessel to the second vessel allows the test to be performed on the core sample in the second vessel. Furthermore, the core sample is transferred while maintaining pressure and/or temperature, which may lead to test results more representative of reservoir conditions.

In one embodiment, the first vessel encloses the core sample in a sealed chamber at a pressure above ambient pressure. For example, the first vessel encloses the core sample at a pressure representative of a pressure from which the core sample was retrieved from the wellbore of the subterranean reservoir. In some embodiments, the first vessel encloses the core sample at a pressure of at least 100 psi (e.g., at least 200 psi, at least 300 psi, at least 400 psi, at least 500 psi, at least 600 psi, at least 700 psi, at least 800 psi, at least 900 psi, at least 1,000 psi, at least 1,500 psi, at least 2,000 psi, at least 2,500 psi, at least 3,000 psi, at least 3,500 psi, at least 4,000 psi, at least 4,500 psi, at least 5,000 psi, at least 5,500 psi, at least 6,000 psi, at least 6,500 psi, at least 7,000 psi, at least 7,500 psi, at least 8,000 psi, at least 8,500 psi, at least 9,000 psi, at least 9,500 psi). In some embodiments, the first vessel encloses the core sample at a pressure of 10,000 psi or less (e.g., 9,500 psi or less, 9,000 psi or less, 8,500 psi or less, 8,000 psi or less, 7,500 psi or less, 7,000 psi or less, 6,500 psi or less, 6,000 psi or less, 5,500 psi or less, 5,000 psi or less, 4,500 psi or less, 4,000 psi or less, 3,500 psi or less, 3,000 psi or less, 2,500 psi or less, 2,000 psi or less, 1,500 psi or less, 1,000 psi or less, 900 psi or less, 800 psi or less, 700 psi or less, 600 psi or less, 500 psi or less, 400 psi or less, 300 psi or less, 200 psi or less). In one embodiment, the range may go up to about 15,000 or 20,000 psi. In one embodiment, for example, for unconventional assets, the range of pressure may be 12,000-15,000 psi. The first vessel encloses the core sample at a pressure in an amount ranging from any of the minimum values described above to any of the maximum values described above. For example, the first vessel encloses the core sample at a pressure between 100 psi and 10,000 psi (e.g., between 1,000 psi and 10,000 psi, between 4,000 psi and 8,000 psi, between 2,000 psi and 6,000 psi, between 4,000 psi and 7,000 psi, between 5,000 psi and 10,000 psi).

The core sample may be maintained at a substantially equivalent pressure or placed under a higher pressure during the transfer of the core sample from the first vessel to the second vessel. "Higher pressure" refers to, as some non-limiting examples, 1%-5% in one embodiment, 5%-10% in another embodiment, 1%-10% in another embodiment, 1%-15% in another embodiment, 1%-20% in another embodiment, and 1%-25% in another embodiment. For example, at least one pressure measurement apparatus (e.g., pressure sensor or gauge, such as a sensor device 260 discussed above) associated with the first vessel may be utilized to determine the pressure associated with the first vessel. Similarly, at least one pressure measurement apparatus (e.g., pressure sensor or gauge, such as a sensor device 260 discussed above) associated with the second vessel may be utilized to determine the pressure associated with the second vessel. The pressure associated with the first vessel may be utilized to set or adjust the pressure associated with the second vessel such that the core sample is maintained at a substantially equivalent pressure or placed under a higher pressure during the transfer of the core sample from the first vessel to the second vessel.

Furthermore, in one embodiment, the core sample is maintained at a substantially equivalent temperature or higher temperature during the transfer of the core sample from the first vessel to the second vessel. "Higher temperature" refers to, as some non-limiting examples, 1%-5% in one embodiment, 5%-10% in another embodiment, 1%-10% in another embodiment, 1%-15% in another embodiment, 1%-20% in another embodiment, and 1%-25% in another embodiment. In some embodiments, the temperature is at least 100 degrees Fahrenheit (e.g., at least 150 degrees Fahrenheit, at least 200 degrees Fahrenheit, at least 250 degrees Fahrenheit, at least 300 degrees Fahrenheit, at least 350 degrees Fahrenheit). In some embodiments, the temperature is 400 degrees Fahrenheit or less (e.g., 350 degrees Fahrenheit or less, 300 degrees Fahrenheit or less, 250 degrees Fahrenheit or less, 200 degrees Fahrenheit or less, 150 degrees Fahrenheit or less). The temperature can be present in an amount ranging from any of the minimum values described above to any of the maximum values described above. For example, in some embodiments, the temperature can be between 100 degrees Fahrenheit and 400 degrees Fahrenheit (e.g., between 150 degrees Fahrenheit and 350 degrees Fahrenheit, between 200 degrees Fahrenheit and 400 degrees Fahrenheit, between 300 degrees Fahrenheit and 400 degrees Fahrenheit, between 250 degrees Fahrenheit and 400 degrees Fahrenheit).

For example, at least one temperature measurement apparatus (e.g., temperature sensor or gauge, such as a sensor device 260 discussed above) associated with the first vessel may be utilized to determine the temperature associated with the first vessel. Similarly, at least one temperature measurement apparatus (e.g., temperature sensor or gauge, such as a sensor device 260 discussed above) associated with the second vessel may be utilized to determine the temperature associated with the second vessel. The temperature associated with the first vessel may be utilized to set or adjust the temperature associated with the second vessel such that the core sample is maintained at a substantially equivalent temperature or higher temperature during the transfer of the core sample from the first vessel to the second vessel.

Turning to the transfer of the one or more core samples, as described previously with respect to FIGS. 2 through 22E, the core sample from the first vessel (e.g., the first vessel associated with a coring tool) may be transferred to the second vessel (e.g., the second vessel associated with a transfer tool 330, the second vessel associated with a transfer tool 1330). Coring tools (such as commercially available coring tools) may be utilized as-is, or modified, for transferring the core sample from the first vessel to the second vessel. Some embodiments, such as embodiments of the first vessel, the second vessel, and the transfer tool, are discussed above with respect to FIGS. 2 through 22E.

In some embodiments, the entire contents of the first vessel may be transferred to the second vessel while maintaining pressure and/or temperature. In some embodiments, less than the entire contents of the first vessel may be transferred to the second vessel while maintaining pressure and/or temperature. In some embodiments, the second vessel may receive the transferred core sample from the first vessel. For example, a single core sample can be transferred to the second vessel. For example, a plurality of core samples from a single first vessel (e.g., a single first vessel of a coring tool) can each be transferred to individual second vessels, in several groups to multiple second vessels, or all to a single second vessel. The multiple second vessels might each be designed for different tests or laboratory measurements, or they may be compatible with multiple tests or measurements. As a plurality of core samples are taken from a single subsurface zone of interest in order to minimize cross-contamination of varying fluid compositions, it may not be necessary to perform the same test or measurement on multiple core samples from the same zone.

At step 2442, the method of FIG. 24 optionally includes using a non-hydrogenated fluid during the transfer of the core sample from the first vessel to the second vessel. In some embodiments, a non-hydrogenated fluid preserves the core sample in the first vessel. In some embodiments, a non-hydrogenated fluid preserves the core sample in the second vessel. In some embodiments, the non-hydrogenated fluid comprises a fluorocarbon. Other examples of a non-hydrogenated fluid can include, but are not limited to perfluorocarbon and fully deuterated chemical compounds, At step 2443, the method of FIG. 24 includes performing one or more tests on the one or more core samples in the measurement zone of the second vessel. For example, the second vessel having the core sample may be inserted into an apparatus (e.g., a nuclear magnetic resonance (NMR) spectrometer), and a test may subsequently be performed on the core sample.

In one embodiment, the test performed on the core sample comprises a magnetic resonance test. In one embodiment, the magnetic resonance test comprises NMR. In one embodiment, the magnetic resonance test comprises magnetic resonance imagining (MRI). In one embodiment, the magnetic resonance test comprises NMR and MRI.

NMR testing is discussed further in the following items: (a) U.S. Pat. No. 10,228,336, (b) U.S. Pat. No. 10,145,810, (c) U.S. Patent App. Pub. No. 2017/0030845, (d) U.S. Patent App. Pub. No. 2017/0285215, (e) Chen, Z., Singer, P. M., Wang, X., Hirasaki, G. J., & Vinegar, H. J. (2019, Jun. 15). Evaluation of Light Hydrocarbon Composition, Pore Size, and Tortuosity in Organic-Rich Chalks Using NMR Core Analysis and Logging. Society of Petrophysicists and Well-Log Analysts. SPWLA $60^{th}$ Annual Logging Symposium, Jun. 15-19, 2019, (f) Sakuraf, S., Loucks, R. G., & Gardner, J. S. (1995, Jan. 1). Nmr Core Analysis Of Lower San Andres/Glorieta/Upper Clear Fork (Permian) Carbonates: Central Basin Platform, West Texas. Society of Petrophysicists and Well-Log Analysts. SPWLA $36^{th}$ Annual Logging Symposium, pages 1-12, Jun. 26-29, 1995, and (g) Shafer, J. (2013, Dec. 1). Recent Advances in Core Analysis. Society of Petrophysicists and Well-Log Analysts. SPWLA-2013-v54n6-A4, (b) Unalmiser, S., & Funk, J. J. (1998, Apr. 1). Engineering Core Analysis. Society of Petroleum Engineers. SPE-36780-JPT, each of which is hereby incorporated by reference herein. However, those of ordinary skill in the art will appreciate that practically any magnetic resonance test known to those of ordinary skill in the art may be performed on the core sample.

MRI testing is discussed further in the following items: (a) Robinson, M. A., Deans, H. A., & Bansal, S. (1992, Jan. 1). Determination of Oil Core Flow Velocities and Porosities Using MRI. Society of Petroleum Engineers. SPE-23960-MS. (h) Caro-Bata, P. F. de J., Balcom, B. J., Green, D., McAloon, M., & Dick, J. (2008, Jan. 1). Capillary Pressure Measurement in Petroleum Reservoir Cores with MRL Offshore Technology Conference. OTC 19234, and (c) Denney, D. (2008, Aug. 1). Capillary Pressure Measurement on Cores by MRI. Society of Petroleum Engineers. 0808-0063-PT SPE, pages 63-66, each of which is hereby incorporated by reference herein. However, those of ordinary skill in the art will appreciate that practically any magnetic resonance test known to those of ordinary skill in the art may be performed on the core sample.

In one embodiment, the test performed on the core sample comprises a computed tomography (CT) test. CT testing is discussed further in the following items: (a) Hidajat, I., Mohanty, K. K., Flaum, M., & Hirasaki, G. (2004, Oct. 1). Study of Vuggy Carbonates Using NMR and X-Ray CT Scanning. Society of Petroleum Engineers. SPE 88995-PA, (b) Closmann, P. J., & Vinegar, H. J. (1993, Sep. 1). A Technique For Measuring Steam And Water Relative Permeabilities At Residual Oil In Natural Cores: CT Scan Saturations. Petroleum Society of Canada. JCPT93-09-08, and (c) Arns, C. H., Sakellariou, A., Senden, T. J., Sheppard, A. P., Sok, R. M., Knackstedt, M. A., Bunn, G. F. (2003, Jan. 1). Virtual Core Laboratory: Properties of Reservoir Rock Derived From X-ray CT Images. Society of Exploration Geophysicists, SEG-2003-4477 each of which is hereby incorporated by reference herein. However, those of ordinary skill in the art will appreciate that practically any computed tomography test known to those of ordinary skill in the art may be performed on the core sample.

In one embodiment, the test performed on the core sample comprises a neutron test. Neutron testing is discussed further in the following items: (a) Jasti, J. K., Lindsay, J. T., & Fogler, H. S. (1987, Jan. 1). Flow Imaging in Porous Media Using Neutron Radiography. Society of Petroleum Engineers. doi:10.2118/16950-MS, SPE 16950 and (b) Nicholls, C. I., & Heaviside, J. (1988, Mar. 1). Gamma-Ray-Absorption Techniques Improve Analysis of Core Displacement Tests. Society of Petroleum Engineers. SPE 14421-PA, each of which is hereby incorporated by reference herein. Those of ordinary skill in the art will appreciate that practically any neutron test known to those of ordinary skill in the art may be performed on the core sample.

In one embodiment, the test performed on the core sample comprises an acoustic test. In one embodiment, the acoustic test comprises acoustic resonance technology (ART) or acoustic resonance (AR). Acoustic testing is discussed further in the following item: (a) Sivaraman, A., Hu, Y. F., Thomas, F. B., Bennion, D. B., & Jammaluddin, A. K. M. (1998, Jan. 1). Determination of Phase Transitions In Porous Media Using Acoustic Technology. Petroleum Society of Canada. PETSOC-98-75, which is hereby incorporated by reference herein. Those of ordinary skill in the art will appreciate that practically any acoustic test known to those of ordinary skill in the art may be performed on the core sample.

In one embodiment, the test performed on the core sample comprises a dielectric test. Dielectric testing is discussed further in the following items: (a) Leung, P. K., & Steig, R. P. (1992, Jan. 1). Dielectric Constant Measurements: A New, Rapid Method To Characterize Shale at the Wellsite. Society of Petroleum Engineers. IADC/SPE 23887-MS and (b) Ali A. Garrouch, (2018), "Predicting the cation exchange capacity of reservoir rocks from complex dielectric permittivity measurements," GEOPHYSICS, Volume 83, Issue 1, MR1-MR14 (January 2018), each of which is hereby incorporated by reference herein. Those of ordinary skill in the art will appreciate that practically any dielectric test known to those of ordinary skill in the art may be performed on the core sample.

In one embodiment, the test performed on the core sample comprises a magnetic resonance test, a computed tomography test, a neutron test, an acoustic test, a dielectric test, some other test, or any combination thereof. Those of ordinary skill in the art will appreciate that this is not an exhaustive list, and at least one test not listed herein may be performed in one embodiment. For example, in some embodiments, the test(s) discussed in the following item may be utilized: Aidan Blount, et al, "Maintaining and Reconstructing In-Situ Saturations: A Comparison Between Whole Core, Sidewall Core, and Pressurized Sidewall Core in the Permian Basin," Petrophysics 60, 50-60 (2019), which is hereby incorporated by reference herein.

The test results may be utilized in a variety of ways, as discussed hereinbelow at step 2444, step 2445, step 2446, step 2447, step 2448, step 2449, step 2489, or any combination thereof.

At step 2444, the method of FIG. 24 includes determining (e.g., determining, measuring, etc.) a fluid saturation of the core sample using the test. For example, the tests discussed herein may be utilized to analyze the fluid composition of the core sample that has remained at elevated pressure and/or elevated temperature during retrieval from the subterranean reservoir to the laboratory. For example, one or more of the tests may be utilized for petrophysical analysis to determine the fluid saturation of the subterranean reservoir as a function of depth—in other words, the identity and relative amount of fluids present in the pore volume, including liquid hydrocarbons, water, and gas (hydrocarbon and otherwise)—in order to identify the optimal zone(s) for economic production of hydrocarbons. Those of ordinary skill in the art will appreciate that the test results may be utilized to determine the fluid saturation of the core sample.

Fluid saturations are conventionally determined using one or more laboratory samples that have already undergone compositional changes from their native state. However, in some embodiments the pressure and/or temperature of the first vessel has been maintained at representative conditions during retrieval from the reservoir in order to minimize or eliminate structural changes to the sample and/or phase or composition changes to the fluids contained in the sample. Additionally, as disclosed herein, the core sample is maintained at a substantially equivalent pressure or placed under a higher pressure during the transfer of the core sample from the first vessel to the second vessel. Moreover, in some embodiments, the core sample is maintained at a substantially equivalent temperature or higher temperature during the transfer of the core sample from the first vessel to the second vessel. By doing so, compositional changes in the core sample may be reduced (or completely avoided) and the core sample may be closer to its native state during testing in the second vessel, which may lead to more accurate test results.

For example, a 2 MHz NMR may be used in testing one or more of the core samples of the second vessel so that the core samples are exposed to substantially the same magnetic field strength as when the core samples are in situ in the formation tested during NMR logging. The measured values may later be used to calibrate the logging results. After the core sample transfer to the second vessel, the second vessel, which is transparent to the NMR, may be moved through the magnetic field of the 2 MHz NMR so that measurements may be performed on each core sample. The results may be evaluated, and T1/T2 cutoffs may be used to determine, for example, oil, gas, and water saturations. As stated above, the core samples in the second vessel never lose pressure relative to their in situ positions in the formation, and the core samples maintain the original fluid saturations from the reservoir. In the absence of step 2445, when step 2444 is complete, the process proceeds to step 2494.

At step 2445, the method of FIG. 24 optionally includes calibrating test measurements on at least one other core sample performed at ambient pressure using the determined fluid saturation. For example, the observed changes can be analyzed to create a calibration for standard laboratory measurements performed at ambient pressure on regular core samples (i.e., core samples that have not maintained pressure and/or temperature) taken from the same subterranean reservoir, so that the determined fluid saturation can be related to the probable native fluid saturation in the subterranean reservoir. Extraction of pressure-preserved core samples is expected to be significantly more expensive than standard (not pressure-preserving) coring services, so it is beneficial to primarily collect regular core samples with only a few pressure-preserved core samples for calibration.

This process enhances the accuracy of the core-to-log calibration for laboratory measurements performed on the regular core samples, and therefore, ultimately the accuracy of the reservoir models used to make business decisions about which reservoirs to produce for oil and/or gas. Initially, the NMR spectrometer or other measuring device is calibrated to known volumes and/or masses of water defined by a standard. Known relationships between oil and water volumes may then be used to adjust the calibration factor of water/oil volume, also known as the hydrogen index. Fluids in rocks from unconventional resources may be highly volatile, and loss of fluids (e.g., up to 80% of the initial volume) may occur as soon as the pressure conditions in the rock samples change (e.g., are reduced). This change in pressure may be avoided by maintaining reservoir pressure conditions during the NMR measurement. The T1/T2 calibration may factor into the measurement. In NMR measurements, cutoffs may be used to distinguish NMR signals of various fluid phases in the rock. Based on the spin/spin and spin/lattice relaxation water, oil and gas volumes may be calculated separately because the calibrated NMR signal is linearly proportional to the volume of each phase. When step 2445 is complete, the process proceeds to step 2494.

At step 2446, the method of FIG. 24 optionally includes reducing the pressure on the core sample in the second vessel and repeating the test on the core sample in the second vessel. For example, the pressure of the core sample may be reduced, step by step, to ambient pressure. In some cases, when multiple tests are performed on one or more of the core samples using example embodiments as the second vessel is depressurized, an analysis can be performed on the fluid composition and/or a petrophysical analysis of the core sample can be performed over the time. The analysis of the fluid composition and/or the results of the petrophysical analysis of the core sample can be used to determine a fluid saturation of the core sample, where the fluid saturation can be used to calibrate test measurements on at least one other core sample performed at ambient pressure.

The pressure reduction may be based on expected permeability values. In general, the reduction in pressure may be performed slowly and in steps. During each step, the volume of volatile fluids may be recorded, and a new 2 MHz NMR measurement may be performed to record the changes in the fluid saturations in the pore system of the rock. Based on the data collected, a determination of the production of fluids during field operations (e.g., pressure drawdown) may be modeled. This measurement may be performed on either one sample or a whole column of samples, depending on the experimental setup. When step 2446 is complete, the process proceeds to step 2494.

At step 2447, the method of FIG. 24 optionally includes reducing the temperature on the core sample in the second vessel and repeating the test on the core sample in the second vessel. For example, the temperature of the core sample may be reduced, step by step, to ambient temperature. The manipulation of the temperature may be used to determine, for example, wetting phenomena as a function of NMR and NMR relaxation behavior.

In one embodiment, the pressure only is reduced (at step 2446). In one embodiment, the temperature only is reduced (at step 2447). In one embodiment, the pressure and temperature are reduced. As another example, a reduction of pressure may occur, over multiple reduction steps, with test measurements in between each reduction step. Those of ordinary skill in the art will appreciate that many options are possible. When step 2447 is complete, the process proceeds to step 2494.

At step 2448, the method of FIG. 24 optionally includes injecting a chemical agent (e.g., fluorocarbon) into the second vessel to preserve fluid saturation of the core sample to allow for testing of the core sample at ambient pressure conditions outside the second vessel. For example, the preservation may not affect geomechanical properties of the core sample. Another chemical agents appropriate for the task may be cesium formate, or any fluorocarbon that doesn't interfere with the NMR signal. The injection of the fluids should occur slowly and in a controlled manner so as to not damage the core samples. The chemical makeup and quantity may be dictated by the composition of the core samples. Non-wetting fluids may be used because they do not mix with the original pore fluids in the pore system of the rock. When step 2448 is complete, the process proceeds to step 2494.

At step 2449, the method of FIG. 24 optionally includes cooling the core sample in the second vessel to preserve fluid saturation of the core sample to allow for testing of the core sample at ambient pressure conditions outside the second vessel. For example, the preservation may not affect geomechanical properties of the core sample. This method may include another way of preserving the pore fluids by freezing them inside the pore, preventing the evaporation of the fluid before analysis. Liquid gases such as liquid nitrogen, argon, and helium may be used for such purpose. As an alternative, dry ice (solid carbon dioxide) may be used for such purpose. After the transfer, frozen samples may be used to measure original fluid compositions with other analytical instruments (e.g., pyrolysis GC/MS). In addition, or in the alternative, frozen samples may be transferred in another vessel that can be heated to extract fluids before measuring them with analytical instruments such as GC, GC/MS, FT-IR, MS, and high field NMR. When step 2449 is complete, the process proceeds to step 2494.

At step 2489, the method of FIG. 24 optionally includes injecting a chemical agent (e.g., a resin, a polymer, an alloy, any combination thereof) into the second vessel to encase the core sample to preserve fluid saturation of the core sample to allow for testing of the core sample at ambient pressure conditions outside the second vessel. For example, a resin, a polymer, an alloy, or any combination thereof may be selected so that they do not affect geomechanical properties of the core sample. The vessel material used for this application may be or include, for example, PEEK, PTFE, ceramic (e.g., zirconia), and/or fiberglass bonded by an epoxy that is NMR transparent. When epoxy is used to bond the fiberglass, the field strength may be an important factor to consider. The epoxy used in example embodiments may be transparent for 2 MHz field strength, and yet may also create an NMR signal at higher field strengths.

When a chemical agent is used to encase the core samples, NMR measurements at pressure inside the second vessel may be no longer performed. The injection of the chemical agent may be done to preserve the reservoir status of the core sample. After the chemical is hardened, the vessel may be vented, and the preserved samples may be removed from the vessel so that measurements at surface conditions may be taken. In such a case, the hardened chemical agent may provide a seal for the enclosed fluids/rock.

At step 2494, a determination is made as to whether testing on the one or more core sample is complete. If testing on the core samples is complete, then the process proceeds to the END step. If testing on one or more of the core samples is not complete, then the process reverts to step 2443.

In some cases, when multiple tests are performed on one or more of the core samples using example embodiments, a model of hydrocarbon production as a function of pressure and/or temperature can be created based on the results of the tests. For example, as the core samples are characterized using the results of the tests, the subterranean reservoir from which the core samples are retrieved can be evaluated based on the characterization of the core samples. The model of hydrocarbon production can be specifically created based on the results of the tests on the core samples.

The properties of the rock sample may dictate the nature of the one or more chemical agents injected into the second vessel for fluid preservation. A chemical agent should not mix with the reservoir fluids. In addition, or in the alternative, a chemical agent may have a viscosity that avoids further invasion/penetration into the pore space of a core sample. A chemical agent may provide a type of coating on the outer surface of the core plug with minimal invasion. In some cases, a hardened chemical agent may provide a casing/seal that helps to keep the original reservoir fluids in the pore space. A chemical agent used for such purpose may also be chemically resistant against the chemical compounds in the pore system so that it does not interact with the pore fluids. After the preserved samples are transferred into the vessel to extract the pore fluids by heating or chemical treatment, the preserving chemical agent may be removed without interfering with the analytical measurement process.

NMR measurements of the pressure-preserved samples may be used to measure the "original fluids in place", which relates to the Original Oil In Place (OOIP). OOIP may be modeled using the results of the NMR measurement and formation evaluation based on the results of the wireline logs. The NMR measurement may provide oil and gas saturation and porosity of the reservoir rock. Based on the T1/T2 cutoffs, there may be a differentiation between producible and non-producible hydrocarbons. Adding the NMR laboratory results to the formation evaluation results, a model may be created to predict hydrocarbon production from the targeted formation. In certain example embodiments, this may be possible because the NMR logging tool runs at the same field strength as the 2 MHz NMR used for the lab-scale analysis, and results may be transferred between each tool.

The following equation may be used to calculate saturations:

$$S_I = \frac{1}{PV} \frac{1}{C} \frac{1}{HI} \sum_{m < \frac{T1}{T2} < n} f(T_1, T_2),$$

where Si=saturation of phase i; PV=pore volume of the measured core plug; C=NMR calibration constant; and HI=hydrogen index.

EXAMPLE: A NMR example will now be discussed, and a similar approach may be utilized with the other tests. NMR is utilized for measuring saturation, and NMR distinguishes between fluids based on differences in parameters of the detected magnetic resonance signals, including signal relaxation times (referred to as T1 and T2) and measured diffusion coefficients. Different excitation and measurement sequences are employed to enable sensitivity to these parameters, and they are optimized for the expected values in a given reservoir. NMR data may be represented as 1-, 2-, or 3-dimensional spectra, where the axes can represent values of T1 and T2 relaxation times and diffusion coefficients. Downhole NMR logging tools can provide saturation values with spatial resolution on the order of one or several feet of depth, but NMR log data is best calibrated against laboratory measurements performed under both as-received and controlled saturation conditions, using typically 5 to 30 core samples per well.

All measurements described in this example involve first transferring the core samples from a first vessel (e.g., substantially similar to the retrieval vessel 310 discussed above) of a commercial coring tool at elevated pressure to a second vessel(s) (e.g., substantially similar to the linear actuator 320 discussed above) that is designed to be compatible with the measurement technologies intended for use with those core samples, while maintaining pressure, as described above with respect to FIGS. 2 through 22E. In certain embodiments, such as in the case of NMR measurements, this may involve designing the second vessel to contain only non-magnetic components and designing the measurement zone of the second vessel to contain only non-metallic and low/no noise components. The coring tool may also contain at least one non-hydrogenated fluid, such as a fluorocarbon, which may be chosen to be both non-wetting on the rock material and non-miscible with hydrocarbons and water, and thus assist in maintaining the fluid saturations within the core samples. The non-hydrogenated fluid can also be transferred to the second vessel without interfering with hydrogen NMR measurements. Core samples from a single coring tool can each be transferred to individual second vessels, in several groups to multiple second vessels, or all to a single second vessel. The multiple second vessels might each be designed for different laboratory measurements or tests, or they may be compatible with multiple measurements or tests. As a plurality of core samples are taken from a single subsurface zone of interest in order to minimize cross-contamination of varying fluid compositions, it may not be necessary to perform the same test or measurement on multiple core samples from the same zone.

NMR measurements can be performed on the core sample(s) at the initial pressure and/or temperature (as found downhole), then at intermediate pressure values and/or temperature values as the second vessel is depressurized. The NMR data can be used to determine the fluid saturations at each step. The observed changes can be analyzed to create a calibration for standard laboratory measurements performed at ambient pressure on regular core samples (i.e., samples not extracted by a tool that preserves pressure) taken from the same formation, so that the measured fluid saturation can be related to the probable native fluid saturation in the subterranean reservoir. Extraction of pressure-preserved core samples is expected to be significantly more expensive than standard (not pressure-preserving) coring services, so it is beneficial to primarily collect regular core samples with only a few pressure-preserved core samples for calibration. This process enhances the accuracy of the core-to-log calibration for laboratory measurements performed on the regular core samples, and therefore ultimately the accuracy of the reservoir models used to make business decisions about which reservoirs to produce for oil and/or gas.

NMR spectrometers are available in a range of magnetic field strengths (and some have variable field strengths), with different field strengths offering advantages and disadvantages depending on the intended application. It is customary to describe an instrument in terms of its proton magnetic resonance frequency, which is directly proportional to the field strength (the constant of proportionality is the proton gyromagnetic ratio, 42.6 MHz/Tesla). For example, NMR logging tools are generally in the range of 500 kHz-2 MHz, and laboratory NMR devices used for log calibration are typically at around 2 MHz, with systems in the range of 10 MHz-20 MHz becoming more common for tight rock unconventional samples. For purposes of determining fluid saturations, instruments at particular field strengths may be advantageous for discriminating between certain fluid types.

In some embodiments, the field strength is at least 0.5 MHz (e.g., at least 1 MHz, at least 10 MHz, at least 20 MHz, at least 30 MHz, at least 40 MHz, at least 50 MHz, at least 60 MHz, at least 70 MHz, at least 80 MHz, at least 90 MHz). In some embodiments, the field strength is 100 MHz or less (e.g., 90 MHz or less, 80 MHz or less, 70 MHz or less, 60

MHz or less, 50 MHz or less, 40 MHz or less, 30 MHz or less, 20 MHz or less, 10 MHz or less). The magnetic field strength can be present in an amount ranging from any of the minimum values described above to any of the maximum values described above. For example, in some embodiments, the magnetic field strength may be between 0.5 MHz and 100 MHz (e.g., between 0.5 MHz and 4 MHz, between 4 MHz and 20 MHz, between 20 MHz and 60 MHz, between 60 MHz and 100 MHz). In some embodiments, the magnetic field strength of any commercially available NMR spectrometer may be utilized (e.g., up to 1.2 GHz). In some embodiments, magnetic field strengths of approximately 2 MHz and 42 MHz may be utilized. Although data from one measurement frequency may be sufficient, comparing the NMR data at these two frequencies may aid in determining fluid saturations in the core samples. These values are determined by the instruments available in our laboratory, and they may not be optimal for the fluids present in a particular reservoir. The ideal measurement frequencies for particular rock and/or fluid types (such as in the unconventional area) is a subject of ongoing research, so tests may be applied using instruments with other values of the NMR measurement frequencies, or using a different number of measurement frequencies.

NMR spectra, in particular those that include T1 and/or T2 axes, can be used to characterize the sizes and types of pores in a sample, and the fluids contained therein (both quantity and kind). For example, in a shale sample, the NMR spectrum can distinguish between organic and inorganic pores. In a core sample from a conventional reservoir (such as a carbonate or sandstone), the NMR spectrum can be related to the distribution of pore sizes present. Clay-bound and/or capillary-bound fluids can also be distinguished from free fluid. As a core sample is depressurized, measured changes in the NMR spectrum can be analyzed to determine changes in the fluid saturations of different subsets of pores in the sample, such as different pore types or different pore sizes.

Precise chemical compositions of the fluids in these pore subsets can be determined by also performing geochemical analysis (such as gas chromatography) on the gases released from the core samples, and subsequently expelled from the second vessel, at each depressurization step. The observed sequence of chemicals identified at each pressure, and the corresponding changes in the NMR spectrum, describe the particular fluids expected to be recovered as the pressure drops in a reservoir during production, including in what pressure range each fluid will be recovered and from which pores.

Although the total quantity of fluid produced is of interest, and potentially the quantities of particular kinds of fluids (such as hydrocarbons in general, or particular kinds of hydrocarbon), it is not necessarily viable to completely deplete an individual reservoir during production. The methods described herein can therefore be used to characterize well productivity in specific pressure ranges. The rate of depressurization can also be varied between samples, in order to study how the depletion rate affects the ultimate productivity of a particular reservoir. NMR and/or geochemistry can be performed as the depletion progresses, in order to quantify how the depletion rate affects which fluids are expelled at a given pressure, and from which pores. This information can be used to optimize aspects of the production design, such as the pressure depletion window and the depletion rate (set for instance by the choke size at the wellhead). Studying how to optimize the depletion rate for total productivity can also lead to an improved estimate of ultimate recovery (EUR), which is a metric for reserves booking.

The physical phases of the individual fluids may change during depressurization, if those fluids pass through phase boundaries (such as at the dew and/or bubble points) at a given temperature. This phase behavior cannot be easily predicted or measured in some systems, such as nanoscale pores in shale, but systems and methods for using NMR to observe and characterize phase behavior and measure phase boundaries in such systems, as in U.S. Pat. No. 10,634,746, which is hereby incorporated herein by reference, may be used. The methods described there can be applied to the pressurized core samples described in this disclosure. For example, as the pressure is reduced, a change in some NMR parameter associated with a particular fluid (such as T2) may indicate a change in the phase of that fluid. As discussed herein, the native fluids present in the core sample, rather than loading a fluid into the sample in the laboratory and then pressurizing, may be advantageous because the measurements would be more readily applicable to the specific rock/fluid system of a particular reservoir.

These NMR methods can also be applied using magnetic resonance imaging (MRI) techniques, which allow for 1-D, 2-D, and/or 3-D spatial imaging of various NMR parameters, such as fluid quantities (e.g., total and/or effective porosity) or relaxation parameters (T1, T2). Different regions of a sample may contain different fluid saturations, or they may exhibit different saturation changes or phase behavior as a function of pressure, all of which could be measured and imaged using MRI. Physical changes to the rock during depressurization, such as fracturing or other damage, can also be observed by MRI. These changes can be correlated with the fluid saturations and pore properties present in the sample, or in the specific regions of the sample where the changes occur.

Samples can also be imaged using CT methodologies (which may require different second vessel designs), which typically can have finer spatial resolution than MRI but less sensitivity to fluid saturation, and the images correlate with the NMR and/or MRI measurements. For example, CT images may be used to monitor the orientation of fractures, both those present in a sample as received and those induced during depressurization. In addition, MRI and/or CT can be used to determine the sizes and positions of individual samples in a second vessel containing multiple samples, in case the second vessel is opaque to visible light or other imaging methods.

In contrast to existing tools and methodologies, embodiments consistent with this disclosure may allow measurement of in-situ water saturations and the salinity of the pore water/original reservoir brine, two parameters that are important for reservoir characterization. Furthermore, embodiments consistent with this disclosure can potentially be used to measure relative permeability under more accurate conditions. The example embodiments consistent with this disclosure may allow determination of effective porosity at in-situ reservoir conditions.

The methods discussed herein may also be applied to study samples as the temperature is decreased in steps until reaching ambient temperature, potentially in combination with decreases in pressure (either simultaneously or sequentially). In addition, NMR/MRI can characterize temperature-dependent changes in fluid viscosity, wettability, asphaltene precipitation, and wax precipitation.

The systems, methods, and apparatuses described herein allow for transferring pressurized reservoir core samples and performing tests on those samples. Example embodiments can maintain core samples at the same or other managed pressure and transfer these core samples at that same pressure into a testable vessel so that the core samples can be tested as if they were in situ within the subterranean formation in terms of pressure. As a result, example embodiments allow for more reliable and controlled testing and test results of core samples compared to embodiments currently used in the art.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of transferring at least one subterranean core sample from a retrieval vessel to a testing vessel, the method comprising:
   removing at least one pressure barrier on the retrieval vessel using a linear actuator while maintaining a sampling pressure on the at least one subterranean core sample at which the at least one subterranean core sample is taken from a subterranean formation;
   pressurizing the testing vessel to the sampling pressure using the linear actuator;
   transferring the at least one subterranean core sample from the retrieval vessel to the testing vessel; and
   sealing the testing vessel with the at least one subterranean core sample at the sampling pressure, wherein the testing vessel allows the at least one subterranean core sample to be tested while the at least one subterranean core sample is maintained at the sampling pressure.

2. The method of claim 1, wherein transferring the at least one subterranean core sample from the retrieval vessel to the testing vessel comprises:
   orienting the retrieval vessel above the testing vessel; and
   applying vibrations to the retrieval vessel.

3. The method of claim 1, wherein transferring the at least one subterranean core sample from the retrieval vessel to the testing vessel comprises:
   applying heat to the retrieval vessel.

4. The method of claim 1, wherein removing the at least one pressure barrier on the retrieval vessel comprises:
   removing a pressure barrier from the retrieval vessel;
   removing a spring from the retrieval vessel; and
   removing a piston from the retrieval vessel.

5. The method of claim 1, further comprising:
   inserting a core spacer assembly between the retrieval vessel and the testing vessel after transferring the at least one subterranean core sample from the retrieval vessel to the testing vessel.

6. The method of claim 1, wherein the at least one subterranean core sample is maintained at a substantially equivalent pressure or placed under a higher pressure during the transfer of the at least one subterranean core sample from the retrieval vessel to the testing vessel.

7. The method of claim 1, wherein transferring the at least one subterranean core sample from the retrieval vessel to the testing vessel comprises:
   orienting the retrieval vessel above the testing vessel to allow gravity to move the at least one subterranean core sample from the retrieval vessel to the testing vessel.

8. The method of claim 1, further comprising:
   controlling a pressure within the retrieval vessel, the linear actuator, and the testing vessel using a hydraulic device.

9. The method of claim 1, further comprising:
   coupling an adapter flange to the retrieval vessel before the at least one pressure barrier on the retrieval vessel is removed.

10. The method of claim 1, further comprising:
    operating a valve positioned between the retrieval vessel and the linear actuator after removing the at least one pressure barrier on the retrieval vessel.

11. The method of claim 10, wherein the linear actuator works through the valve when the valve is in an open position.

12. The method of claim 1, wherein the at least one subterranean core sample is positioned within a measurement zone of the testing vessel.

13. The method of claim 12, wherein the measurement zone comprises a material that has a background signal that is equal to or less than 1% of an originating signal from the at least one subterranean core sample while the at least one subterranean core sample is tested.

14. The method of claim 1, wherein transferring the at least one subterranean core sample from the retrieval vessel to the testing vessel comprises:
    removing a plug of the retrieval vessel.

15. The method of claim 14, wherein transferring the at least one subterranean core sample from the retrieval vessel to the testing vessel further comprises:
    installing an extractor on the linear actuator, wherein the extractor is configured to engage and remove the plug from the retrieval vessel.

16. The method of claim 14, wherein transferring the at least one subterranean core sample from the retrieval vessel to the testing vessel further comprises:
    rotating a plug breaker assembly until the plug of the retrieval vessel is broken loose.

17. The method of claim 16, wherein the plug breaker assembly is removably coupled to a valve.

18. The method of claim 1, wherein the testing vessel with the at least one subterranean core sample at the sampling pressure is sealed using a testing vessel plug assembly.

19. The method of claim 18, sealing the testing vessel with the at least one subterranean core sample at the sampling pressure comprises:
    installing the testing vessel plug assembly on the linear actuator before sealing the testing vessel; and
    extending the testing vessel plug assembly, using the linear actuator, into the testing vessel.

20. The method of claim 19, sealing the testing vessel with the at least one subterranean core sample at the sampling pressure further comprises:
    retracting the linear actuator from the testing vessel after the testing vessel plug assembly is installed in the testing vessel.

* * * * *